US012500492B2

United States Patent
Ruggieri et al.

(10) Patent No.: US 12,500,492 B2
(45) Date of Patent: Dec. 16, 2025

(54) METHOD AND SYSTEM FOR ASSEMBLING A STATOR OR ROTOR WINDING

(71) Applicant: Tecnomatic S.p.A., Corropoli (IT)

(72) Inventors: Giovanni Ruggieri, Corropoli (IT); Maurilio Micucci, Corropoli (IT); Giuseppe Ranalli, Corropoli (IT)

(73) Assignee: Tecnomatic S.p.A., Corropoli (IT)

( * ) Notice: Subject to any disclaimer, the term of this patent is extended or adjusted under 35 U.S.C. 154(b) by 0 days.

(21) Appl. No.: 18/276,069

(22) PCT Filed: Dec. 21, 2022

(86) PCT No.: PCT/IB2022/062623
§ 371 (c)(1),
(2) Date: Aug. 7, 2023

(87) PCT Pub. No.: WO2023/119193
PCT Pub. Date: Jun. 29, 2023

(65) Prior Publication Data
US 2024/0113606 A1 Apr. 4, 2024

(30) Foreign Application Priority Data

Dec. 22, 2021 (IT) .......................... 102021000032159

(51) Int. Cl.
*H02K 3/12* (2006.01)
*H02K 15/064* (2025.01)

(52) U.S. Cl.
CPC ....... *H02K 15/064* (2013.01); *H02K 2213/03* (2013.01)

(58) Field of Classification Search
CPC .. H02K 15/0407; H02K 3/26; H02K 15/0414; H02K 15/0081; H02K 3/12; H02K 3/28
See application file for complete search history.

(56) References Cited

U.S. PATENT DOCUMENTS 3,837,072 A * 9/1974 Moberg ............... H02K 3/14
29/605
6,894,417 B2  5/2005 Cai et al.
(Continued)

FOREIGN PATENT DOCUMENTS

WO  2018039806 A2  3/2018
WO  2019215514 A1  11/2019

OTHER PUBLICATIONS

International Search Report, issued in PCT/IB2022/062623, mailed Apr. 12, 2023, Rijswijk, NL.

*Primary Examiner* — Leda T Pham
(74) *Attorney, Agent, or Firm* — ArentFox Schiff LLP; Michael Fainberg

(57) ABSTRACT

A method and a system for inserting all hairpins of a k-th crown of a stator winding into the same region of space are provided. Progressively inserted hairpins are movable along a path of geometry so that the last hairpin of the crown is always insertable as if the last hairpin were the first hairpin, without hindrance. After inserting the last hairpin the crown centers itself by removing the apparatus that allowed insertion of the hairpins into the same region of space. Inner and/or outer containments allow the hairpins to follow the required profile. Rotation of the hairpins is obtainable by cylindrical or conical pins between the legs of the hairpins. After assembling one crown, outermost crowns are progressively assembled on the system to have the winding without handling the crowns. Once assembled, the innermost crown is vertically lowered along a winding axis to leave sufficient space to assemble an adjacent crown.

20 Claims, 31 Drawing Sheets

(56) References Cited

U.S. PATENT DOCUMENTS

| | | | |
|---|---|---|---|
| 7,480,987 B1 | 1/2009 | Guercioni | |
| 7,622,843 B2 | 11/2009 | Cai | |
| 8,552,611 B2 * | 10/2013 | Matsuoka | H02K 3/12 |
| | | | 310/260 |
| 10,749,399 B2 * | 8/2020 | Riedl | H02K 1/16 |
| 2009/0178270 A1 | 7/2009 | Guercioni | |
| 2009/0302705 A1 | 12/2009 | Guercioni | |
| 2020/0336054 A1 * | 10/2020 | Takeda | H02K 1/165 |

* cited by examiner (a)

(b)

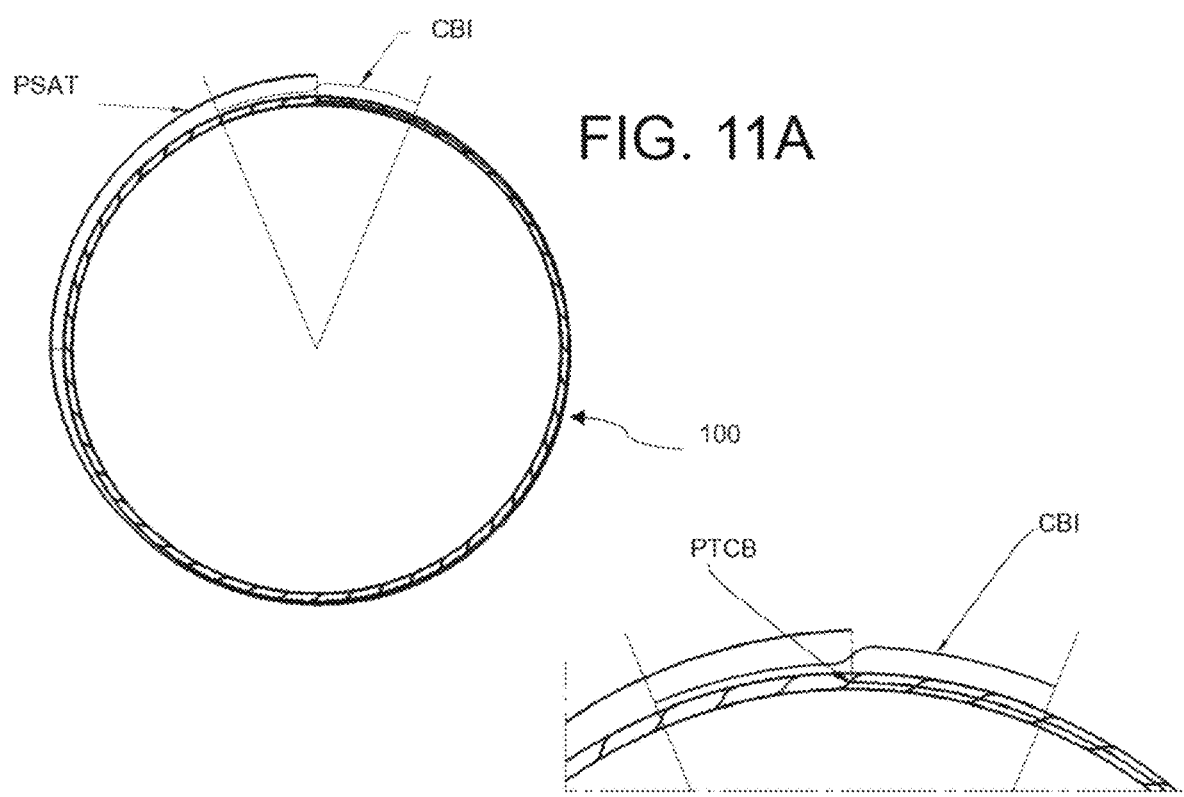
FIG. 11A
FIG. 11B
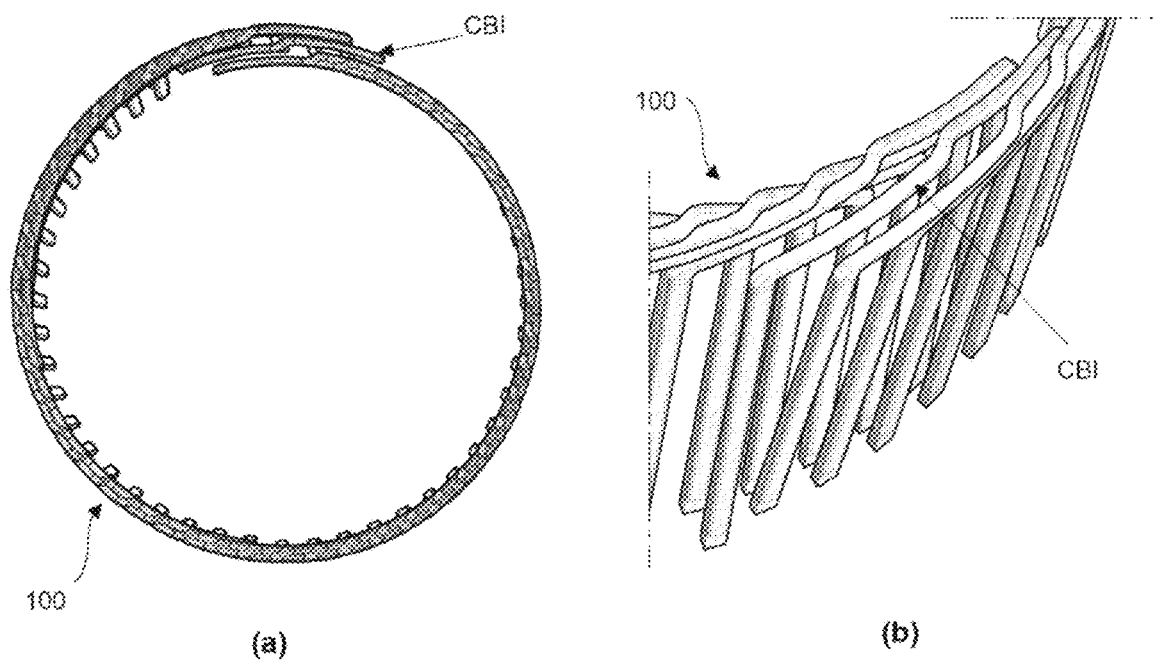
(a) (b)
FIG. 12

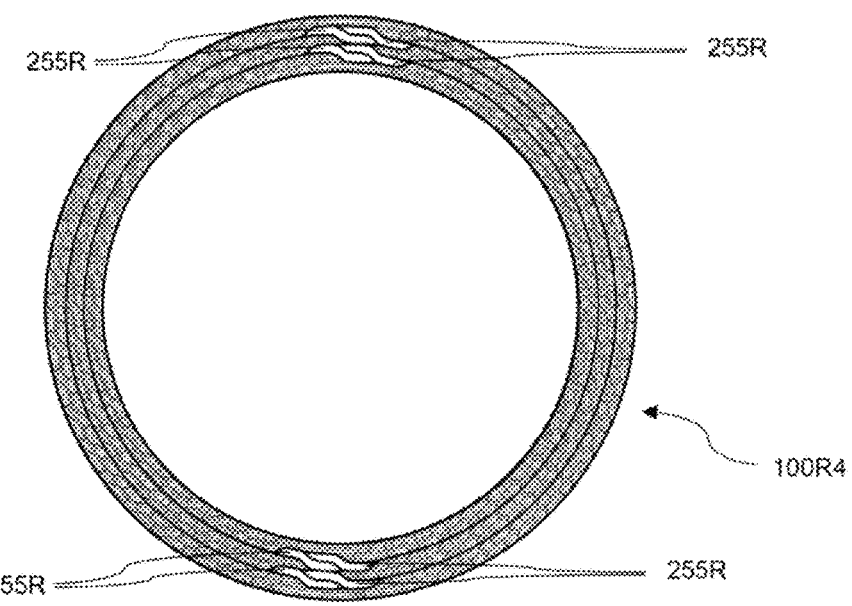
FIG. 33
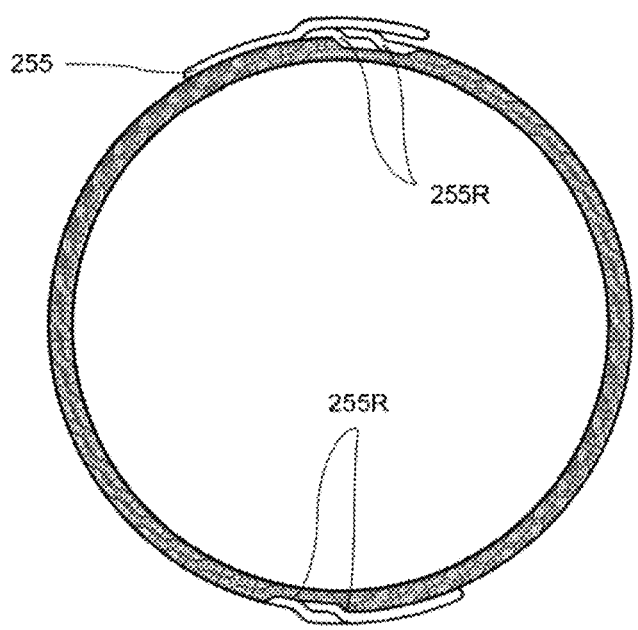
FIG. 34
FIG. 35
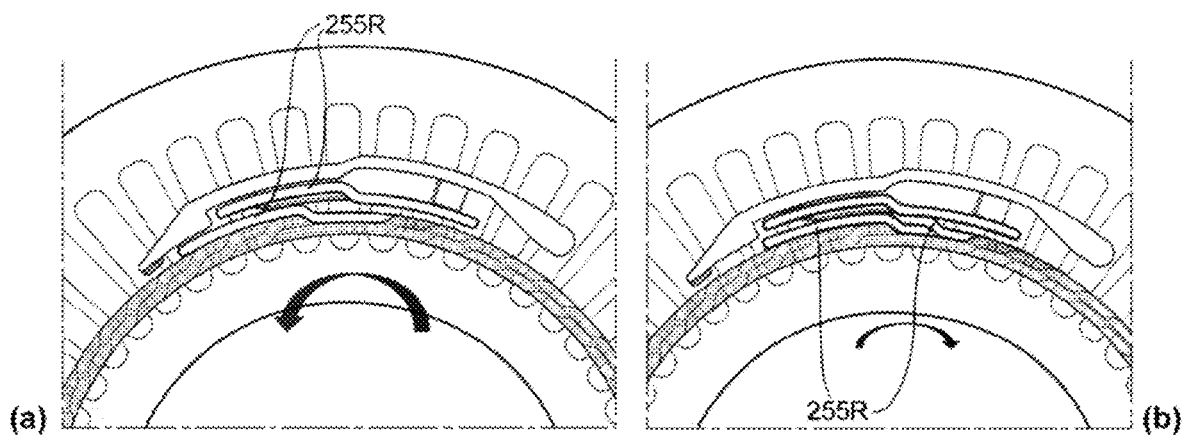

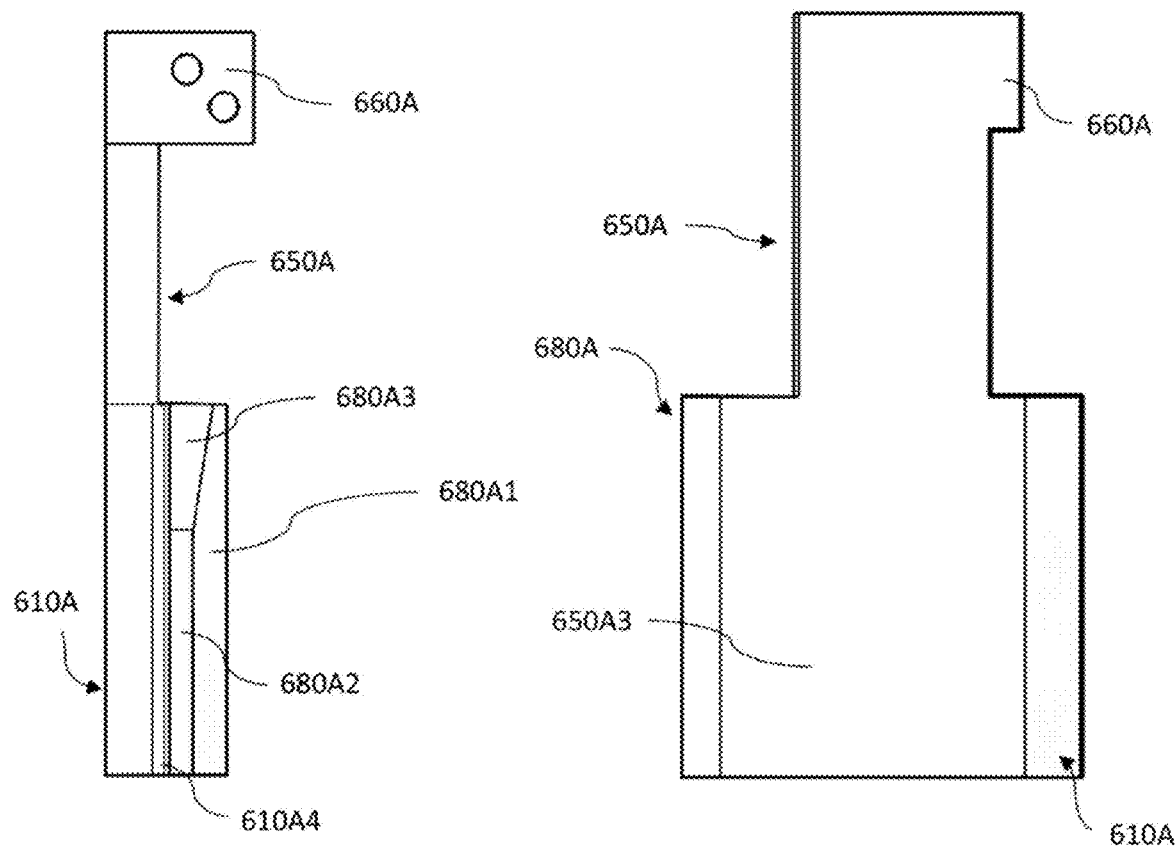
FIG. 56C
FIG. 56D
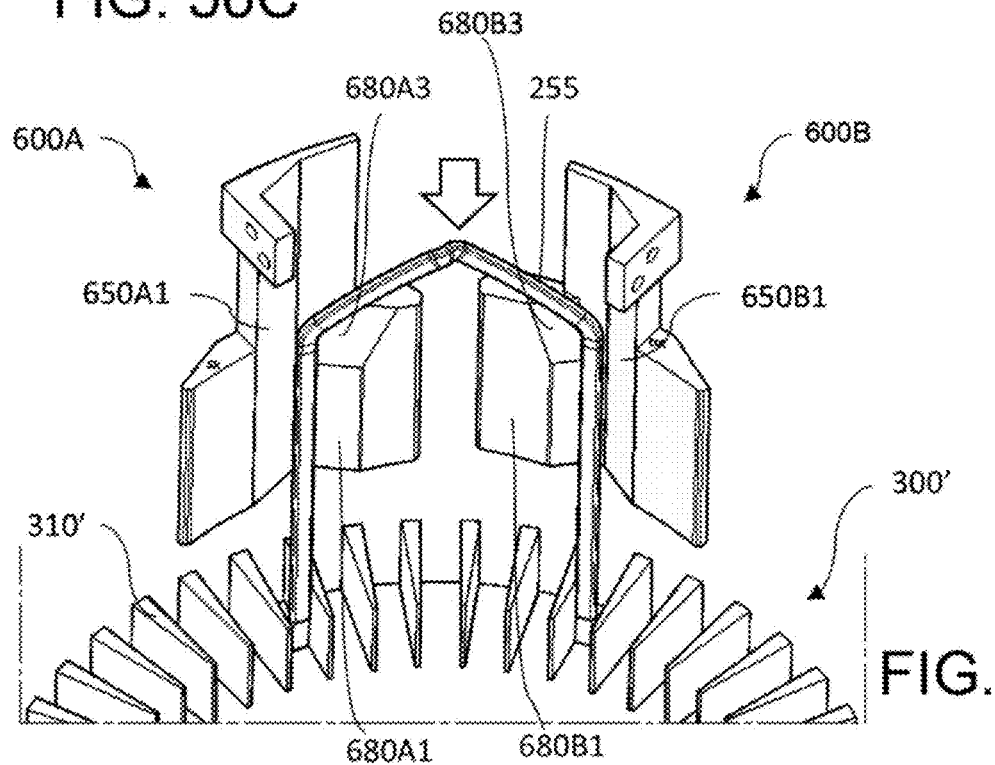
FIG. 57A

METHOD AND SYSTEM FOR ASSEMBLING A STATOR OR ROTOR WINDING

CROSS-REFERENCE TO RELATED APPLICATIONS

This application is a National Phase Application of PCT International Application No. PCT/IB2022/062623, having an International Filing Date of Dec. 21, 2022 which claims priority to Italian Application No. 102021000032159 filed Dec. 22, 2021, each of which is hereby incorporated by reference in its entirety.

FIELD OF THE INVENTION

The present description is directed to a method and system for assembling a stator or rotor winding.

BACKGROUND ART

It is generally known and common practice to make stators or rotors of electric machines, such as generators or electric motors, e.g., for applications on hybrid electric vehicles (HEVs), in which the stator or rotor winding consists of a plurality of bent bar hairpins and variously interconnected to one another to realize electric windings also known as "bar windings". Such bent bar hairpins are also referred to as "hairpin conductors" or simply "hairpins". The bar windings can be constituted by one or more groups of concentric windings, sometimes known as "crowns", each group of windings already being a winding in itself ("winding set").

In particular, windings with hairpins having a circular cross-section (also referred to as "rounded-wire hairpins") or a rectangular cross-section, or again hairpins with a varying cross-section geometry along the length (e.g., round hairpins made rectangular in the part housed in the slot) belong to the prior art. In this regard, a "rectangular" or "square" wire hairpin is understood to mean, in this description, a wire having four substantially flat sides, each joined to the adjacent sides, typically by a rounded edge. Bar hairpins are known having a trapezoidal-shaped cross-section.

The aforesaid bar hairpins are usually preformed by means of a "U" or "P"-shaped bending, starting from straight bar hairpins. U.S. Pat. No. 7,480,987 describes an example of a method of preforming straight bar hairpins for forming the hairpins. The preformed "U" or "P"-shaped hairpins, also often referred to as "preformed hairpins", typically have two legs, set side by side, of equal or different length, each provided with a free end portion and an opposite end portion connected to the other of the two legs by means of a bridge-like connecting portion. Since the end portions protrude when they are inserted into the rotor or stator, they will henceforth be referred to as a "free protruding portion" and "opposite protruding connected portion". The protruding connected portion can also be referred to as a "head portion" or "bridge-like connected portions". The whole of the "head portions" of the legs of the same hairpin constitutes the so-called "bridge-like connector".

With reference to FIG. 1(a), a hairpin 255 is preformed from a linear hairpin (not shown) by bending it to form a first leg 255a with a respective free protruding end portion 255aE and a second leg 255b with a respective free protruding end portion 255bE. At the same time, the bending shape forms a bridge-like connector 255c between the two legs 255a, 255b. In this example, the preformed hairpin has a flattened "U" shape. To form a stator of an electric machine, for example, it is known to subject the "U" or "P"-shaped preformed hairpins to two different types of twisting.

A stator or rotor core of a radial magnetic flux electric machine is essentially a ring having two flat faces and two cylindrical surfaces, having generators perpendicular to the two flat faces parallel to the rotation axis of the rotor of the electric machine. The radial, circumferential and axial directions hereinafter refer to the latter axis, unless otherwise specified. One of the two cylindrical surfaces is adjacent, at least in part, to the air gap of the electric machine, to which said stator or rotor belongs and defines a set of slots, in which the straight parts of the winding are housed. The two flat surfaces are divided into the insertion surface or side and the surface or side opposite to the insertion side. The parts of the winding protruding from said core are referred to as heads. The ends of the free portions of the hairpins, which are mainly subject to welding, belong to the head protruding from the side opposite to the insertion side. If protruding portions connected in a bridge-like manner with the legs inserted into the stator slots are present in the winding, they belong to the head protruding from the insertion side. The portions protruding from the insertion side, whether free or connected in a bridge-like manner, are indicated hereafter as portions protruding from the insertion side.

The stator or rotor core region between one slot and an adjacent one is referred to as a tooth. The number of teeth is equal to the number of slots. The connection part of the teeth of the core is referred to as a yoke, which defines a portion of each slot and is located relative thereto on the side opposite to the slot opening on the air gap of the machine.

The slot can be divided into an array of positions in each of which a leg of a hairpin can be placed. The hairpins housed in the same radial position as the slots define a so-called winding layer.

In a first type of twisting, also referred to as an "insertion side twisting", the preformed hairpins are appropriately inserted into special radially aligned pockets or "slots", which are obtained in a twisting device adapted to deform such hairpins after insertion. The twisting device is basically used to "spread" the legs of the "U" or "P" shape so that the two legs of each hairpin, after removing the latter from the twisting device, can be successively inserted into a corresponding pair of slots of a stator core, which are mutually angularly offset by a predetermined distance, substantially equal to the angular distance between the slots, into which the legs are then inserted and radially spaced apart by the radial distance between the slot positions respectively occupied by the legs.

Starting from a preformed hairpin, for example, but not exclusively, as shown in FIG. 1(a), a hairpin of a suitable shape for the insertion thereof into the stator (or rotor) is formed by widening the legs 255a, 255b and shaping the bridge-like connector 255c, e.g., to obtain the shape in FIG. 1(b). Reference numeral 255p indicates the pitch of the hairpin, i.e., the linear distance or the angular distance, or the distance in terms of slot pitches, between the legs. It is worth noting that in this case, the central top 255c2 of the formed hairpin is the hairpin where the section of the pin is subjected to a 180° rotation with respect to the median surface of the hairpin (the surface passing inside the hairpin and including the two legs). Such a rotation is useful in some layered hairpins, which will be defined hereafter in order to transpose the layers (exchange of slot positions) thus reducing eddy currents circulating through the ends of the layers when they are welded together, compared with the case in which the same layers run parallel without exchanging the slot position in the transition from one leg to the other.

The patent application published under US 2009/0178270 describes an example of a twisting method from the insertion side for twisting, at a uniform pitch, the preformed bar pins after inserting them into the pockets of a twisting device, in which the hairpins have a rectangular section.

According to the prior art and with reference to FIG. 2, the hairpins can also be obtained by stamping, a process in which a straight pin is pressed against a contrast with a punch and die type system. FIG. 2(a) shows such a stamped pin; it does not have a cross-section which rotates relative to the median surface of the hairpin.

This stamped hairpin or also a preformed and spread hairpin, obtained as described above, can be subjected to the so-called "welding side twisting", in which case it is possible to introduce a "step-like" shape of the protruding portions of the legs 255a and 255b, in which, for example, the leg 255a has a first straight portion 255a1, a step-like portion 255a2 and a second straight portion 255a3 (substantially corresponding to portion 255aE in FIG. 1) as in FIG. 2(b).

With reference to FIG. 3, the shape of the protruding portion on the insertion side, i.e., of the bridge-like connector 255c, for a stamped hairpin, can comprise three portions 255c1, 255c3, and 255c2 starting from the connection to the second leg 255b and finishing at the connection to the first leg 255a (hidden from view in FIG. 3). The portion 255c1 has a main extension direction B and a curvature radius RB, the portion 255c3 has a main extension direction A and a curvature radius RA, the portion 255c2 has a main extension direction C (and possibly a curvature thereof, not indicated). Hereafter, the portion 255c2 is referred to as the "layer change bend"; indeed, by virtue thereof, the head and leg portions of the hairpins are on different layers when they are inserted into the respective slots of the stator pack. Reference $\alpha_1$ indicates the angle between the directions A and C, reference $\alpha_2$ indicates the angle between directions A and B and reference $\alpha_3$ indicates the angle between directions B and C, equal to the sum of the angles $\alpha_1$ and $\alpha_2$. This is only one of the final possible shapes of a hairpin, all other shapes with different portions and conformations of both the bridge-like portion and the legs can be used with the apparatus and a method according to the present description.

There are also pins referred to as "reverse" pins (not shown), and they are hairpins with a bending direction in the bridge-like connector opposite to that of most of the hairpins, forming the same winding. These are used for passing from the last layer of a crown to the first of the next crown.

Furthermore, and with reference to FIG. 4A, there is a layered ("stranded") hairpin with a reversal of the cross-section at the bending point (FIG. 4A(a)), which causes the exchange of the position occupied by the layers. As can be seen from the type of hatching of the cross-sections in FIG. 4A(a), by virtue of said reversal or exchange of position, the upper layer in the pair of layers in the left slot is below the other one in the right slot. In another hairpin form, the transposition can be continuous along the portions of the hairpin housed in the slot (FIG. 4A(b); U.S. Pat. No. 3,837,072). The variant shown in FIG. 4B is a layered hairpin free devoid of reversal, shown in U.S. Pat. No. 8,552,611 B2. FIG. 4C (obtained from FIG. 6 of U.S. Pat. No. 6,894,417 B2) shows the variants of the arrangement of the legs of the layered hairpins in a double-crown winding in different positions in the slot. Reference letters A and B indicate the crown to which the legs shown in the slot belong (belonging to different hairpins).

Furthermore, there are pins referred to as "I-pins", i.e., a pin to be housed in a single slot and, when in the slot, having the portions with free ends protruding from both flat faces of the stator core. FIG. 4D shows an example of an I-pin, which does not necessarily have to have all the direction changes shown, it can also have none, and be bent on the output side of a hairpin winding assembly drum. The ends of the I-pin can be welded to ends of other pins protruding from the slots or to third-party elements (e.g., bus bars, eyelets) or they can serve as phase terminals. The portions can be subject to "welding side" type bending. An example of an I-pin can be found in the hairpins indicated with references 81-83 in document U.S. Pat. No. 7,622,843B2. "W-shaped pins" are also known, see, again, U.S. Pat. No. 7,622,843 B2 for example, and FIG. 4E. A W-shaped pin can be formed by welding a stamped hairpin with an I-pin or by welding a fourth pin with the three I-pins. Once again, the W-pin does not necessarily have to have all the direction changes shown, it can also have none, and be bent on the output side of the hairpin winding assembly drum.

With illustrative reference to FIG. 4F (obtained from U.S. Ser. No. 10/749,399B2), there is also the so-called "inversion hairpin," i.e., a hairpin, which can be formed by spreading the legs (not with the insertion-side twisting method described above) or stamped with "press and die" systems, characterized in that the legs in the respective slots occupy the same radial position, i.e., they belong to the same layer. Therefore, the ends thereof on the twisting side will be bent in the same direction. Actually, the protruding portions on the side of the bridge-like connector can be bent in the same tangential direction or they can take a V shape. At least two layer change bends can be required on the connector portion.

Finally, there are pairs of hairpins whose homologous legs belong to different layers (FIG. 4G) or to the same layer (FIG. 4H) and they are configured and dimensioned to be overlapping.

Hereafter, all the above hairpin types and the I-pins and W-pins will be included in the definition of "hairpins".

After being subjected to the first type of twisting or after being stamped, the hairpins are typically pre-assembled in a winding set, as mentioned above. The pre-assembly apparatus will have a set of slots, generally in number equal to the slots of the stator associated with the winding, into which the legs of each hairpin are to be inserted, and it will generally be different from the twisting device.

The winding set is then inserted in bulk into the slots of the stator core through a first side thereof (so-called "insertion side" or "insertion face") with the respective free portions protruding from a second side of the core (so-called "welding side" or "connection side" or "welding face" or "escaping face") opposite to the first side.

Based on the specific winding pattern to be obtained, the free portions of the hairpins protruding from the side opposite to the insertion side can thus be subjected to a second type of twisting, also referred to as "twisting from the welding side", e.g., after being inserted into pockets made in an appropriate twisting fixture. The twisting fixture herein has the purpose of bending or twisting the free portions of the pins to appropriately shape such free portions and consequently allow performing the appropriate electric connections between the pins to complete the winding. Patent application published under number US 2009/0302705 describes an example of a twisting method on the welding side of the type discussed above.

Assembly systems of electric windings for stators and/or rotors are known. The assembling, also further on in the present description, is understood to mean the creation of electrical windings from a set of pins, the electrical windings thus being ready to be transferred into a stator or into a rotor. The assembling can also take place directly on the stator or on the rotor.

In particular, the system is known in patent document WO 2019/215514 A1, which uses a hairpin inserter external to the winding containment means, but which does not move the hairpins radially and which must be placed straddling a sector, without the possibility of facilitating the automatic insertion of the last hairpin of a sector. Furthermore, the insertion of reverse pins and inversion pins is not considered in such a solution.

The system is also known in patent document WO 2018/039806 A2, which allows inserting the last hairpins of a winding (or of a winding sector) dividing the containment means into several arcs of a circle, which can rotate and open up with respect to one another. Such containment means are complex to make and the relative method of assembling the winding can only be applied to such containment means. Furthermore, such a solution requires more structures with respect to what is already known and widely used to obtain individual windings.

Patent document US 2020/336054 describes a system for assembling a winding group, in which the hairpins are directly inserted into the slots of the containment means, the hairpins then being moved by virtue of the guides directly integrated into the containment means, without the possibility of applying the system to other and more common containment means. Furthermore, the insertion of reverse pins and inversion pins is not considered in such a solution.

However, the need is nonetheless felt to assemble the winding all in one system, so as to insert it more easily into the stator pack, pursuing the time-cycle specifications, which are increasingly stringent today.

Scope and Object of the Present Description

It is the object of the present invention to provide a method and system for assembling a stator or rotor winding which completely or partially solves the problems and overcomes the drawbacks of the prior art.

The object of the present invention is a method and device for assembling a stator or rotor winding according to the appended claims.

Italian application priority N. 102021000032159 is incorporated herein for reference.

DETAILED DESCRIPTION OF EMBODIMENTS OF THE PRESENT DESCRIPTION LIST OF FIGURES

The description will now be described by way of non-limiting example, with particular reference to the figures in the accompanying drawings, in which.

Figure 6:
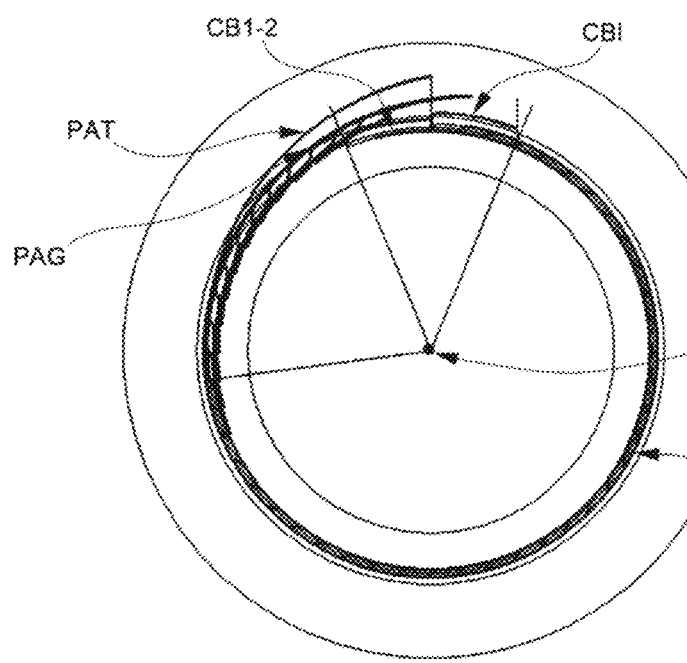
Figure 7:
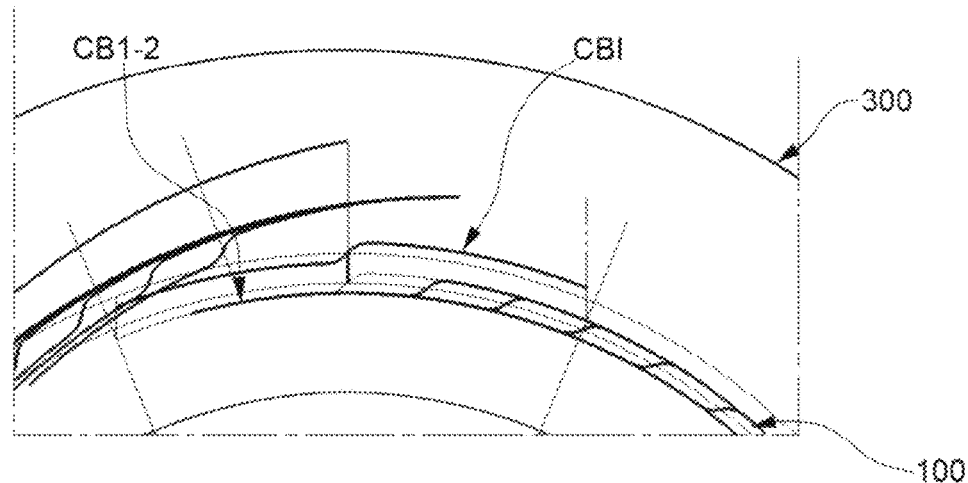
Figure 8:
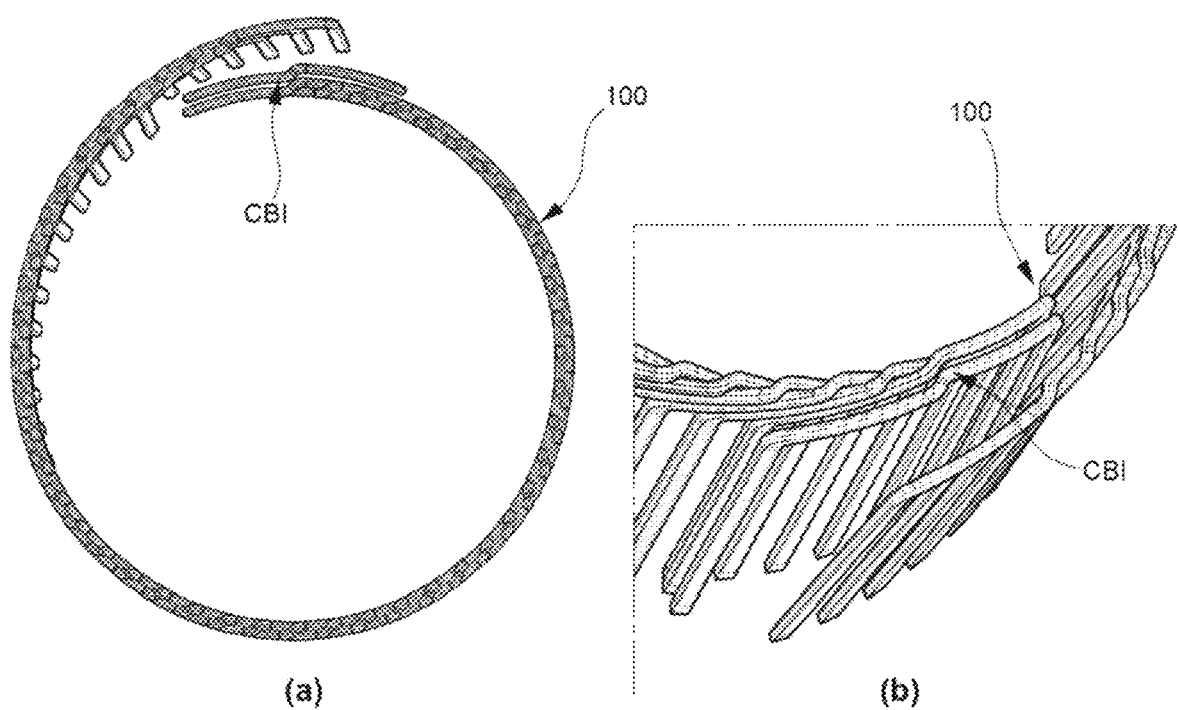
Figure 9A:
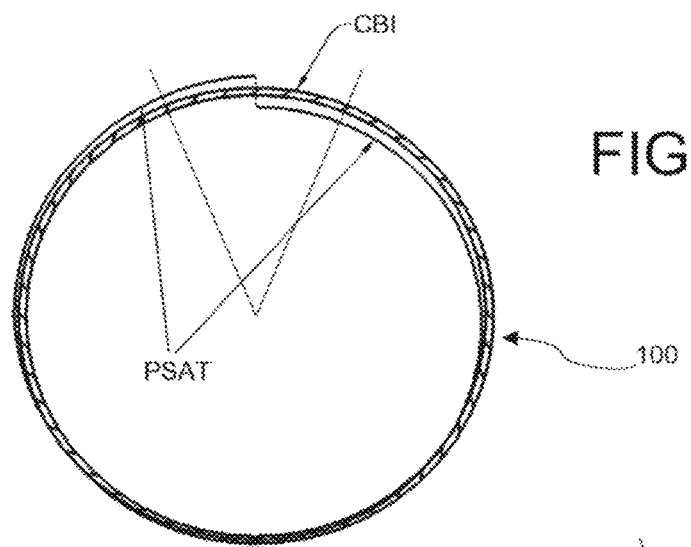
Figure 9B:
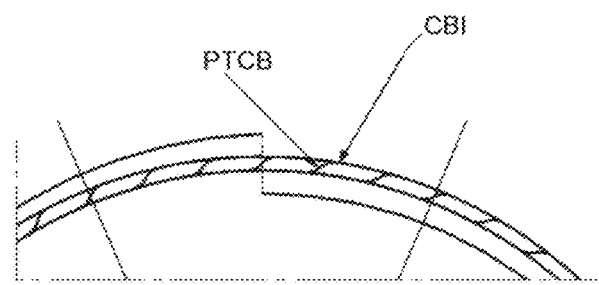
Figure 10:
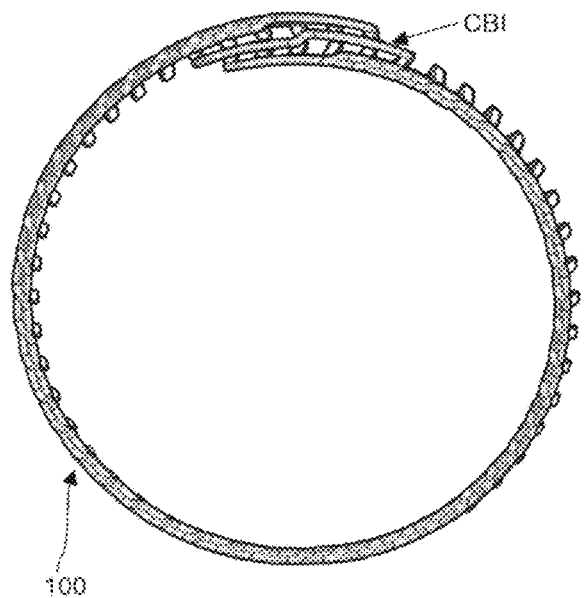
Figure 10:
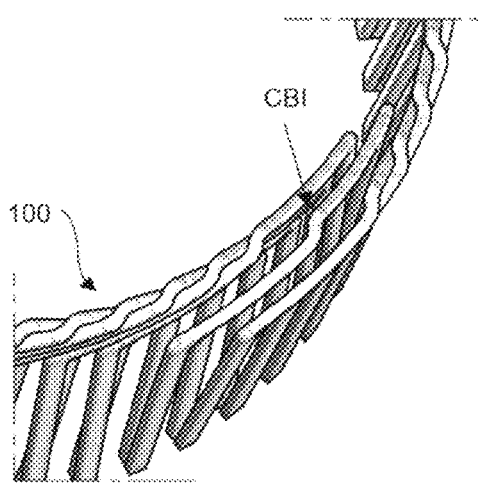
Figure 13:
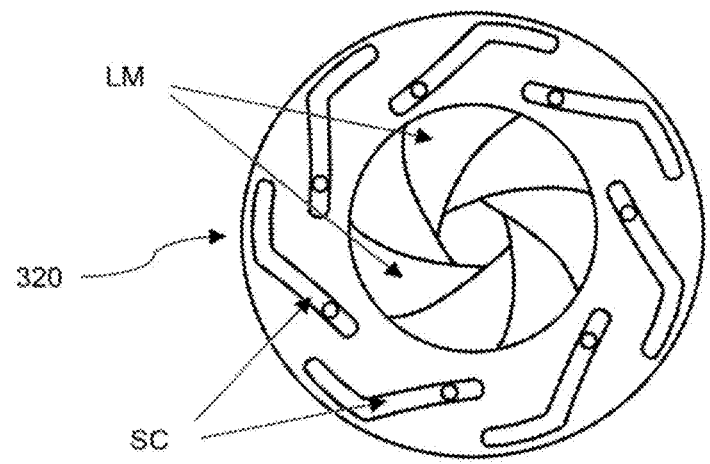
Figure 14:
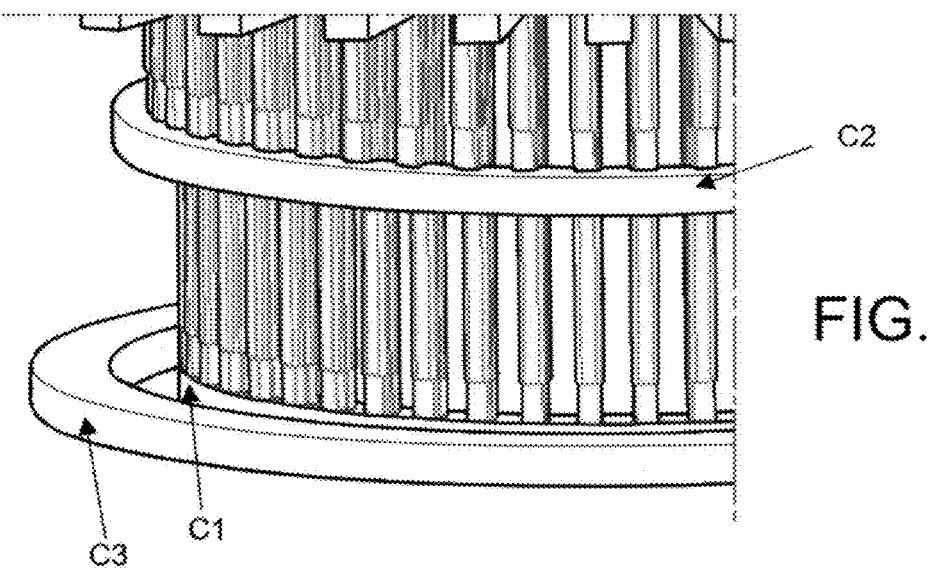
Figure 15:
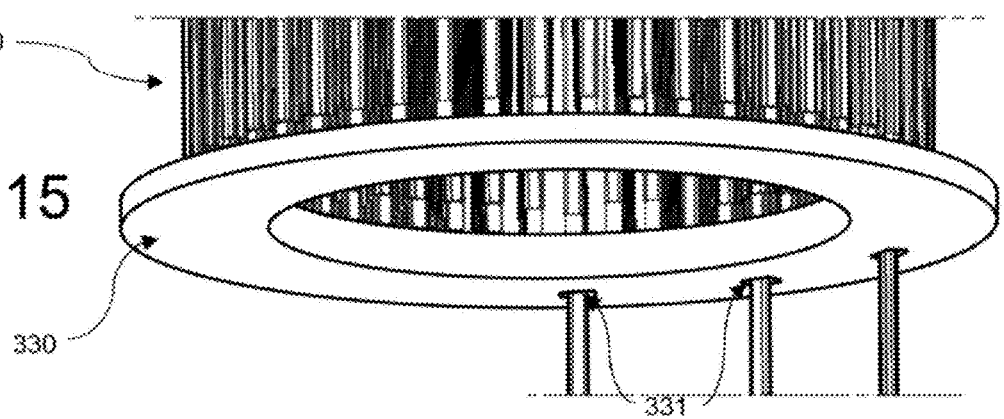
Figure 16:
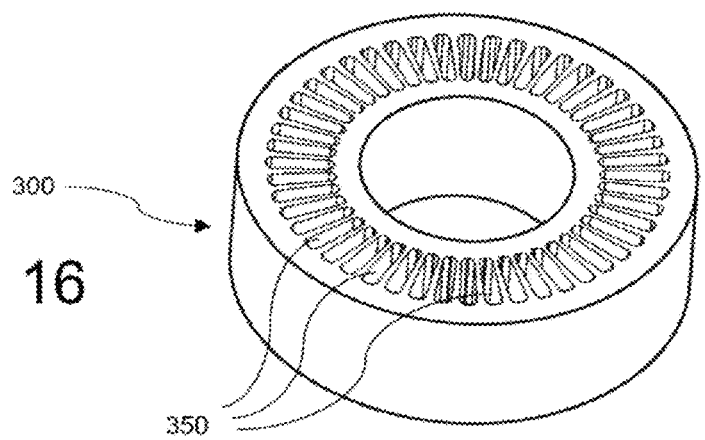
Figure 17:
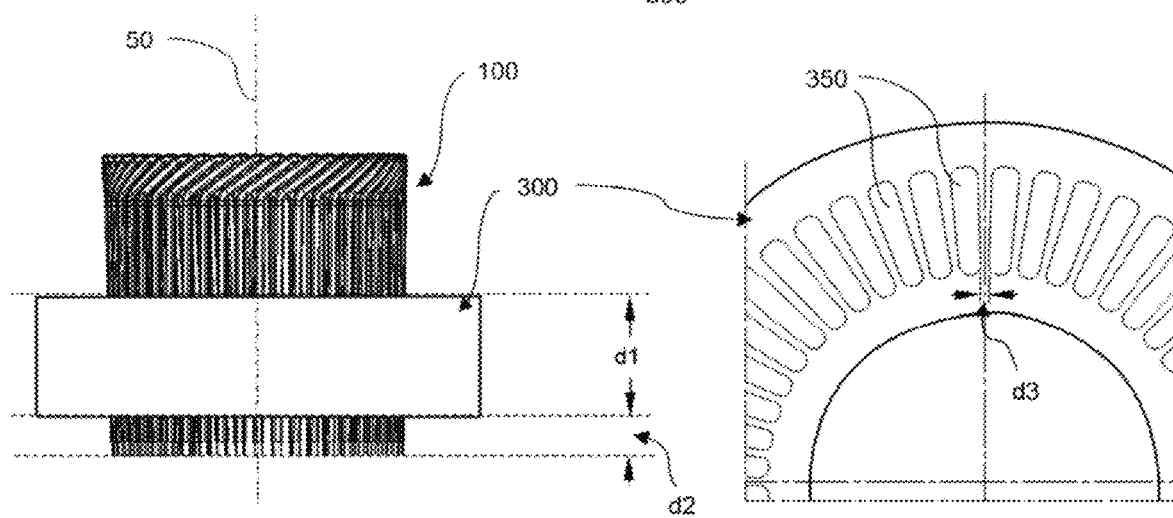
Figure 18:
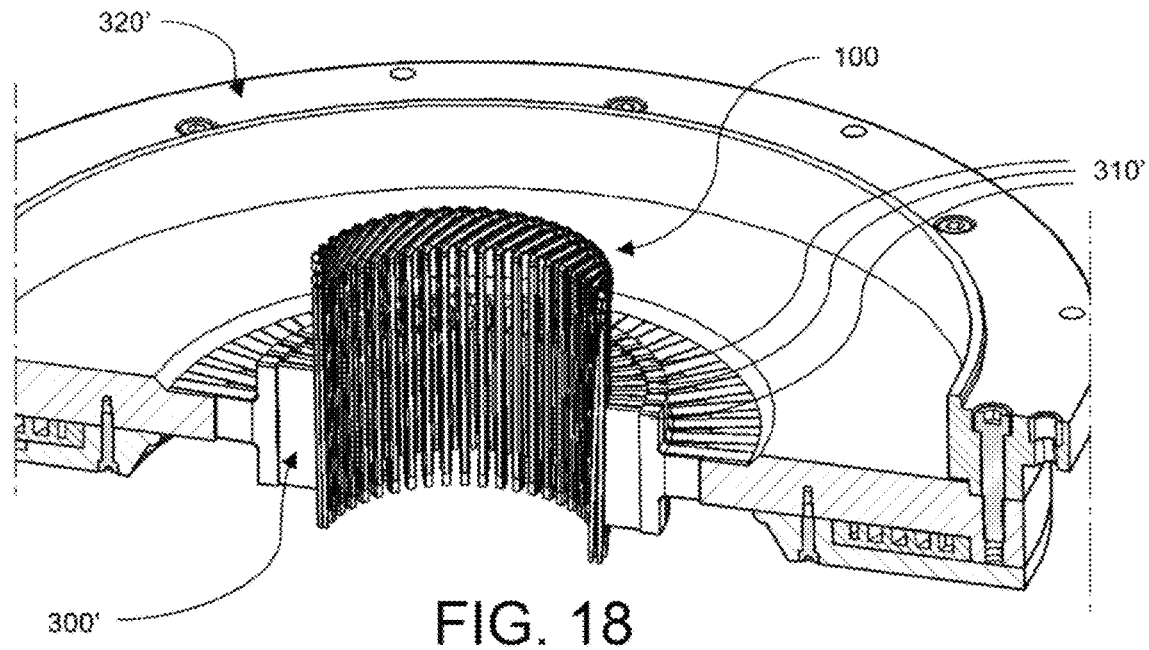
Figure 19:
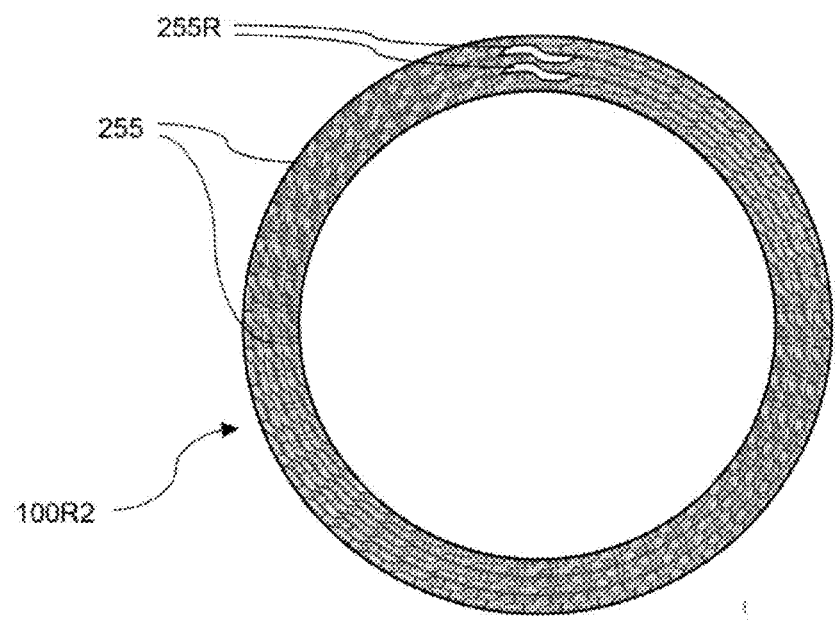
Figure 20:
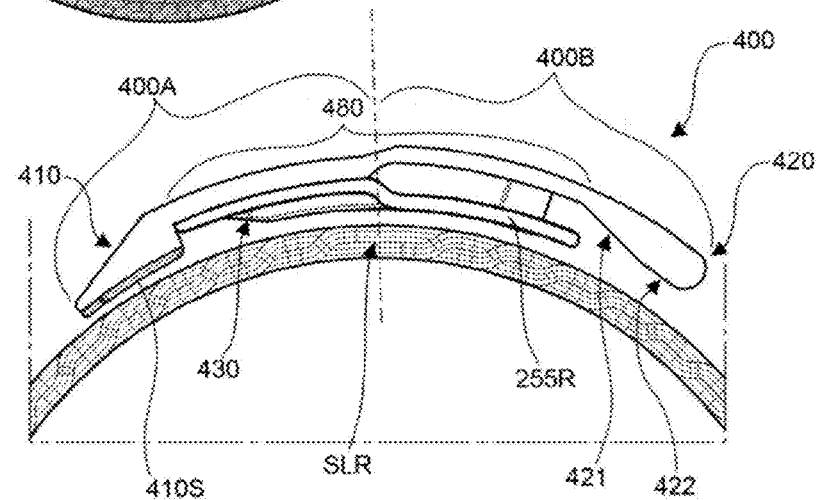
Figure 21:
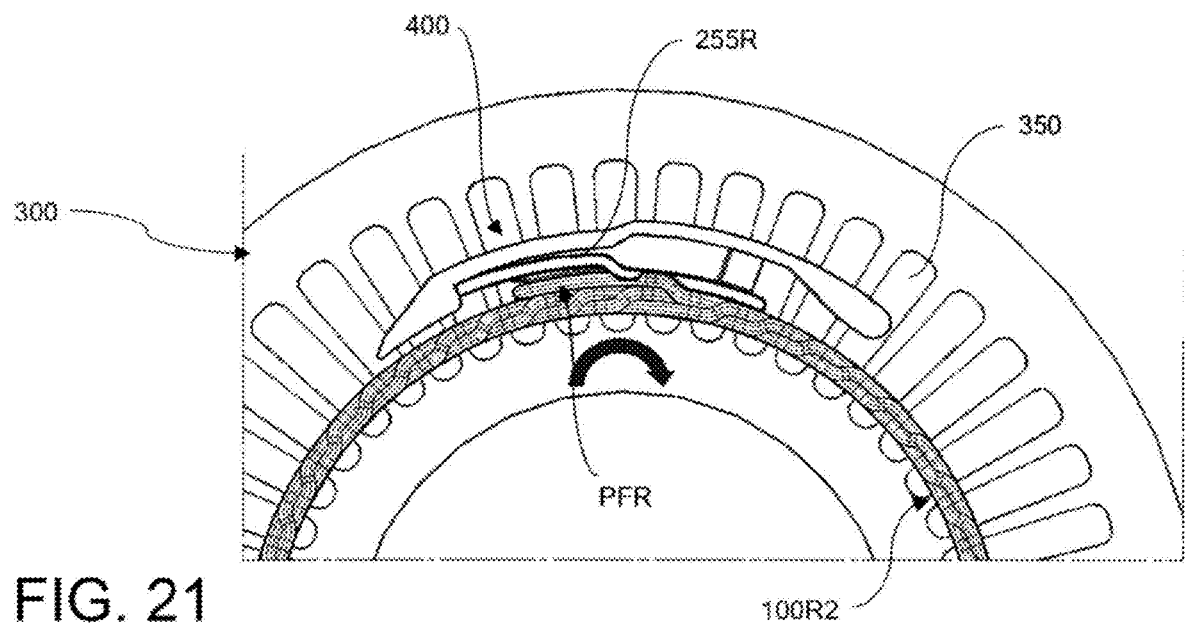
Figure 22:
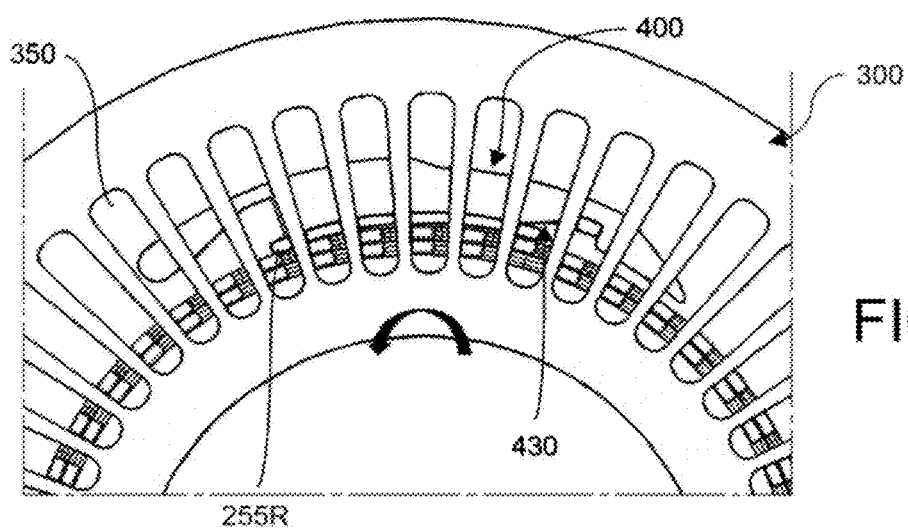
Figure 23:
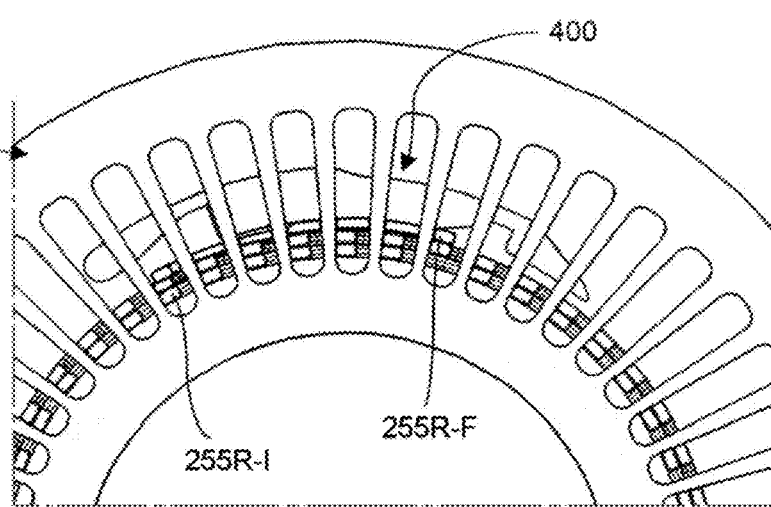
Figure 24:
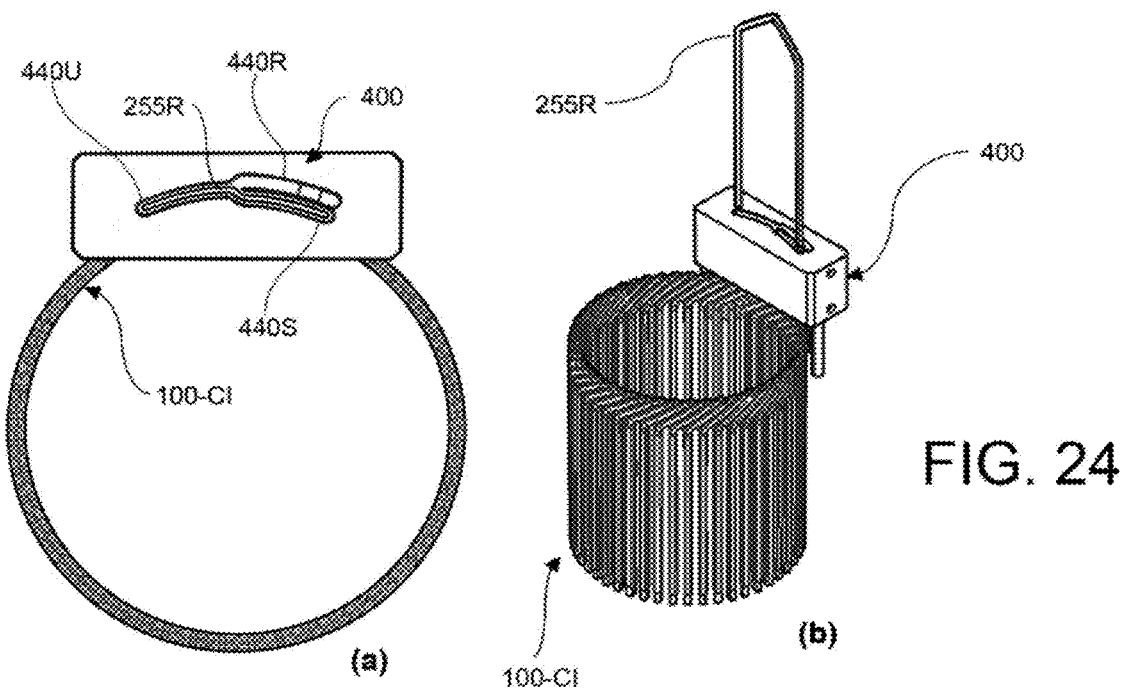
Figure 25:
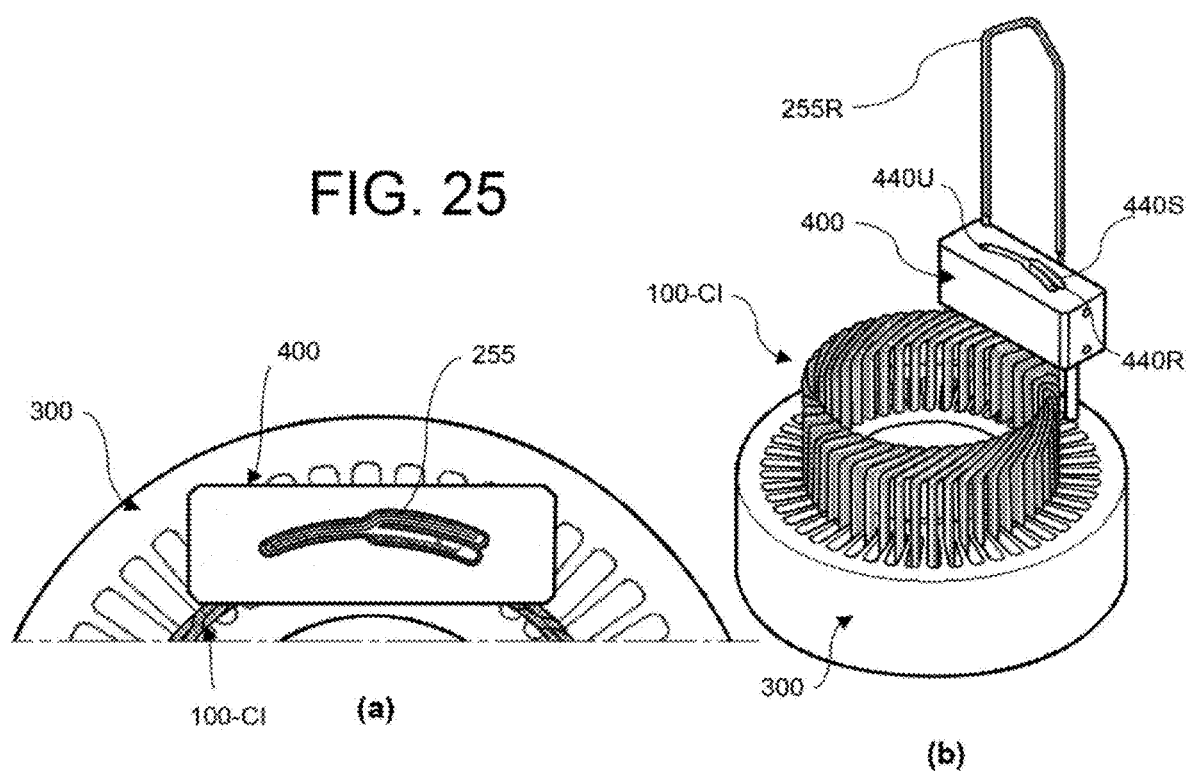
Figure 26:
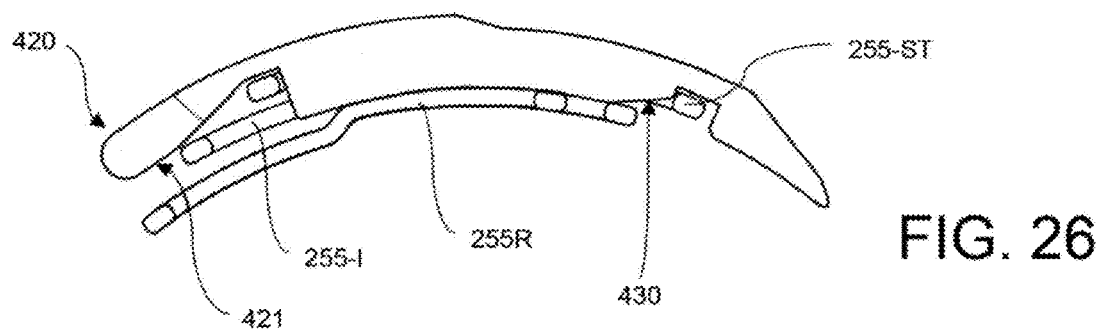
Figure 27:
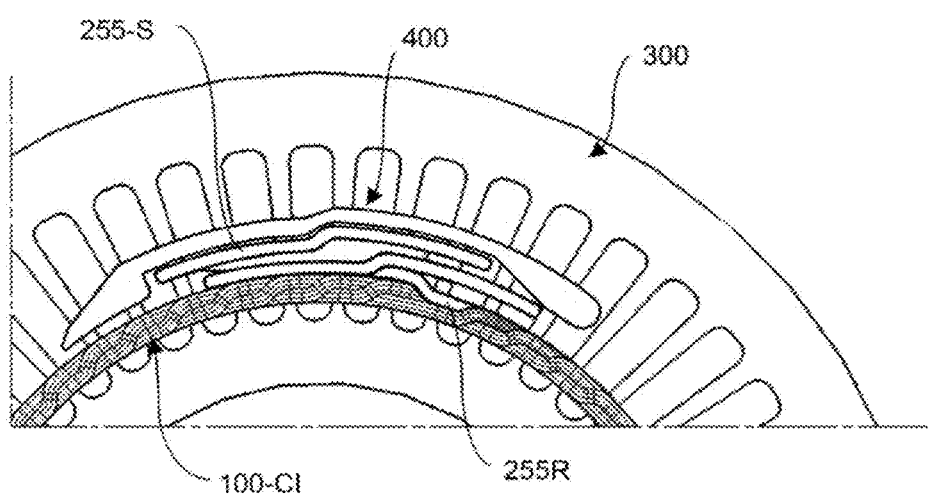
Figure 28:
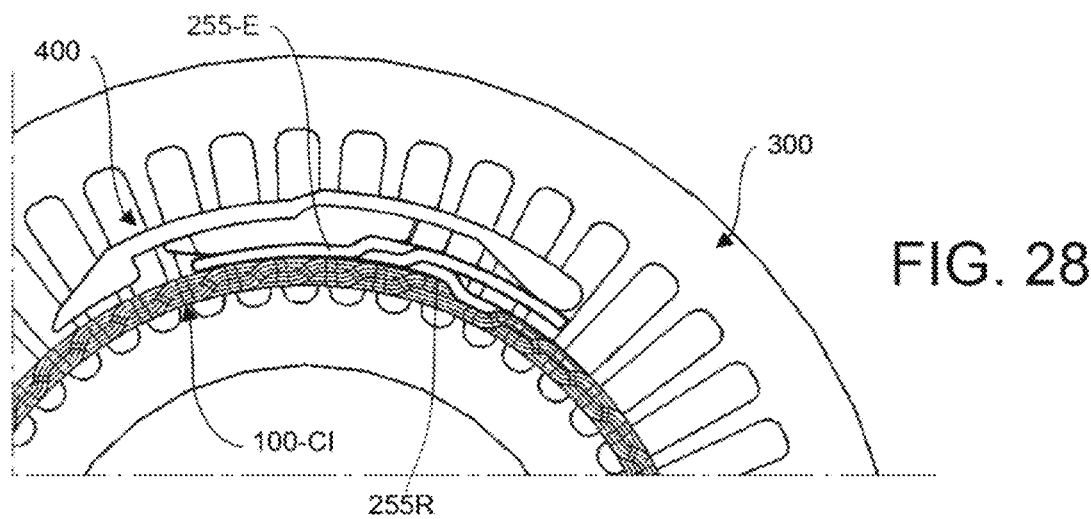
Figure 29:
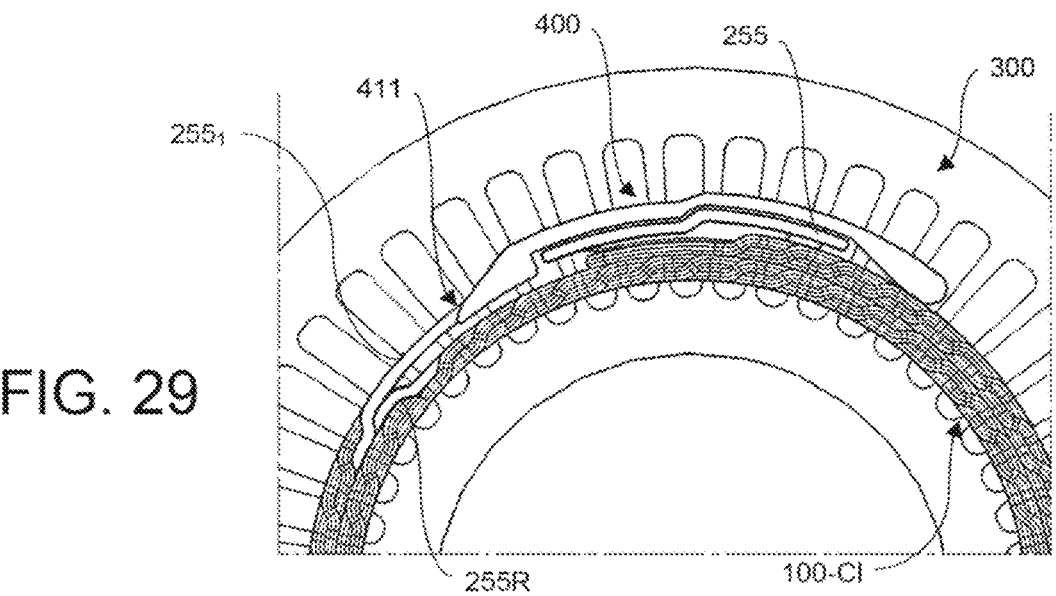
Figure 30:
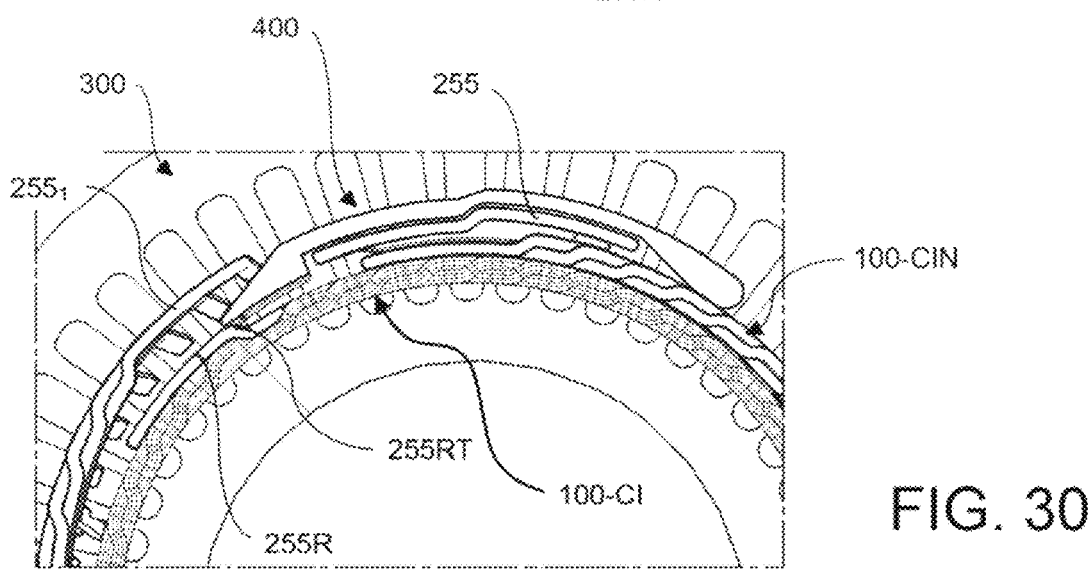
Figure 31:
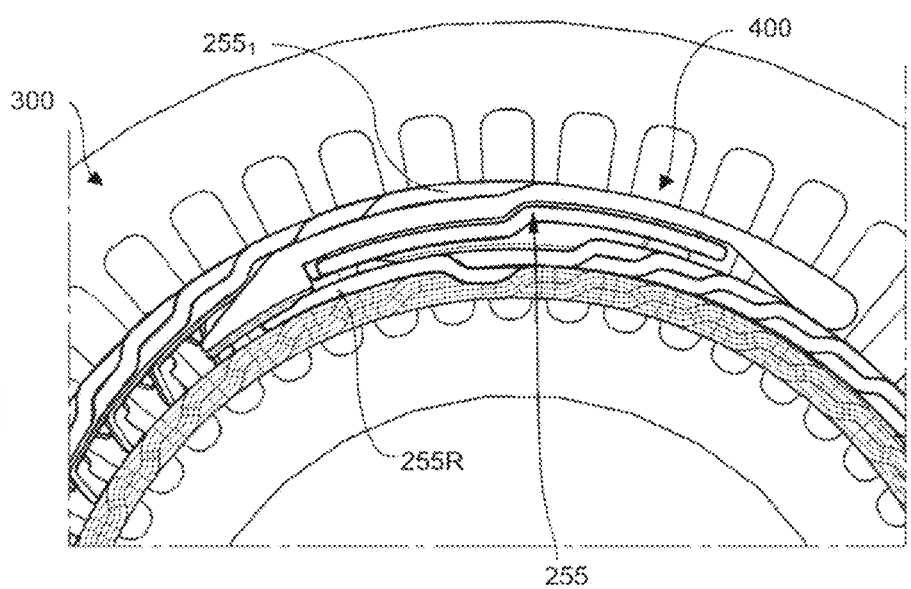
Figure 32:
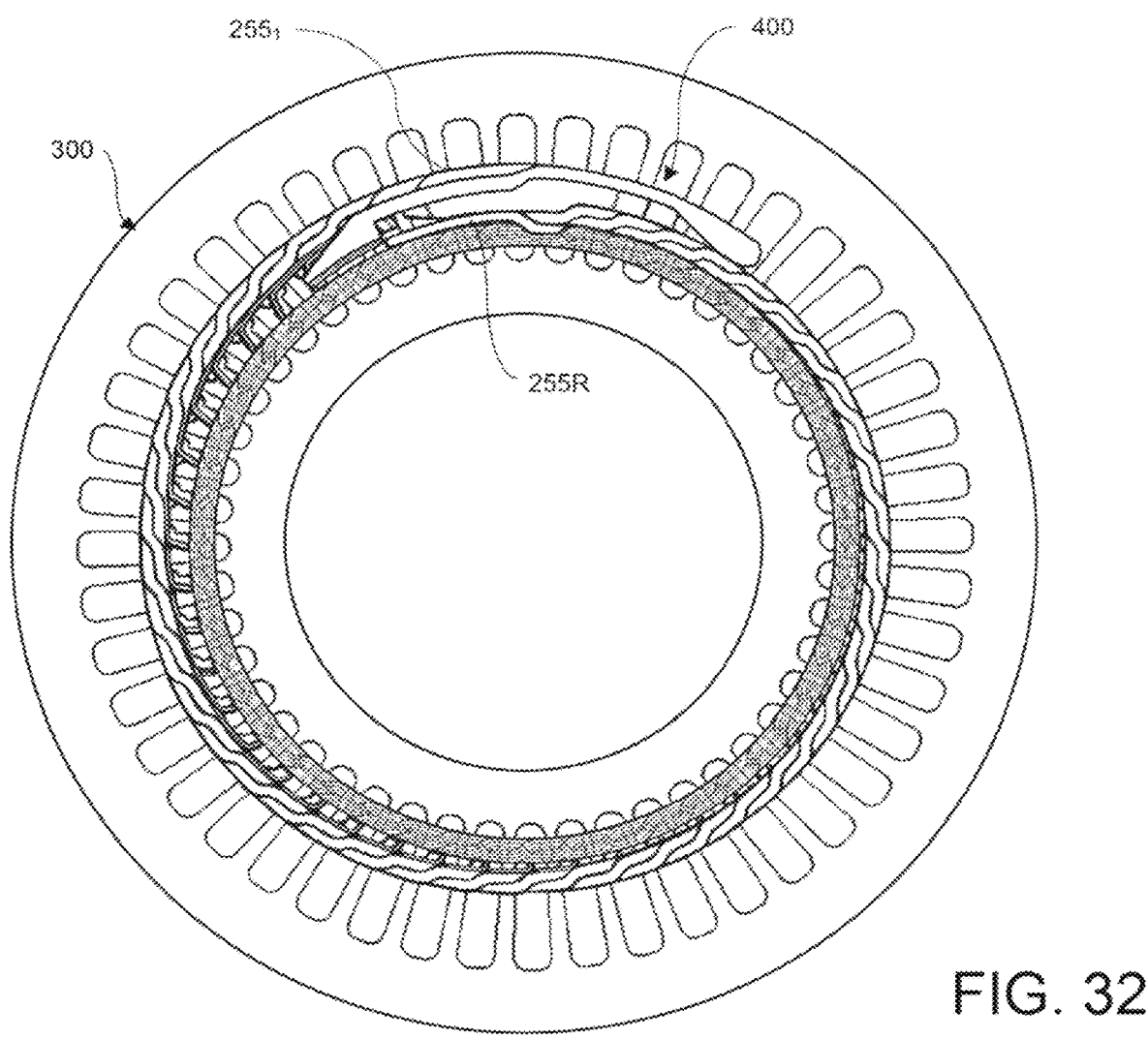
Figure 36:
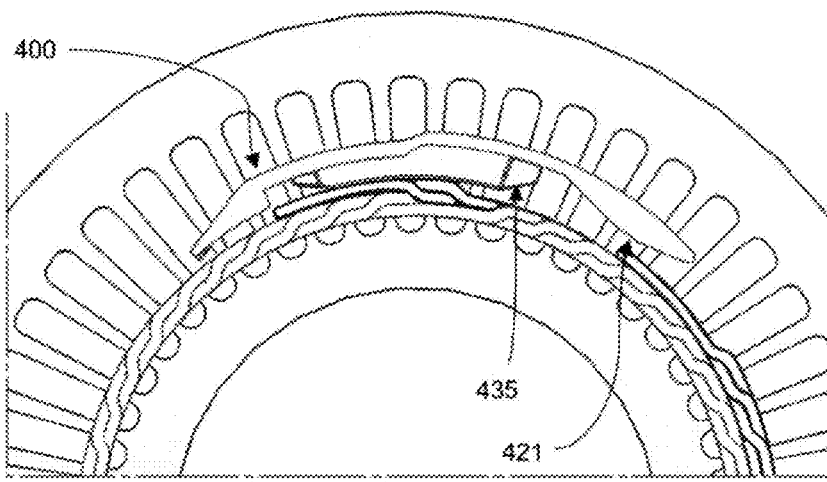
Figure 37:
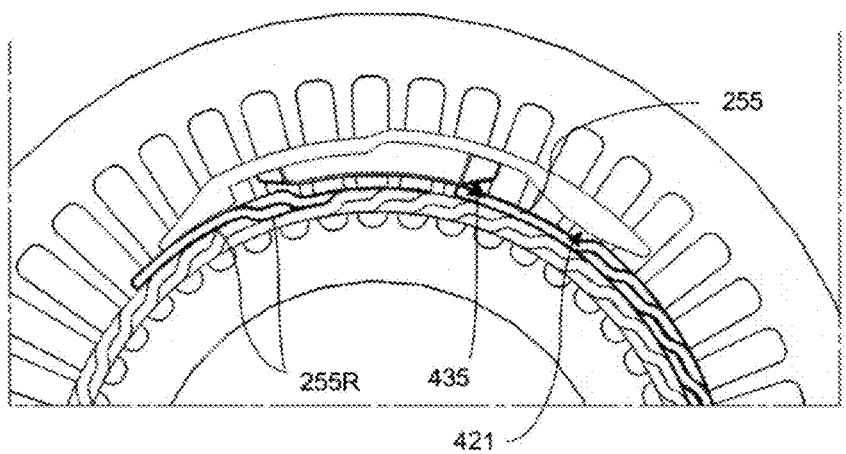
Figure 38:
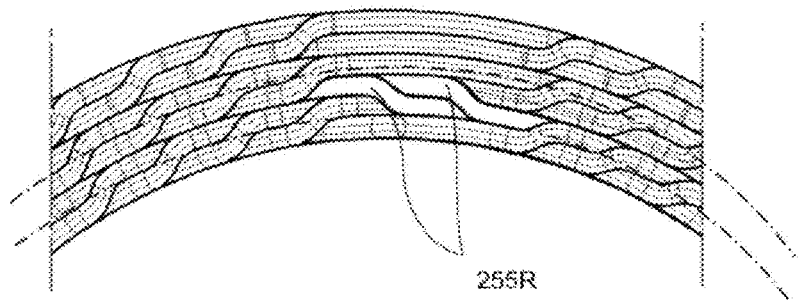
Figure 39:
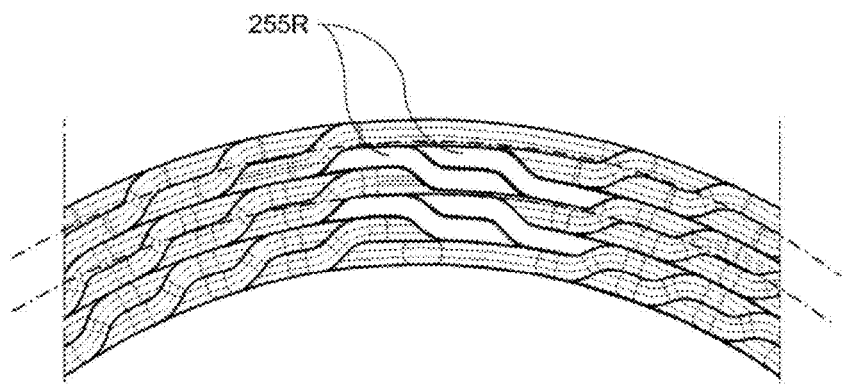
Figure 40:
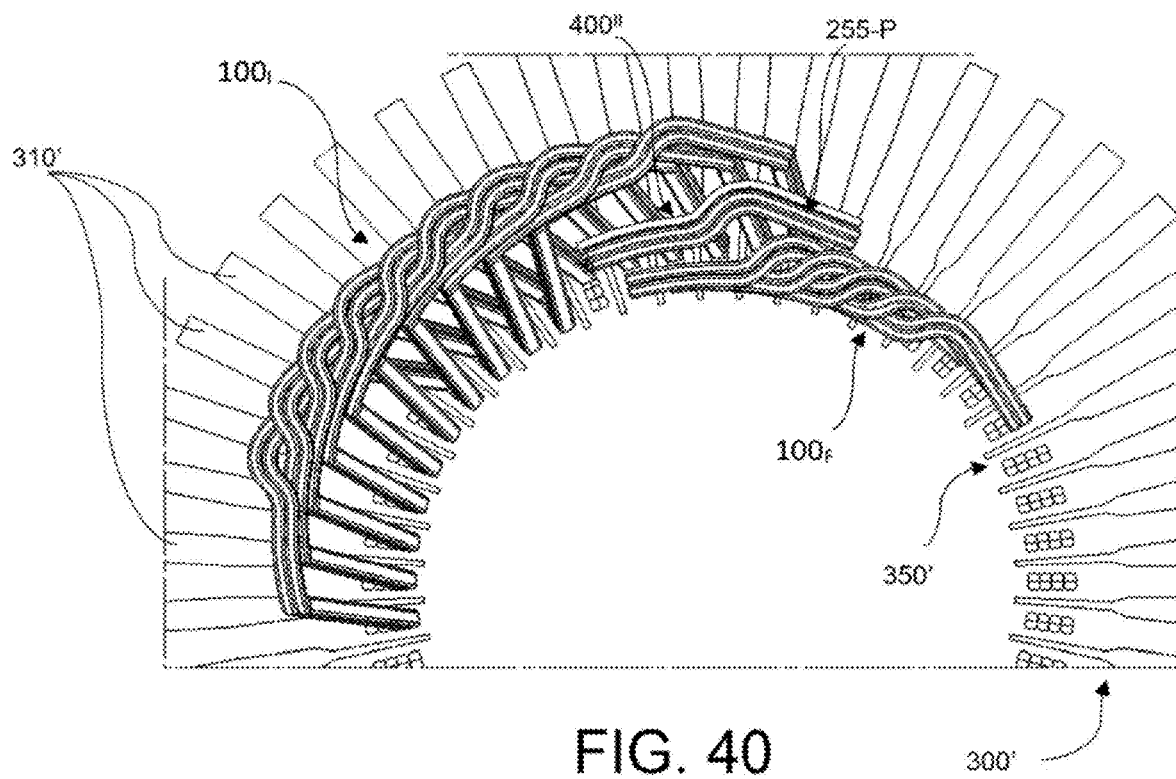
Figure 41:
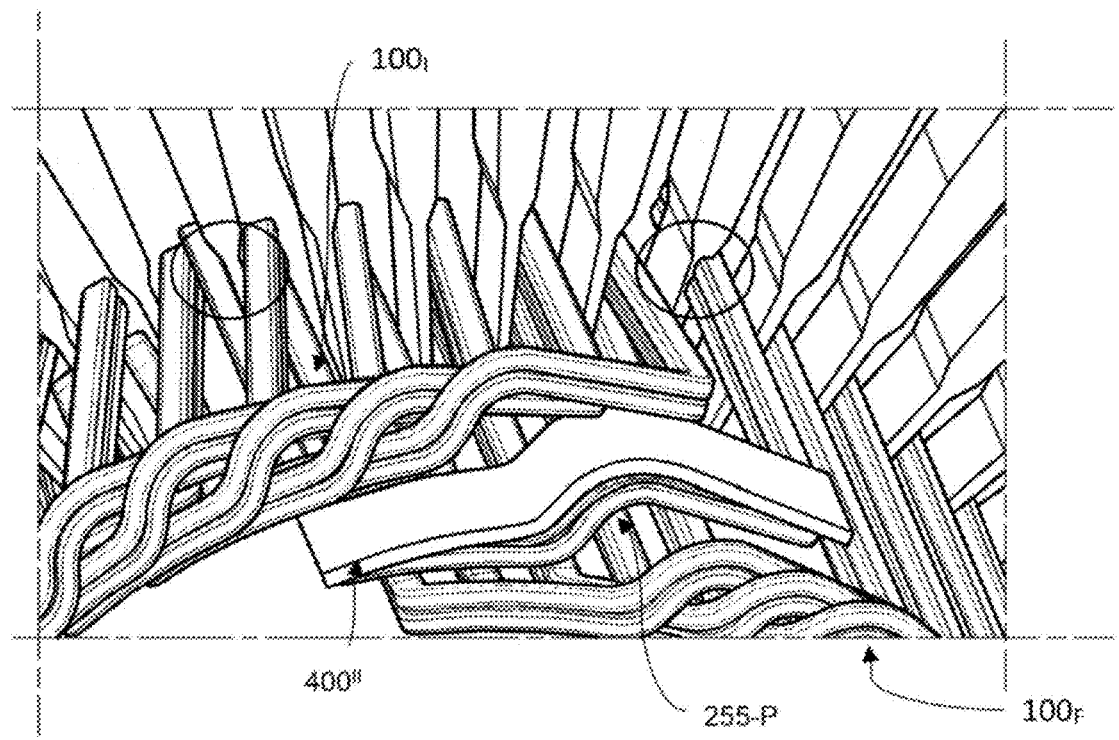
Figure 42:
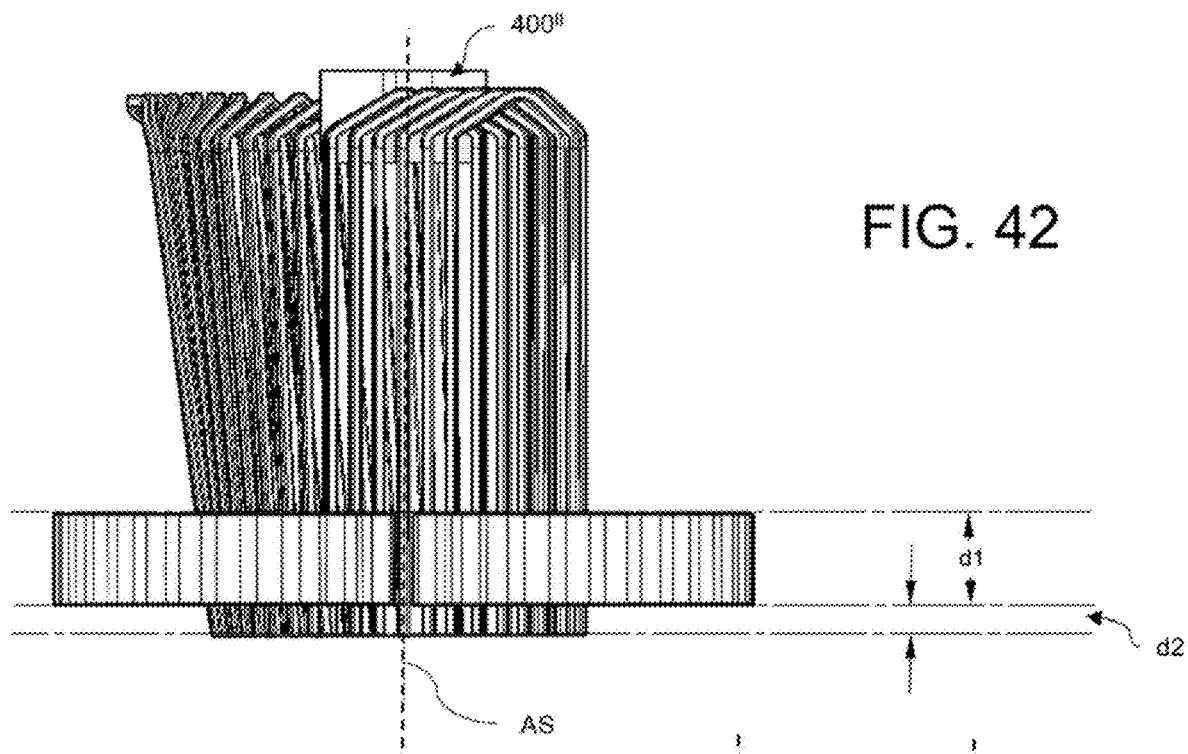
Figure 43:
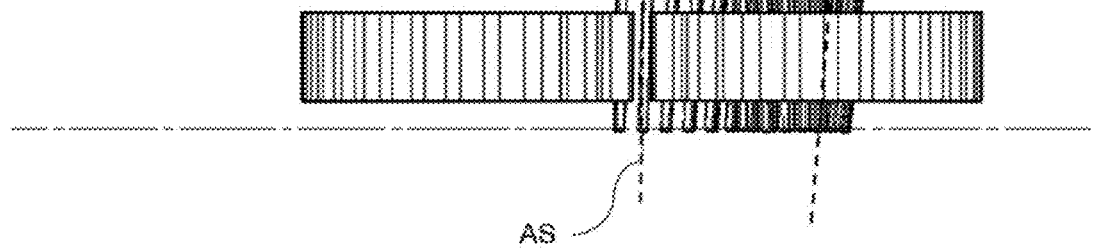
Figure 44:
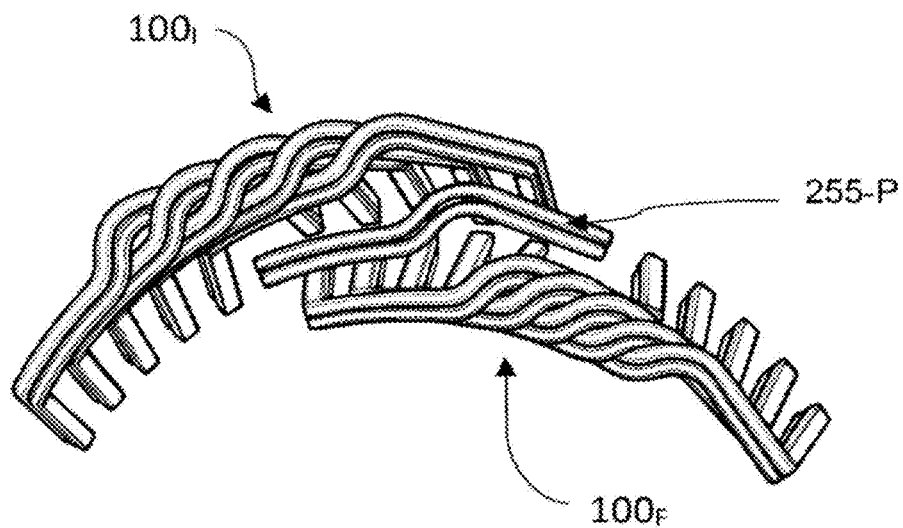
Figure 45:
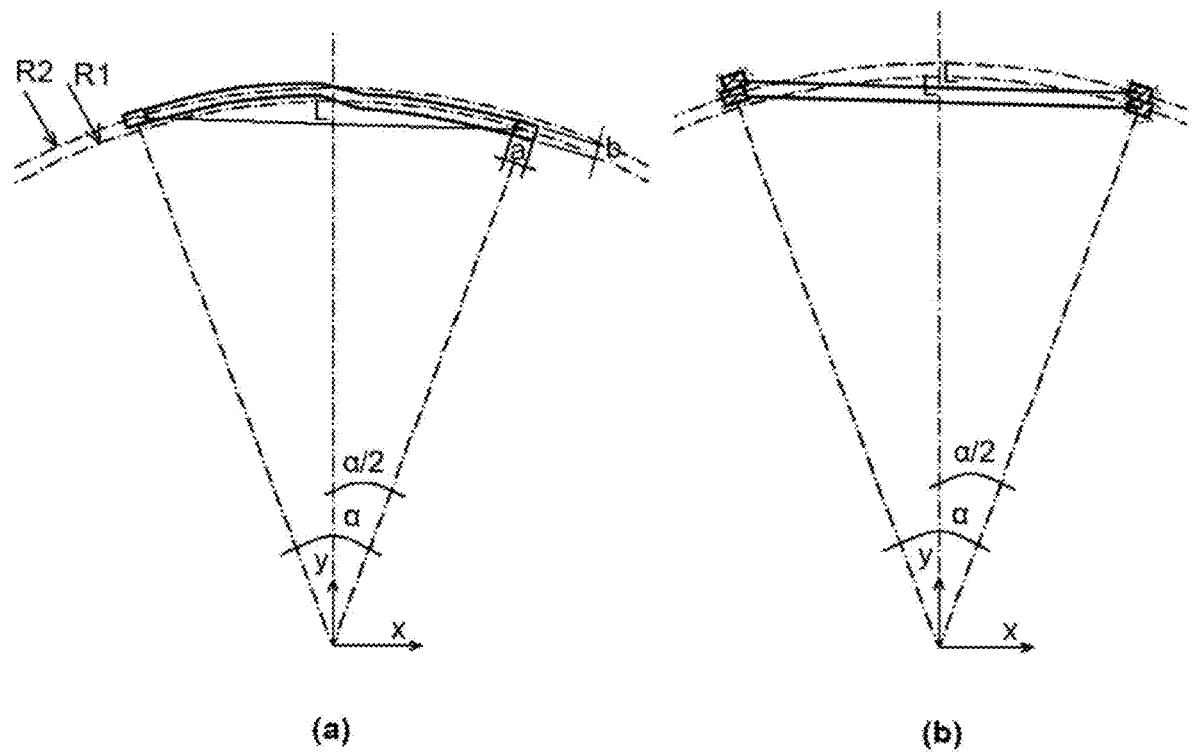
Figure 46:
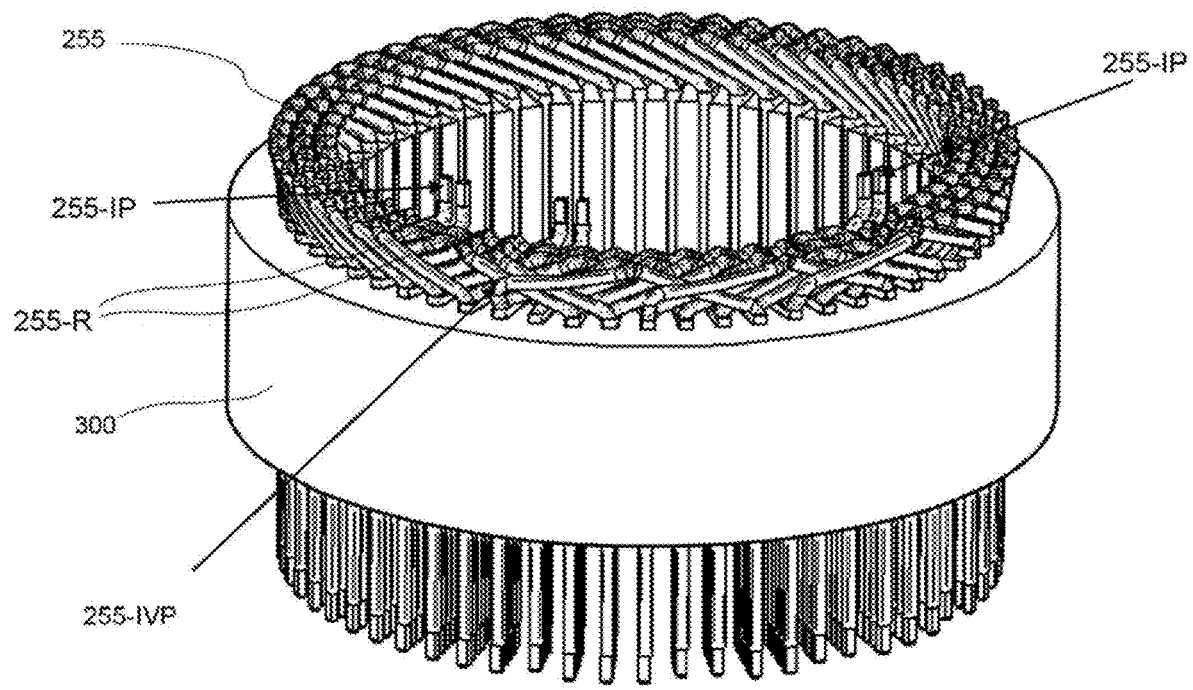
Figure 47:
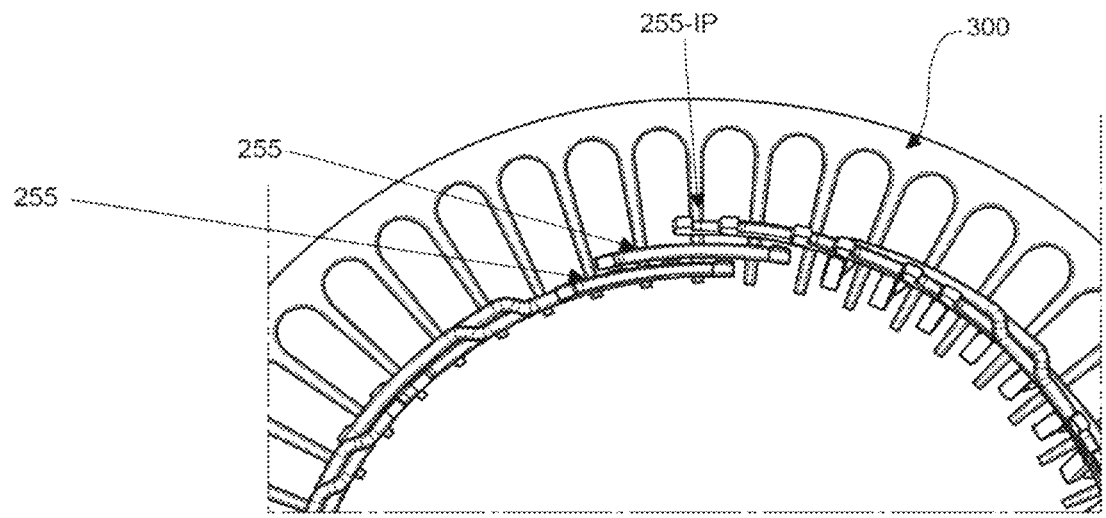
Figure 48:
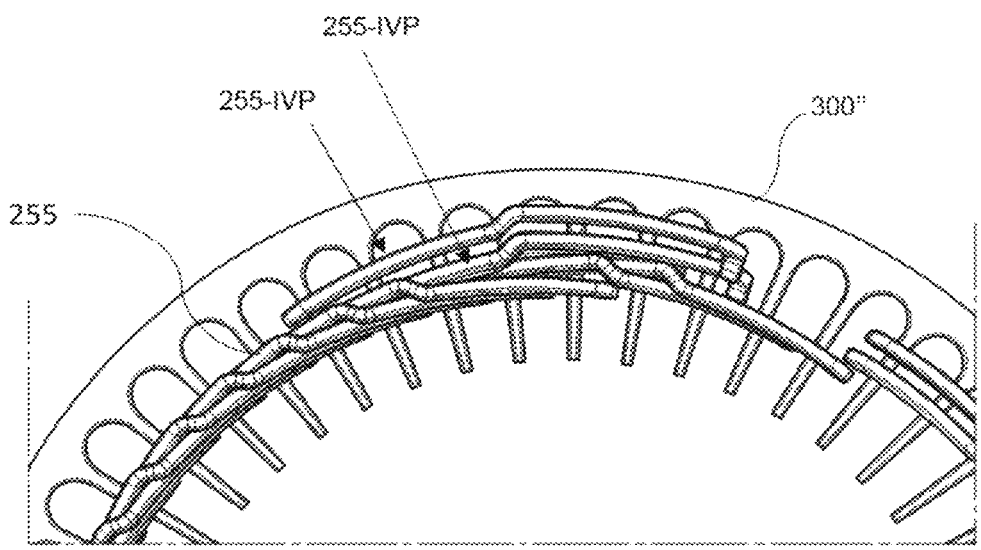
Figure 49:
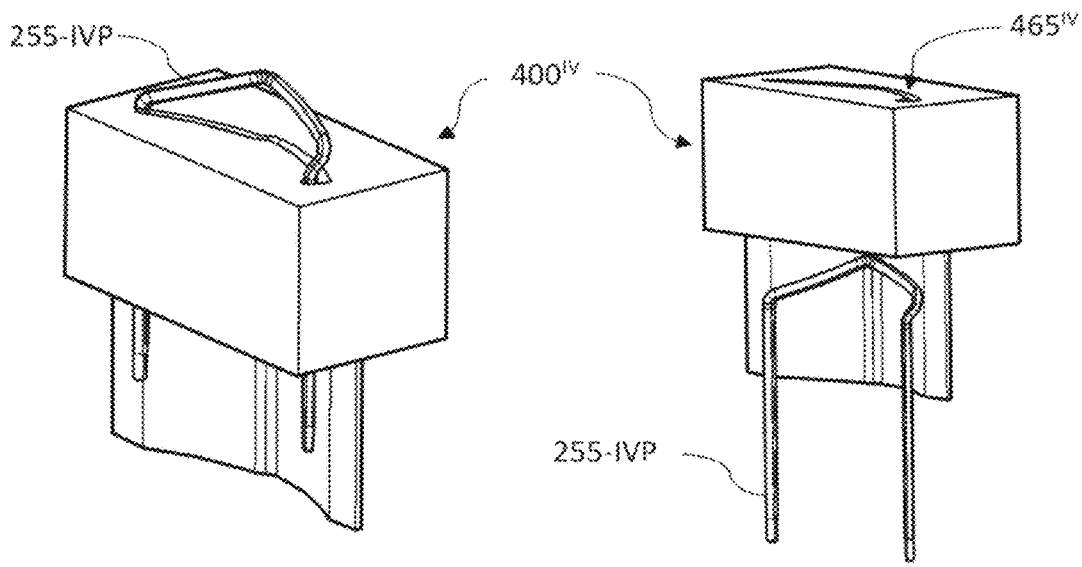
Figure 50:
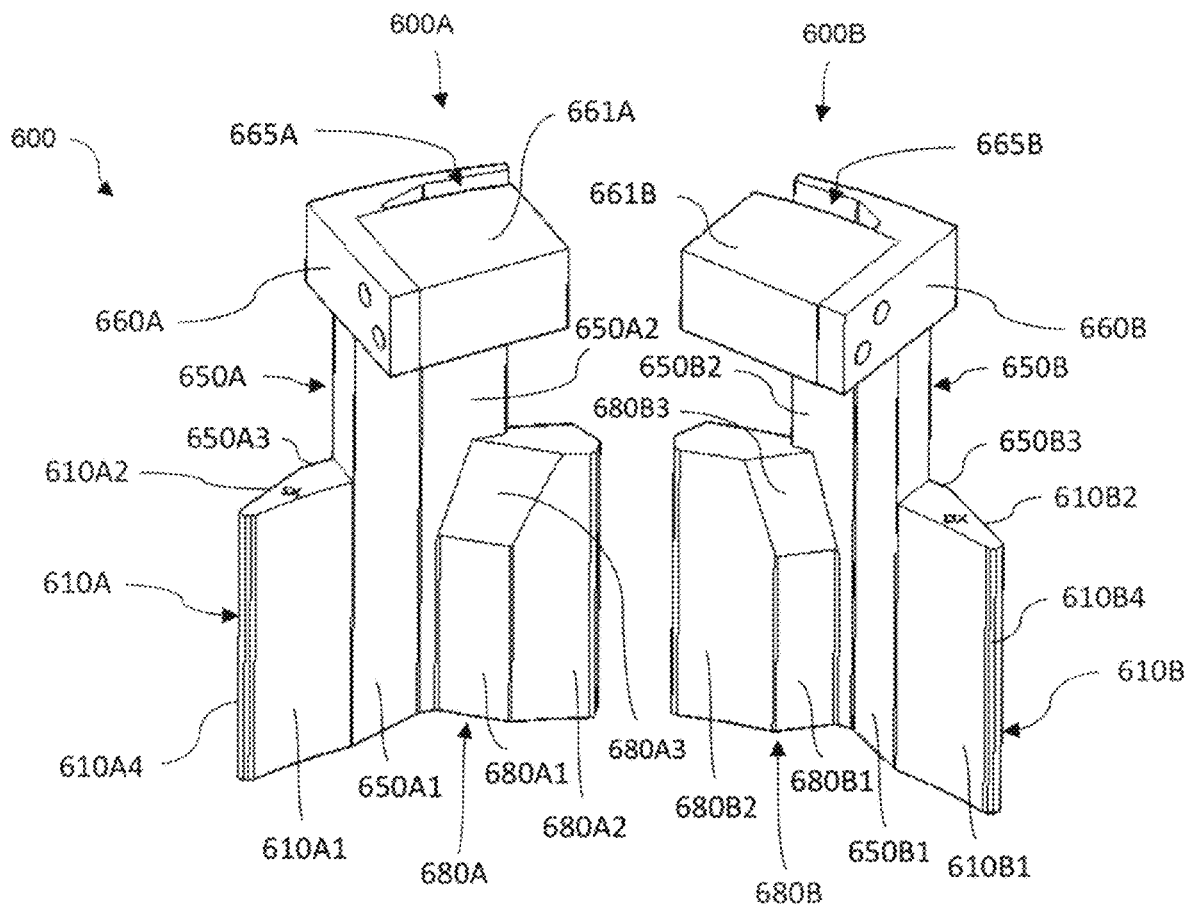
Figure 51:
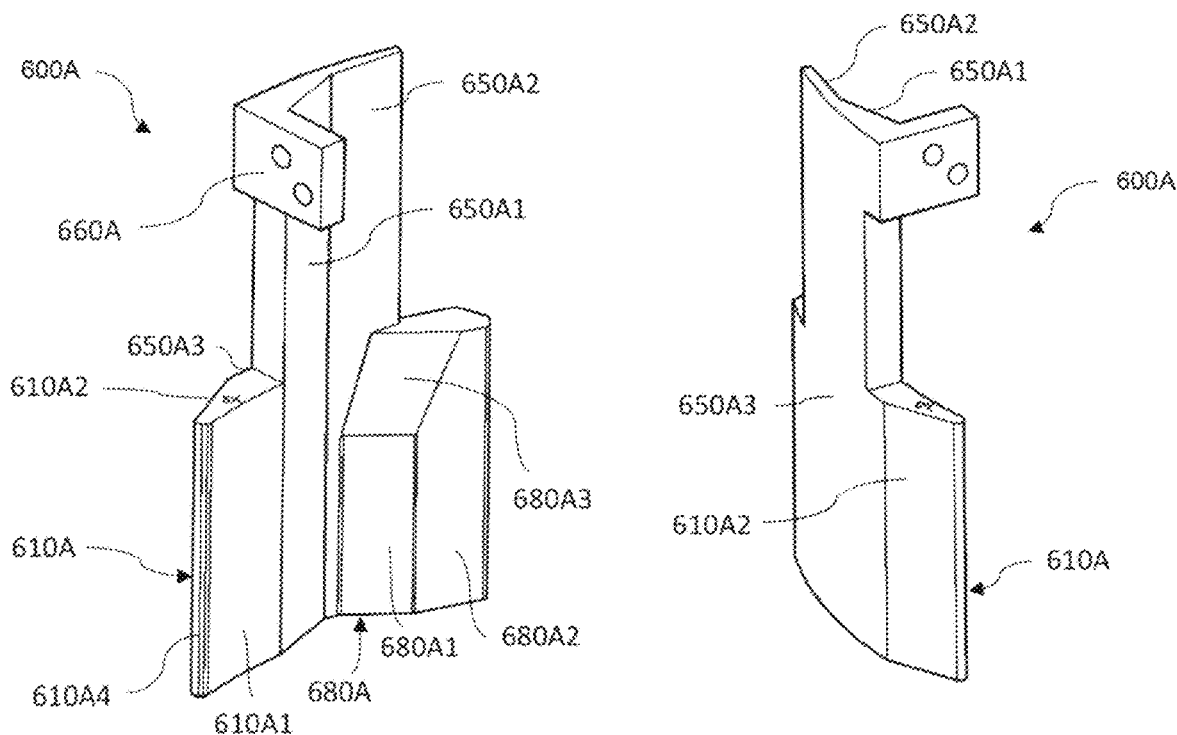
Figure 52:
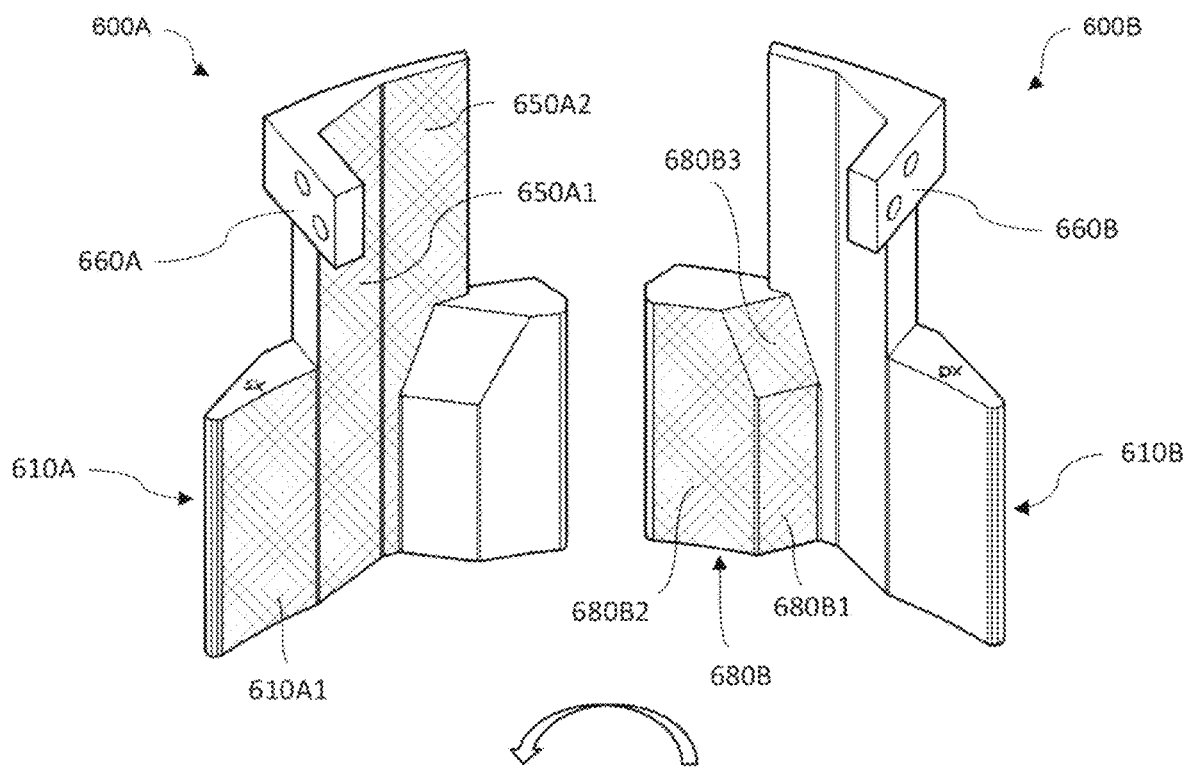
Figure 53:
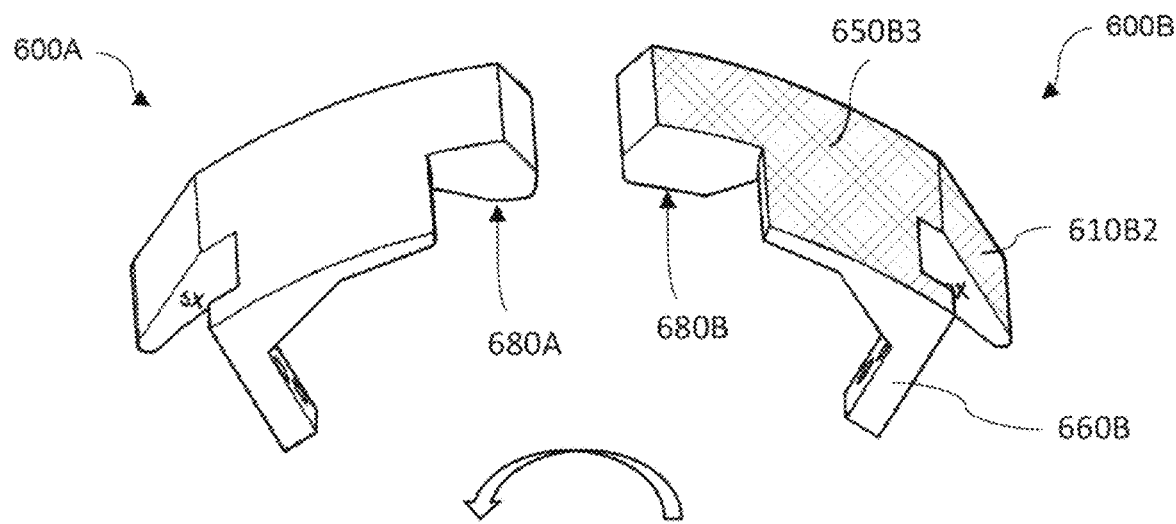
Figure 54:
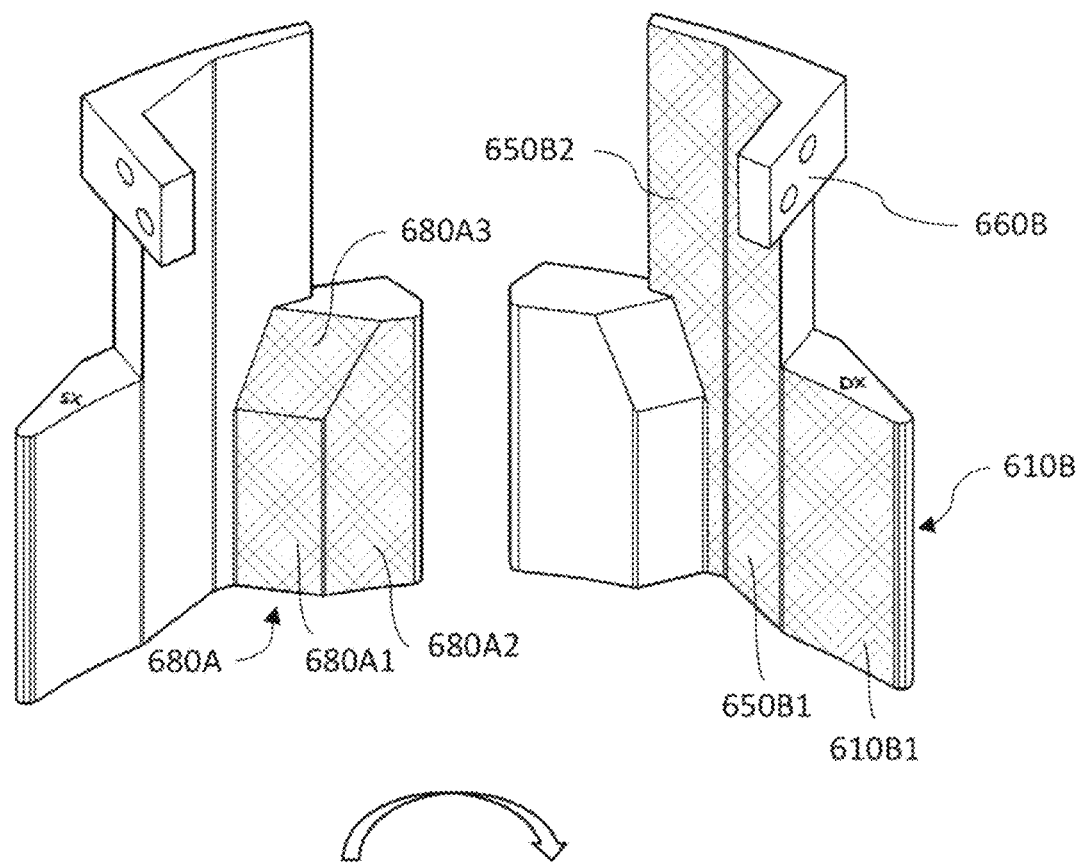
Figure 55:
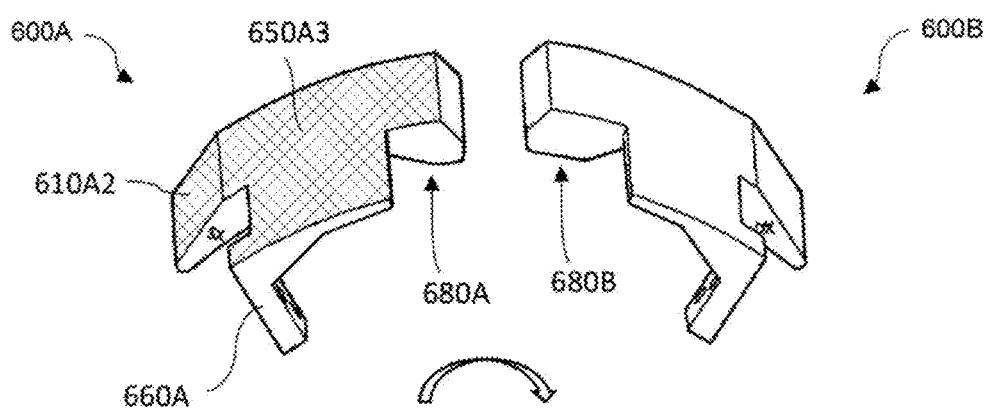
Figure 56A:
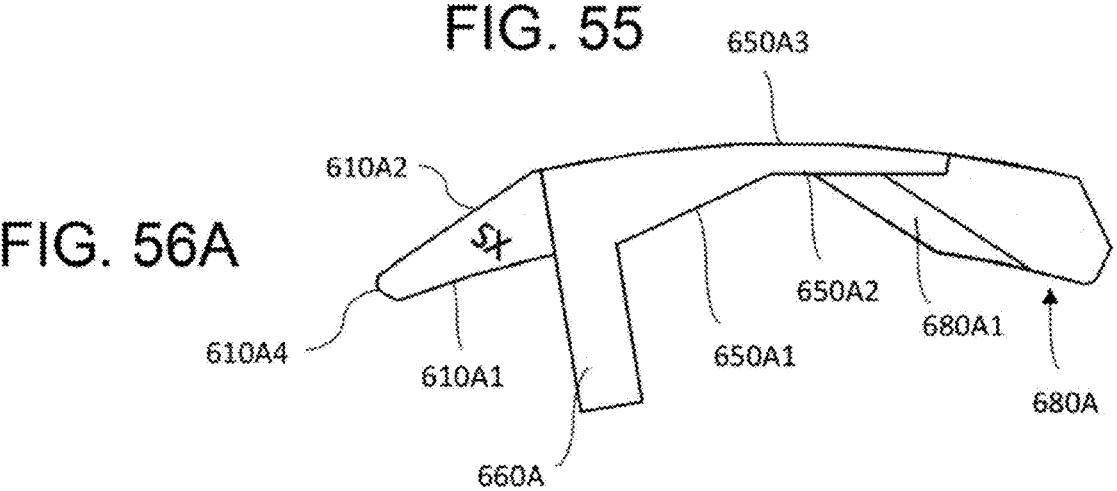
Figure 56B:
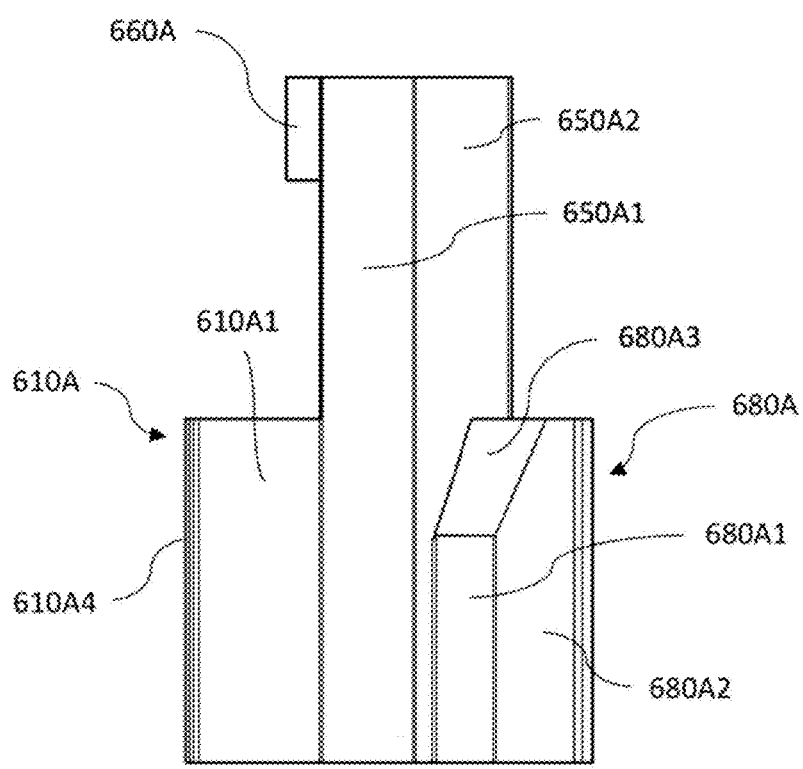
Figure 57B:
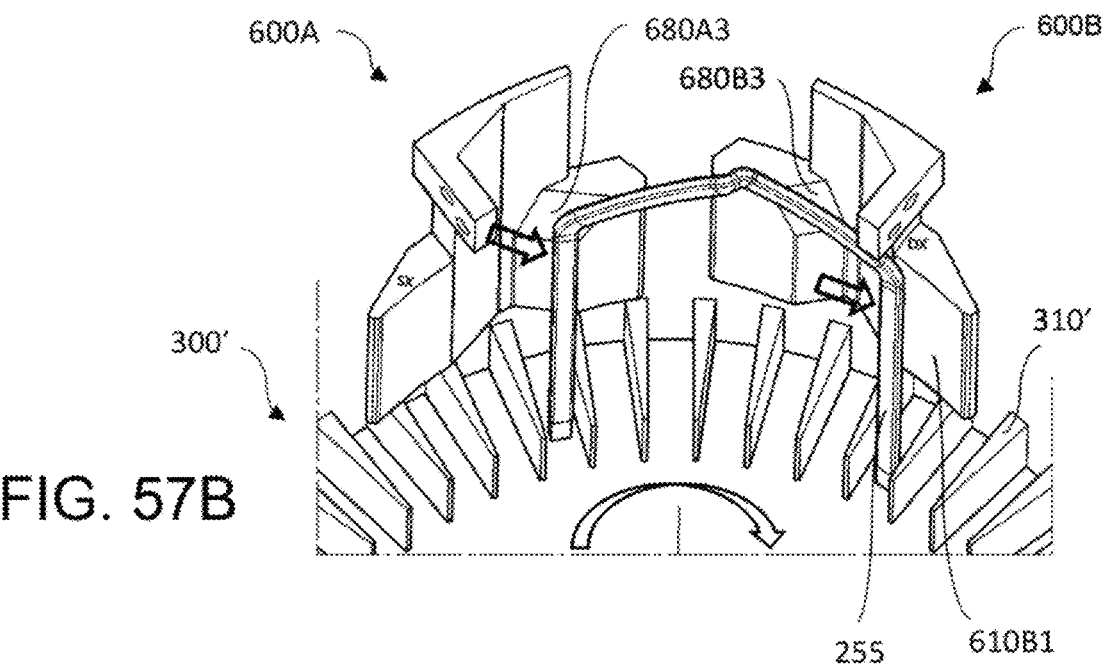
Figure 58A:
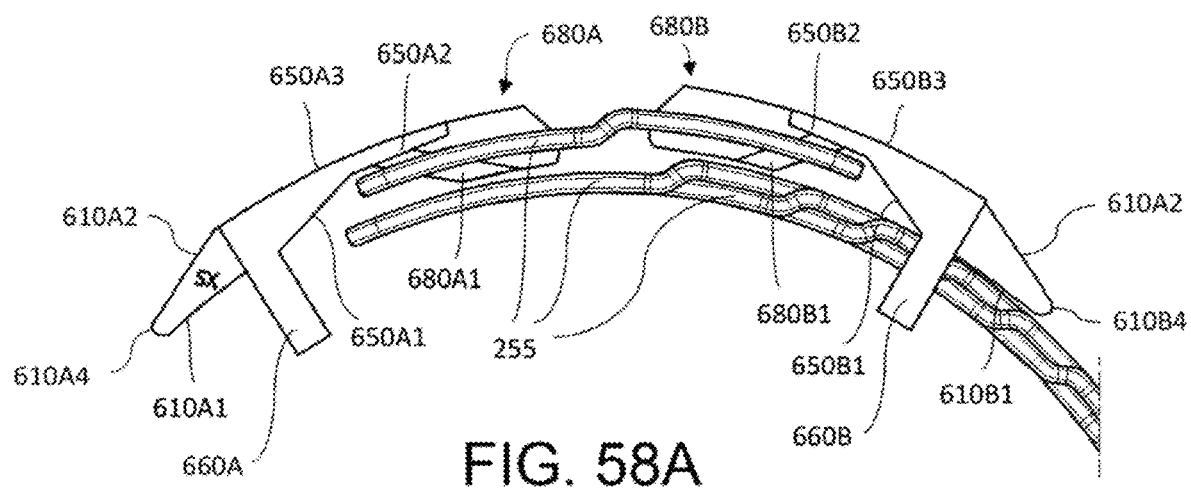
Figure 58B:
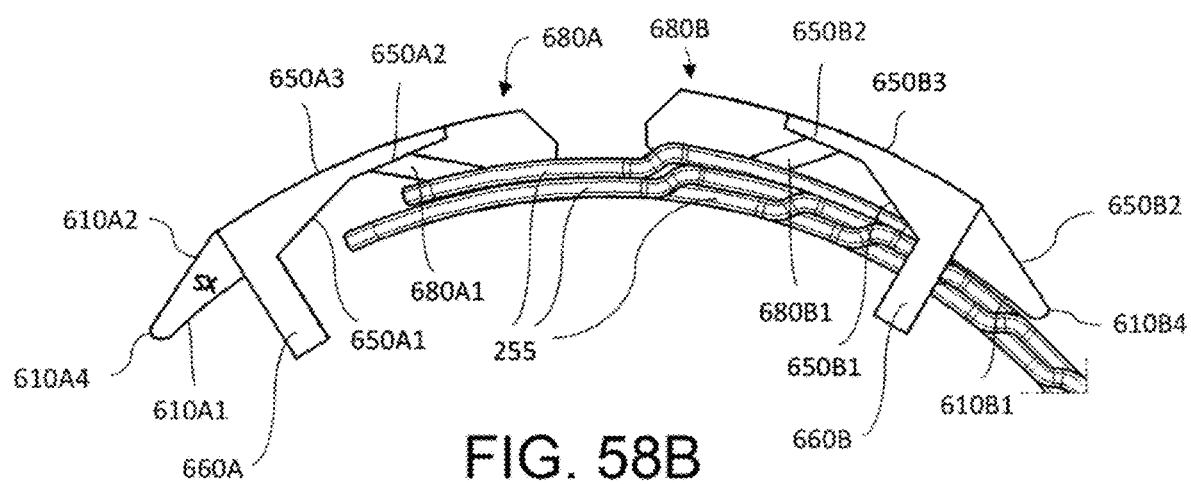
Figure 59:
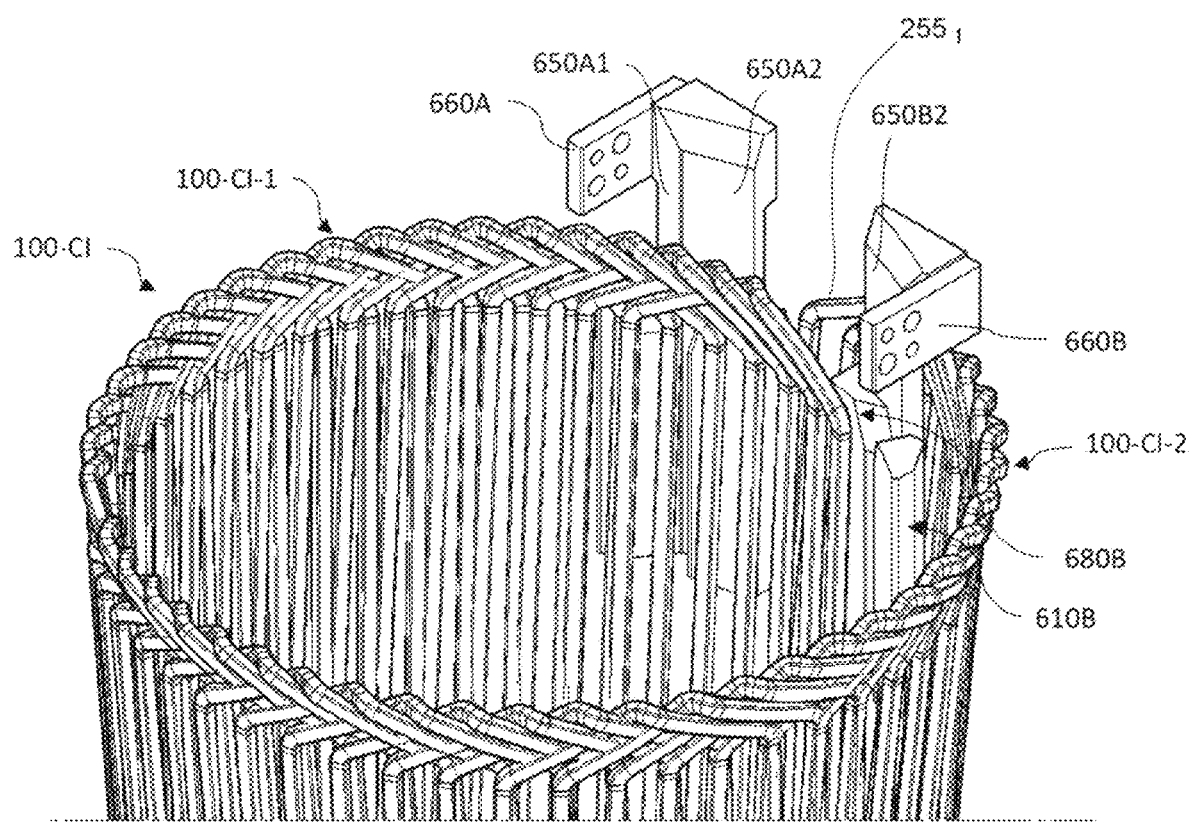
Figure 60A:
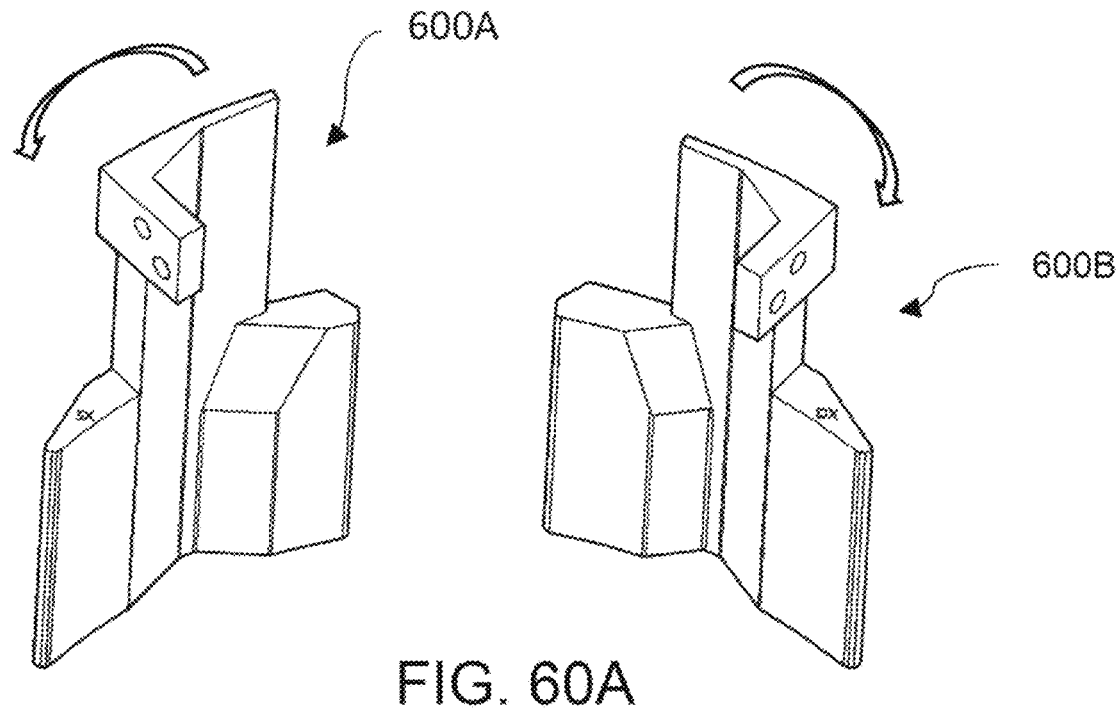
Figure 60B:
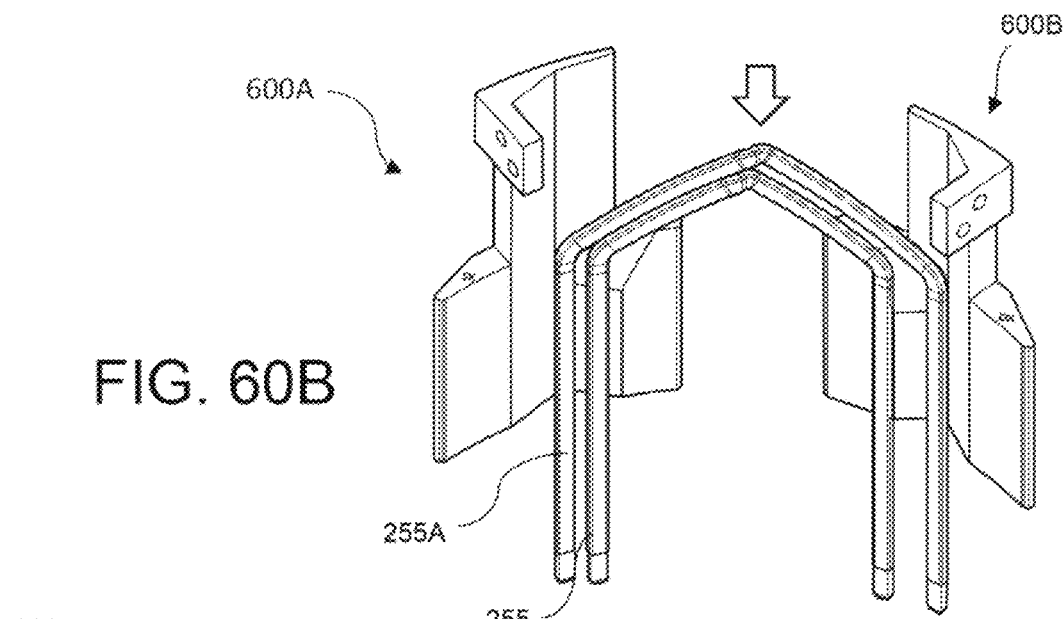
Figure 60C:
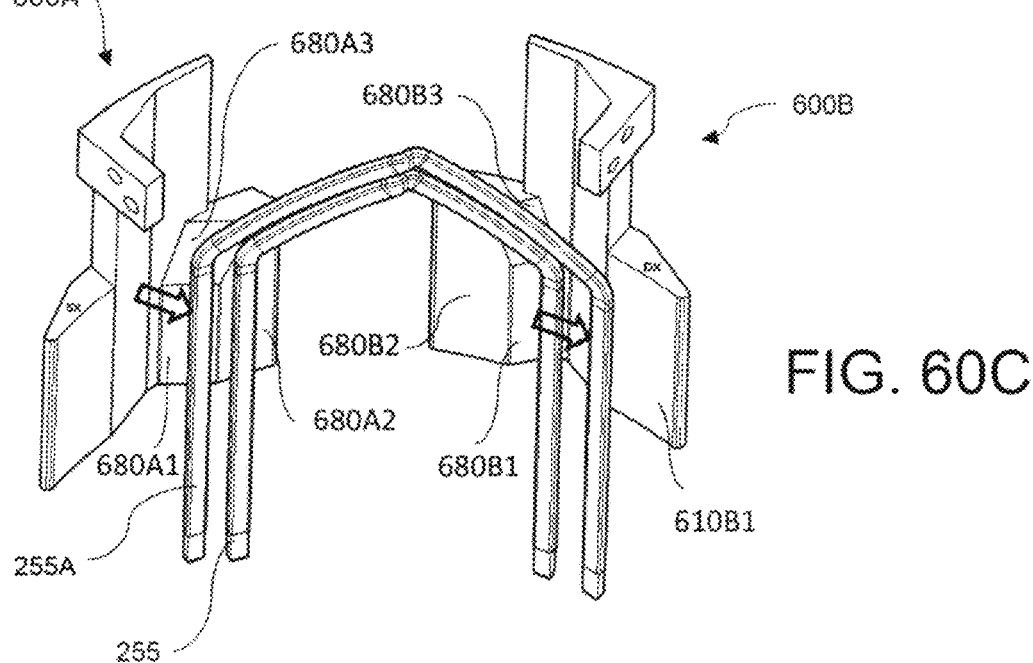
Figure 61A:
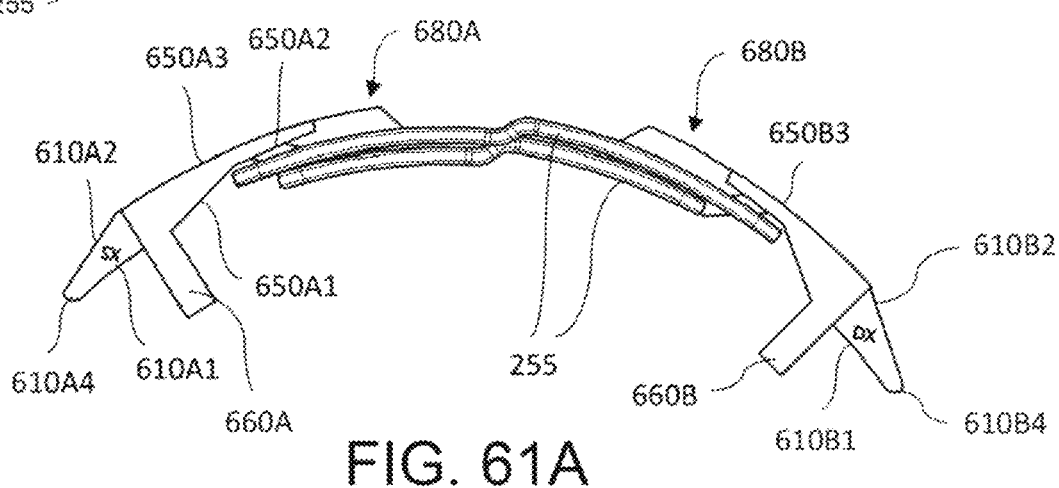
Figure 61B:
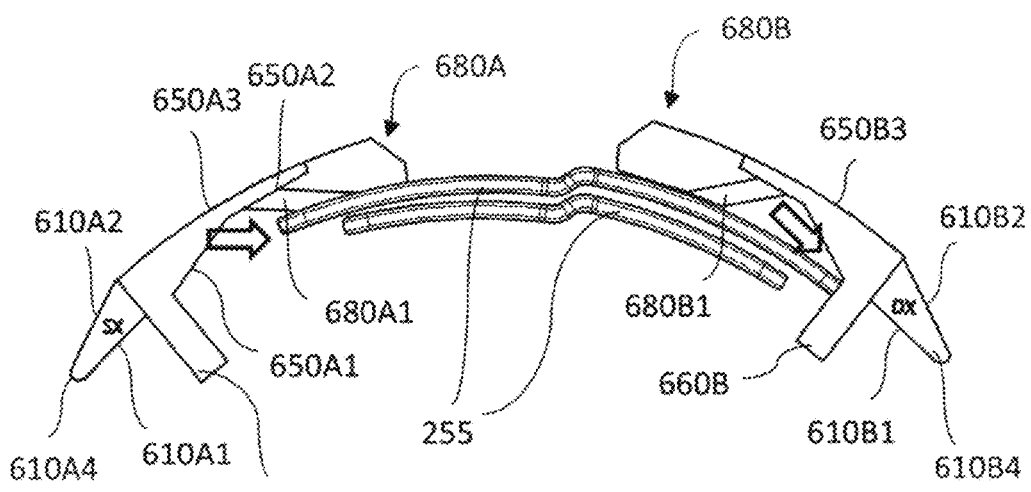
Figure 62A:
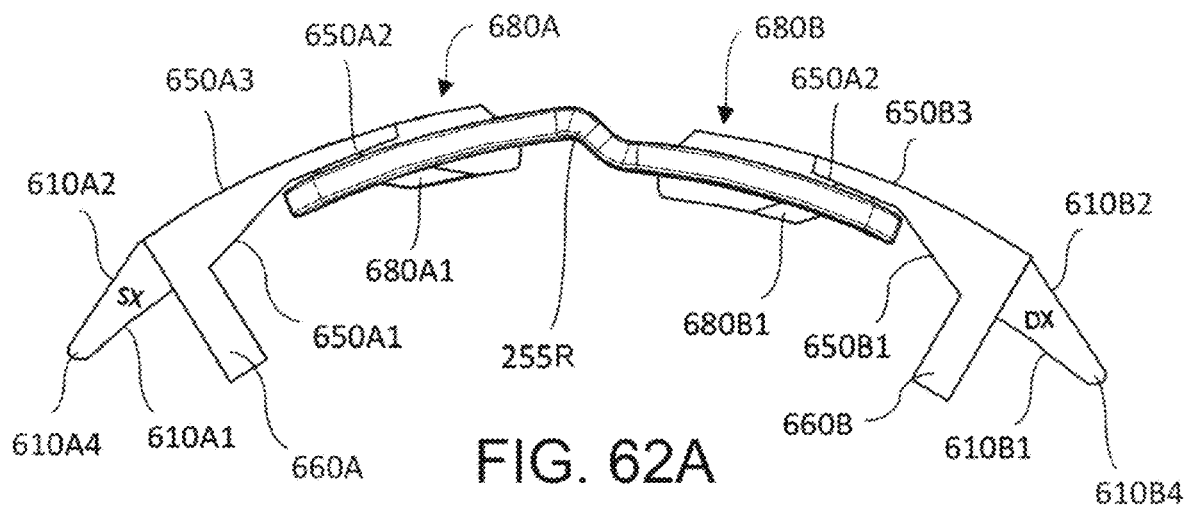
Figure 62B:
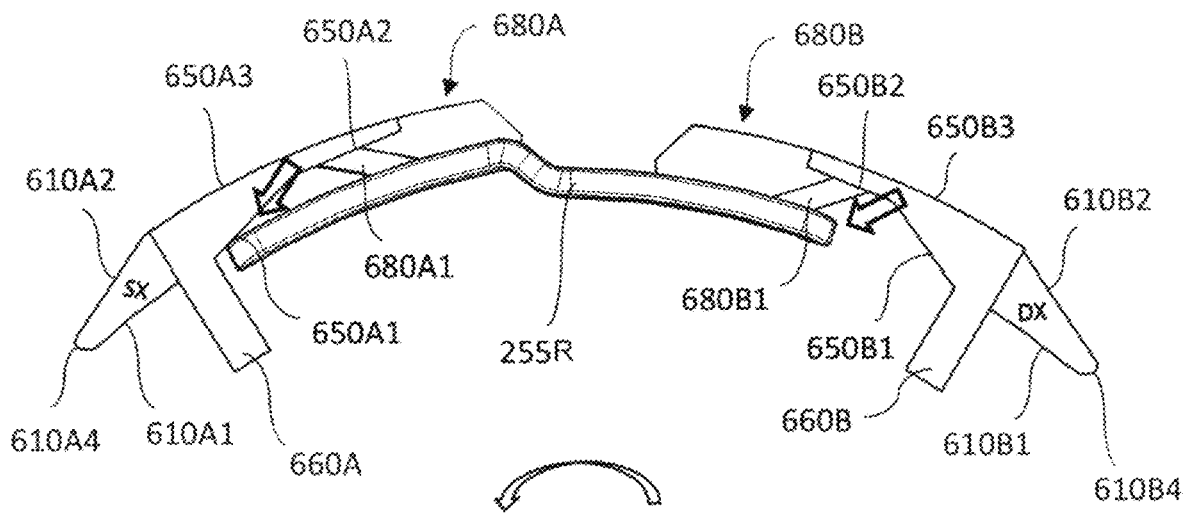

FIG. 6 the theoretical reference position of a hairpin, according to an embodiment of the present description;

FIG. 7 depicts a sketch of the average profiles of the hairpins and the trajectory of movement of the hairpins in relation to the hypotheses set out for Model 1, according to the present description;

FIG. 8 shows in (a) a top view and, in (b), a lateral perspective view of the arrangement of the hairpins according to FIG. 7;

FIGS. 9A and 9B depict sketches of the average profiles of the hairpins and the trajectory of movement of the hairpins in relation to the hypotheses set out in Model 2;

FIG. 10 shows in (a) a top view and, in (b), a lateral perspective view of the arrangement of the hairpins according to FIGS. 9A-9B, as more realistic drawing;

FIGS. 11A and 11B depict sketches of the average profiles of the hairpins and the trajectory of movement of the hairpins in relation to the hypotheses set out in Model 3;

FIG. 12 shows in (a) a top view and, in (b), a lateral perspective view of the arrangement of the hairpins according to FIGS. 11A-11B, as more realistic drawing;

FIG. 13 shows an embodiment of a crown-support system, with a diaphragm;

FIG. 14 shows an embodiment of a support system, with coaxial disks;

FIG. 15 shows an embodiment of a crown-support system, in which the crowns are all resting on the same level with respect to the axis of symmetry of the winding;

FIG. 16 shows a containment for the assembling of the winding as a single prototypal body, according to an embodiment of the present description;

FIG. 17 shows the characteristic dimensions of the containment in FIG. 16;

FIG. 18 shows a containment formed as a set of clamps or blades;

FIG. 19 shows a double-crown winding with two reverse hairpins;

FIG. 20 shows a device for inserting the first reverse hairpin into the winding in FIG. 19;

FIG. 21 shows the reverse hairpin approaching the crown through the rotation (the containment rotation means are not shown) of the containment and conformation of the insertion system;

FIG. 22 shows a view of the step in FIG. 21 on the opposite side of the containment;

FIG. 23 shows a view of the step subsequent to that in FIG. 22;

FIG. 24 shows the means for inserting the reverse hairpin according to an aspect of the present description;

FIG. 25 shows the insertion means of the standard hairpin, as in FIG. 24;

FIG. 26 shows the tangency conditions of a standard hairpin relative to the insertion system;

FIG. 27 shows the situation after the insertion of the first hairpin following the housing of the first reverse hairpin;

FIG. 28 shows the situation in FIG. 27 after a containment rotation;

FIG. 29 shows the situation in the step of assembling the Spiral Widening Profile, according to an aspect of the method of the present description;

FIG. 30 shows the opening of the Reverse hairpin in the Insertion System, according to an aspect of the method of the present description;

FIG. 31 shows the insertion of the Last Standard Hairpin (layers 3-4), according to an aspect of the method of the present description;

FIG. 32 shows the insertion of the Last Standard Hairpin (layers 3-4) as in FIG. 31, with a top view of the whole crown (the last hairpin is not present to show the position of the rest of the insertion system);

FIG. 33 shows a top view of the terminated intermediate crown, according to an aspect of the method of the present description;

FIG. 34 shows the reverse hairpins inserted and the insertion of the first standard hairpin on one side, according to an aspect of the method of the present description;

FIG. 35 shows, in (a), a realignment for the insertion of the hairpin and, in (b), the rotation after the insertion of the latter, the initial and final position of the second reverse hairpin is highlighted, according to an aspect of the present description;

FIG. 36 shows a different conformation of the inserter, according to an aspect of the present description;

FIG. 37 shows the containment during the alignment for the insertion of the standard hairpins after the second pair of reverse hairpins;

FIG. 38 shows the circumferences of widening and narrowing of the crowns, in a version of an aspect of the method of the present description;

FIG. 39 shows the situation in FIG. 38 but with two pairs of reverse hairpins;

FIG. 40 shows the insertion of parallel hairpins at the same time, according to an aspect of the present description;

FIG. 41 shows the interference of some hairpins with the containment in the situation in FIG. 40;

FIG. 42 shows a structure for containing the hairpins again for the situation in FIG. 40;

FIG. 43 shows a containment structure with inclined hairpins, according to an aspect of the present description;

FIG. 44 shows an insertion with hairpins inclined in both radial directions, in top view, according to an aspect of the present description;

FIG. 45 shows, in (a), a geometrically defined hairpin with two legs and, in (b), the minimum insertion area of the legs of the hairpin, according to an aspect of the present description;

FIG. 46 shows a stator with I-pin, reverse, inversion and standard type hairpins, according to an aspect of the present description;

FIG. 47 shows an example of assembling in series with I-pins, with insertion side view, according to an aspect of the present description;

FIG. 48 shows the insertion of inversion pins, according to an aspect of the present description;

FIG. 49 shows an example of an inversion pin inserter, according to an aspect of the present description;

FIG. 50 shows a perspective view of an embodiment of the insertion and moving device according to a two-parts embodiment of the present description;

FIG. 51 shows the left portion of FIG. 50 in two further views;

FIG. 52 shows the portions in FIG. 50 but with the sliding surfaces of the hairpins highlighted;

FIG. 53 shows the portions in FIG. 50 prospectively seen from behind with the sliding surfaces of the hairpins highlighted;

FIG. 54 shows the portions in FIG. 52 but with different sliding surfaces of the hairpins highlighted;

FIG. 55 shows the portions in FIG. 53 but with different sliding surfaces of the hairpins highlighted;

FIG. 56A shows a top view of the first portion in FIG. 50;

FIG. 56B shows an inner side view of the first portion in FIG. 50;

FIG. 56C shows a side view of the first portion in FIG. 56A on the side of the first circumferential end;

FIG. 56D shows a rear view of the first portion in FIG. 56A;

FIG. 57A shows a view of the device in FIG. 50 in use, with a hairpin inserted in the axial direction into the slots of the winding containment means;

FIG. 57B shows a next step of the insertion in FIG. 56A, in which the hairpin is displaced upon rotation of the containment means;

FIG. 58A shows a top view of the situation of a hairpin, which is inserted from above into a hairpin sector being assembled;

FIG. 58B shows a next step of the insertion in FIG. 58A in which the hairpin is displaced upon rotation of the containment means;

FIG. 59 shows a perspective view of a step, in which the hairpins first inserted into the sector are displaced radially to make room for the insertion of the last hairpin;

FIG. 60A shows the rotations of the two portions of the insertion and moving device so that it adapts, from time to time, to the size of a hairpin of a specific crown, in particular, in the case of overlapping hairpins;

FIG. 60B shows a view of the device in FIG. 60 in use, with an overlapping hairpin inserted in the axial direction into the slots of the winding containment means (slots not shown for simplicity);

FIG. 60C shows a next step of the insertion in FIG. 56A, in which the overlapping hairpin is displaced upon rotation of the containment means (not shown for simplicity);

FIG. 61A shows a top view of the situation in FIG. 60B;

FIG. 61B shows a top view of the situation in FIG. 60C;

FIG. 62A shows a view of the device in FIG. 60A in use, with a reverse hairpin inserted in the axial direction into the slots of the winding containment means (slots not shown for simplicity); and FIG. 62B shows a next step of the insertion in FIG. 62A, in which the reverse hairpin is displaced upon rotation of the containment means (not shown for simplicity).

It is worth noting here that elements of different embodiments can be combined together to provide further embodiments without restrictions respecting the technical concept of the present invention, as the person skilled in the art will effortlessly understand from the description.

The present description also relates to the prior art for the implementation thereof, regarding the detailed features not described, such as elements of minor importance usually used in the prior art in solutions of the same type.

When an element is introduced, it is always understood that there can be "at least one" or "one or more".

When a list of elements or features is listed in this description, it is understood that the finding according to the description "comprises" or alternatively "consists of" such elements.

When listing features within the same sentence or bullet list, one or more of the individual features can be included in the description without connection to the other features on the list.

EMBODIMENTS

The need is felt to assemble the winding all in the same system, so as to insert it more easily into the stator pack, pursuing the time-cycle specifications, which are increasingly stringent today.

It was seen, through manual tests, that the hairpins can easily be inserted by hand into the stator pack, up to a certain point: this is the case when the crown starts to take shape and the insertion of a hairpin is hindered by the partially assembled crown. If we consider the worst case, i.e., the insertion of the last hairpin of a crown, it is hindered both to the right and to the left. It was seen that by slightly "widening" the two ends of the partially assembled crown, and in the opposite manner, the last hairpin easily "falls" into the designated slots.

This observation clearly needs to be incorporated into an automated apparatus, as described below.

Although crowns will be described below, they cannot always be identified, and therefore, more generally, crowns are understood to mean a set of hairpins already inserted into the winding in the assembly step.

Modeling Principles for the Assembling

One of the first things to do when studying the feasibility of the assembling according to the description for a particular product is readapting the product (stator) model to the process under consideration. This means that it is necessary to readapt the sub-groups of the model, no longer dividing them by steps (as is the case for the end product), but by crowns. That is to say that the final assembly consists of as many sub-groups as there are crowns, and all the hairpins belonging to the same crown will be present inside the sub-groups.

All the hairpins will be present inside the sub-groups (e.g., assembly 1-2, assembly 3-4, etc.), set individually and appropriately constrained (different strategies can be used for this, such as connecting the terminals of every hairpin to a circumference and the ridges on a control surface, for example).

If the assembling is carried out from the inside outwards, as is often the case, it is a good idea to create assemblies simulating the various assembly steps. For example, the assembling of the crown 3-4 for a product with 6 wires per slot will be simulated with an assembly inside which there is the completely assembled sub-group 'Assembly 5-6' and another sub-group 'Assembly 3-4' in the assembly step. This is the modeling which best approximates the actual process.

In the sub-groups, it is necessary to simulate the widening of the crown required for the insertion of the last hairpins since it is the most critical situation of the assembling, making sure that there is no interference between the hairpins resting against one another.

After determining the minimum widening, which allows the insertion of the last hairpin, the evaluation of the inclination of the hairpin legs is performed. This is because the greater the widening, the more the widened legs tilt, bringing them closer.

The evaluation of such an inclination that, in some particular cases, can be ignored and of the space remaining between the adjacent legs, results in the dimensioning of the crown containment system. Such a containment is structurally similar to a stator pack, only with much wider slots to allow the crown to widen. In order to achieve the containment, the evaluated widening must not allow the legs to mutually cross without leaving any useful space for the containment.

After setting out the basic principles, some pursuable models are introduced representing different assembly strategies.

Basic Concepts

Let's assume that we have all the hairpins assembled in one special containment. As a first analysis, we consider only one winding crown: the k-th.

One of the objects of the present description is to insert all the hairpins of the k-th crown into the same region of the space (and therefore into different regions of a sector, which is subject to relative rotation) and the progressively inserted hairpins are capable of moving along a geometry path such that it is always possible to insert the last hairpin of the crown, as if it was the first, without any hindrance. After inserting the last hairpin into the special region of insertion, the crown simply centers itself by removing the apparatus, which has allowed the hairpins to be inserted again into the same region of space.

It is specified here that if the containment is at a standstill and the means for inserting the hairpins move along the containment, the aforesaid region of the space is not always the same, but moves circumferentially as a function of the insertions.

To this end, inner and/or outer containments can be used, allowing the hairpins to follow the required profile.

After assembling one crown, it is possible to progressively assemble the outermost crowns on the same system, so as to finally have the whole winding without handling the crowns. Preferably, once the innermost crown has been assembled, this is vertically lowered along a winding axis, so as to leave the necessary space at the top to assemble the adjacent crown.

A simple schematization of the different possible steps to be followed is shown below in the case of a 4 wire slot stator with two independent crowns.

Figure 5A:
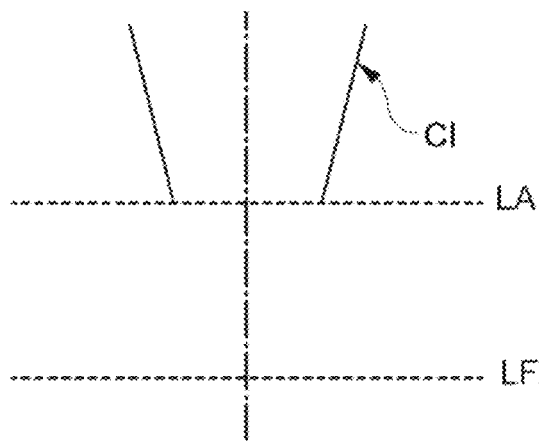
FIG. 5A shows a first conceptual step of assembling according to an embodiment of the present description.

With reference to FIG. 5A, the first step includes inserting hairpins into the inner crown CI. An assembly level LA and an end assembly level LFA is indicated.

Figure 5B:
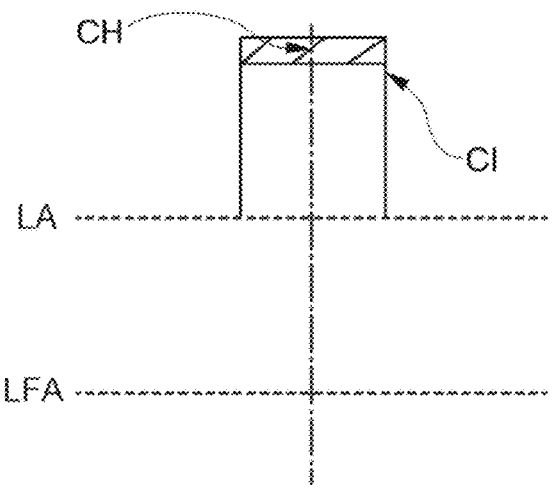
FIG. 5B shows a second conceptual step of assembling according to an embodiment of the present description.

With reference to FIG. 5B, the second step includes removing the system, which allowed inserting the hairpins in the first step, then the crown centers itself. CH indicates the bridge-like connector of the hairpin.

Figure 5C:
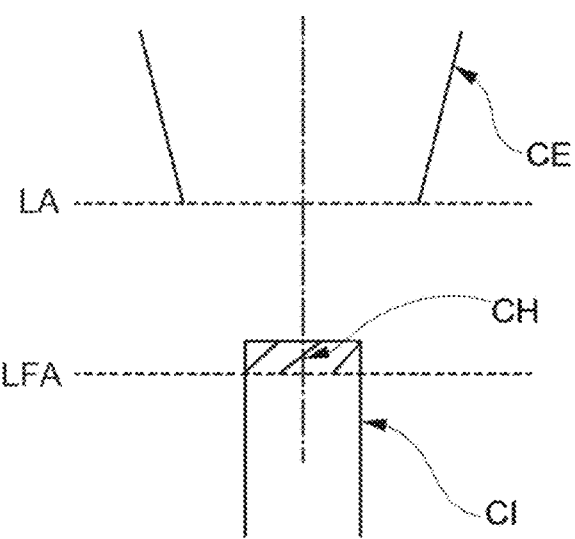
FIG. 5C shows a third conceptual step of assembling according to an embodiment of the present description.

With reference to FIG. 5C, the third step includes the descent of the assembled crown to the "End of Assembling Level". Then, the hairpins of the outer crown CE start to be inserted.

Figure 5D:
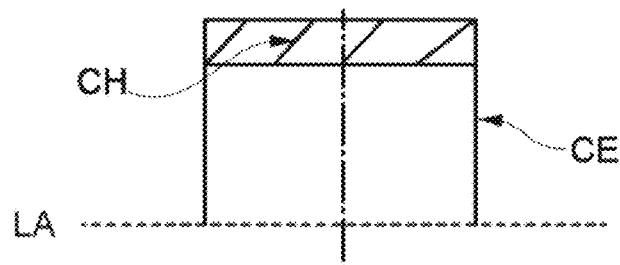
FIG. 5D shows a fourth conceptual step of assembling according to an embodiment of the present description.

With reference to FIG. 5D, the fourth step includes removing the system, which allowed inserting the hairpins in the third step, then the crown centers itself.

Figure 5E:
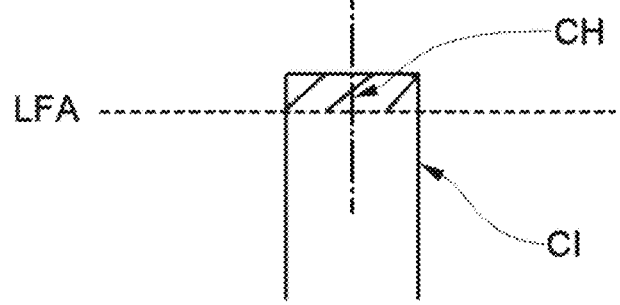
FIG. 5E shows a fifth conceptual step of assembling according to an embodiment of the present description.

With reference to FIG. 5E, the fifth step includes the descent of the assembled crown to the "End of Assembling Level". In fact, an assembly level LA is indicated and an end assembly level LFA. At this point the winding has been achieved.

Even if in the present description we will refer to "crowns" for the sake of simplicity, this term must be understood in a broad sense, also comprising cases with a set of hairpins already inserted. An alternative way of referring to this set is a "sector". A winding can therefore comprise one or more sectors. A sector can comprise one or more layers, each layer consisting of a circumferential arrangement of hairpins.

Strategies for Inserting Hairpins

It has been said that in order to insert all the hairpins of one crown from the same region of the space, it is advantageous, if not indispensable, to provide a widening of one or more parts of the crown being assembled.

This paragraph aims to present some possible scenarios, which have been the object of study and rapid prototyping with 3D printing.

Every formed hairpin has a geometry such that it can occupy a determined position in the stator pack, e.g., in a stator with 6 wires per slot the hairpin for layers 3-4 is not designated to form neither the innermost crown, nor the outermost crown, but the intermediate one.

We define the Theoretical Hairpin Position as the position in the stator pack of the hairpin in the respective layers in completely vertical position, i.e., without radial displacements/widenings.

Model 1

The hypotheses for model 1 are:
Insert the hairpins of the general crown k into a region of space other than the Theoretical Hairpin Position; and in particular on greater diameters;
The progressively inserted hairpins follow a circular-type profile for a predetermined angular sector, function of the pitch of the hairpin (about $2\pi/3$ radians for the standard hairpins) and they take a position equal to the theoretical hairpin position;
The insertion of the last hairpins is allowed through a widening/displacement towards the outer stator diameter of the first hairpins inserted.

FIG. 6 depicts this situation, in which PAG indicates the trajectory of the outer legs of the hairpins in the winding 100 in the assembly step in a circumferential assembly containment 300 (or more generally "circumferential containment means of the hairpins" during the assembling of the winding), PAT indicates the trajectory of the heads (bridge-like connectors) of the hairpins, CBI indicates the hairpin being inserted, and CB1-2 indicates the hairpin already inserted in layers 1-2. The central black point indicates an axis 50 perpendicular to the drawing, which is the axis of the winding 300 being assembled, i.e., it coincides with the rotation axis of the circumferential containment system 300 (this axis is present in all embodiments).

FIG. 7 depicts a sketch of the average profiles of the hairpins and the trajectory of movement of the hairpins in relation to the hypotheses set out.

In this model:
The hairpins are all inserted into the position indicated in FIG. 7 as "CBI";
After inserting the general hairpin, it is thrust towards the inner diameter, so that it occupies the layer associated therewith, i.e., the Theoretical Hairpin Position; and
Thus, the hairpin, positioned by a stator slot pitch, is integrally rotated so as to leave space for the next hairpin and so on.

When the first hairpin inserted has completed about $2\pi/3$ radians of a circumference (or another appropriate arc as a function of the pitch), it must be forced to follow the "Leg Widening Profile" relative to the lower part of the hairpin and the "Head Widening Profile" as for the ridge of the hairpin (FIG. 7), so as not to finally occupy the position of the "Hairpin being inserted". In other words, the hairpin will tend to deviate the circumferential trajectory of the layers and, at the same time, it can be slightly inclined outwards.

After inserting the last hairpin, it is possible to self-center the crown simply by removing the (fixed) system, which has allowed the "Hairpins being Inserted" to be in that specific region of space. FIG. 8 shows a top view in (a) and a lateral perspective view in (b) of the arrangement of the hairpins according to FIG. 7, as more realistic drawing.

In addition to a system which allows the first hairpins inserted to follow the desired widening profile, containments can also be required for the assembled crown, especially for the hairpins to the right of the Hairpin being Inserted" in order to ensure that the progressively inserted hairpins do not hinder the insertion of those not yet inserted.

Model 2

The hypotheses for model 2 are:
Insert the hairpins of the general crown k into a region of space coinciding with the Theoretical Hairpin Position; and
The progressively inserted hairpins follow a spiral-type profile (by means of guides, not shown), so as to widen the first inserted hairpins outwards and the last ones inwards.

FIGS. 9A and 9B depict a sketch of the average profiles of the hairpins and the trajectory of movement (spiral-type, PSAT) of the hairpins in relation to the hypotheses set out.

As can be deduced, in this model:
The process of inserting the hairpins is further facilitated with respect to the previous model; in fact, the hairpin is positioned in circumferences coinciding with those of the two layers to which it is entitled, but it is not forced to occupy greater diameters (note, however, that from practical evidence, it was possible to see and test that a hairpin can easily be made to occupy slightly greater diameters than those for which it was designed);
The progressively inserted hairpins must follow a spiral-type profile; and
After inserting the last hairpin (again in the Theoretical Hairpin Position—PTCB) it is possible to obtain the assembled crown simply by removing the spiral containment: the crown centers itself.

FIG. 10 shows in (a) a top view and in (b) a lateral perspective view of the arrangement of the hairpins according to FIGS. 9A-9B, as more realistic drawing.

Model 3

The hypotheses for model 3 are:
Insert the hairpins of the general crown k into a region of space other than the Theoretical Hairpin Position; and in particular on greater diameters; and
The progressively inserted hairpins follow a spiral-type profile, so as to widen the first inserted hairpins outwards and the last ones slightly inwards (thanks to protrusions, such as 421 in FIG. 26 but more accentuated).

FIGS. 11A and 11B depict sketches of the average profiles of the hairpins and the trajectory of movement of the hairpins in relation to the hypotheses set out (again, PSAT is a spiral trajectory).

As can be observed, this model is very similar to the previous one, with the only difference of the spiral geometry: in this case, it is not symmetrical to the significant circumference of the layers.

FIG. 12 shows in (a) a top view and in (b) a lateral perspective view of the arrangement of the hairpins according to FIGS. 11A-11B, as more realistic drawing.

Lifting System for Crowns being Assembled

It was seen from experimental tests that when there are several crowns to be assembled, if possible, it is better to keep the crown in the assembling step at a higher level and that already assembled at a lower level. In fact, thereby, it is much easier to widen the crown in the assembling step, because, otherwise, if it were at the same level z as those already assembled, the widened hairpins would knock against the latter, forcing the widening.

Therefore a system is required, which allows managing the heights of the different crowns (in general "Axial support system").

As the first solution, it was thought to study a movable system, serving as a support for the terminals of the hairpins and therefore, by moving such supports, it is possible to vary the height of the crowns.

Various solutions were suggested. One solution is a 'wedge' support system, i.e., with dowels extending radially and each forming a support for one or more legs of different crown and layer hairpins, which have the following features and advantages:
 i. Pneumatic cam movement, average complexity;
 ii. Very low wear in time;
 iii. Formation of empty spaces during the opening of the wedges, which can create problems for supporting the hairpins; and
 iv. Relatively reduced volume and only in radial direction with respect to the winding (it does not need to occupy the part beneath the stator).

Another solution is a "diaphragm" support system 320 (see FIG. 13), which is optional, having the following features and advantages:
 i. Pneumatic or electric movement, average complexity;
 ii. Higher wear in time due to the presence of layers;
 iii. Reduced dimensions (the support plane is conveniently in the order of 3-4 mm) and only in the radial winding direction (it does not need to occupy the part beneath the stator); and
 iv. The blades LM can completely be closed to support the crown or they can be opened to pass the whole winding once assembled.

A further solution is a coaxial disk support system (see. FIG. 14), a simple system having the following features and advantages:
 i. Pneumatic axial movement for each disk (no 3), low complexity;
 ii. No wear in time; and
 iii. Requires space beneath the stator.

The study of the coaxial disk support system C1, C2, C3, despite being relatively simple at a first approach, has resulted in the identification of a number of operating criticalities.

In particular, by bringing the crown to be assembled to a higher level, first and foremost, a moving system is required for moving from the bottom upwards and then a thrust system for thrusting from the top downwards. This all results in significant dimensions, especially if we consider that in the upper part of the winding there is also the system for gripping and inserting the hairpins.

Furthermore, it was seen that the base plate for supporting the hairpins must consist of several coaxial disks, one for each crown. But, since the hairpins have a certain mobility also after assembling, the terminals can escape from the support disk (both inwards and outwards). This would be a problem, especially for the first hairpins inserted into the crown, which would be arranged in non-comprised positions and compromise the formation of the crown itself.

A different movement which always takes advantage of the coaxial disk system is that providing the descent of a disk each time a crown is completed. Unlike the previous case, instead of moving the crown to be assembled upwards pushing with the corresponding disk, the assembled crowns are brought to a lower level.

For example, if the assembly system involves advancing from the innermost crown to the outermost crown, the innermost disk, once the crown is assembled, will fall to the bottom, but also in this way it is always possible that some pins will rest on a different disk and therefore create situations which can compromise the winding assembling.

In spite of the advantage offered by a system which allows managing the different heights of the crowns at will, an assembly system 330 was also studied in depth with the crowns all set on the same level z (same height as the bridge-like connectors, that is, with respect to the axis of symmetry of the winding, see FIG. 15 where 331 indicates the holes for the longest legs of some hairpins). In fact, thereby avoiding the automation required to operate the support systems, reducing the dimensions and costs, but especially the problem of managing the edges.

Therefore, given that the assembly system adopted thus far substantially provides a radial displacement/widening of the crowns and possibly a simple inward containment (not a thrust), it is theoretically possible to assembly the crowns from the innermost crown to the outermost crown, with the crowns all on the same level. In fact, the presence of the already assembled innermost crown does not hinder the formation of the outermost crown.

The geometry of the support surface can be constructed based on the length of the pins, which are not all the same, whereby it is possible to model the support surface following two different criteria:
The support surface is modeled so as to have the chignons at the same height. Thus, it is necessary to consider the different lengths of the standard pins, provide pits for the phase terminals and jumpers.
The support surface is modeled by simplifying it as much as possible, thus pits SC are provided only where there are significantly different lengths, such as for the phase terminals and only some jumpers. This will result in having the crown heads not exactly at the same height, but given the difference of 4-5 mm it will not cause problems.

In both cases, given the presence of the pits for the longest pins, the support surface must follow the rotation of the crowns. The rotation means are not shown in any of the embodiments, as these means are known per se.

System for Containing Crowns being Assembled

In this section, it can be seen how the system for supporting the hairpins during the assembling of the crowns and the support of the already assembled crowns were designed.

The requirements can be the following:
Space between the hairpins for allowing the widening;
Stator-pack type slots; and
Congruency with the volumes available.

With reference to FIG. 16, a first version of the containment support 300 was made as a single body, whose object was to dimension the walls delimiting the spaces or slots 350 (for inserting the legs of the hairpins) and the size of the slots themselves (the spaces or slots also being present in the case of a containment not in one single piece). The angular distance between two slots with respect to the axis 50 is referred to as a "slot pitch".

In particular, with reference to FIG. 17, the dimensions to be determined are 3 in number:
Minimum thickness d3 of the wall between the slots 350;
Maximum height d1 of containment 300; and
Protrusion d2 of the pins (at least 15-20 mm).

These three values depend on the geometric features of the stator, in fact, the larger the widening of the crown required for inserting the last hairpin, the smaller the minimum distance between the pins at a determined height, which determines the thickness of the containment walls.

The widening will be as larger as the thickness of the plate, the 'S'-shaped bend, which obtains the jump in layer (which also depends on the number of layers to be jumped), the average diameter of the crown to be assembled and the number of stator slots (because it influences the opening angle of each hairpin).

From a model obtained in laboratory it was seen that a good containment is achieved when this has a height equal to about half the leg of the hairpin PDT and it can be positioned to have a downward protrusion of the hairpins by about 20-30 mm. Based on the materials commercially available today, the containment walls must have a minimum thickness greater than 1 mm for construction and strength reasons.

After completing the formation of the winding 100, it was thought how to manage the reorganization of the crowns and the insertion into the pack, hence the containment 300' (circumferential containment means in which spaces or "slots" 350' are formed, into which the legs of the hairpins are inserted) made with a set of blades or clamps 310' supported by a special structure 320', as shown in FIG. 18. In this case, the circumferential containment means 300' are formed as a set of radial blades 310', projecting outwards toward said winding 100 in the radial direction to said winding axis 50 and among which the slots are defined. Preferably, said radial blades have a horizontal wedge-shaped section, i.e., perpendicular to said winding axis, tapering towards said winding axis. This system has the advantage of being able to radially move the containment walls, causing them to move backwards and forwards by virtue of an inner cam.

The dimensions of the walls of the blades 310' of the clamp 300' are those calculated for the containment as a single body, but the radial thickness increases so that, by further causing the walls of the blades to move forwards, these act as spacers for the legs of the hairpins, aligning them as much as possible (see below in this description). The walls of the blades can have a wedge section so as not to mutually knock together in the radial approaching step.

In this configuration, the dimensions of the slots can vary during the insertion, starting from greater dimensions and ending with smaller dimensions, or the dimensions can remain constant during the process and be narrowed at the end.

The dimensions of the slots are actually a function of the orthogonal opening of the legs and the section of the legs. It is verified how much the hairpin needs to be inclined in order to conveniently displace the hairpin being inserted.

All the slots are preferably of the same size because the hairpins are concatenated in the winding.

Embodiment in the Presence of a Reverse Hairpin for Jump in Layer

So far we have considered the simpler case of winding with hairpin technology, i.e., where the hairpins all have the same opening angle and the crowns are independent of each other.

Now we wish to describe the concept of the present description in the case where the electrical winding provides the use of reverse hairpins.

We start the study by considering only one reverse hairpin for each jump in layer.

In particular, the aforesaid study takes into consideration a 6 wires-slot stator with only 1 reverse hairpin for jump in layer (one between layer 2 and 3 and one between layers 4 and 5). We imagine to have the requirement of obtaining the winding 100R2 in FIG. 19. The darker gray hairpins 255-R are hairpins of the reverse type, unlike the other hairpins 255.

Since the product example under consideration is a 6 wires-slot, the study is divided into three large groups:
Group 1—Formation of the Inner Crown
Group 2—Formation of the Intermediate Crown
Group 3—Formation of the Outer Crown The two reverse-type hairpins 255-R, provided in the winding diagram to be obtained, will be inserted into group 2 and group 3, respectively.

The spatial arrangement of the standard hairpins 255 for the different crowns is that described in Model 3 (the widening profile of the standard hairpins is of the spiral type and these are inserted into a region of space other than the Theoretical hairpin Position. See at the bottom for further details).

Furthermore, the following hypotheses are made. The assembled winding 100R2 is obtained from the construction of the innermost crown and progressively moving towards greater diameters. The reverse hairpin 255-R, which connects two crowns, is always inserted during the construction of the outermost crown between the two. In the formation of a crown in the presence of a reverse hairpin, the first hairpin to be inserted is the reverse-type one. The "Formation Level" and the "End of Formation Level" coincide.

The hairpins of the I-Pin type are not considered here, since these will be inserted at the end when all the hairpins have been assembled. A different insertion system can be provided for each group and therefore, for each crown.

Based on the hypotheses set out, in this case:

The reverse hairpin 255-R between the inner crown and the intermediate crown, must be inserted during the step of constructing the intermediate crown (Group 2);

The reverse hairpin 255-R between the intermediate crown and the outer crown, must be inserted first, during the step of constructing the outer crown (Group 3).

There might not be a single level and therefore a single work surface.

As for Group 1, in this type of system under consideration, despite having 48 slots, due to the presence of reverse and I-Pin hairpins (only in this specific example) in the whole winding, the inner crown is characterized by having 47 standard hairpins.

The method of managing and inserting these is that shown in Model 3: the hairpins are all inserted into the same region of space, other than the Theoretical Hairpin Position. The insertion of the last hairpins is feasible by virtue of the distance covered by the hairpins inserted previously into a spiral-type and non-circular profile.

By adopting a method identical to the one above, the presence of one less standard hairpin results in the creation of an "empty space region". That is the space required for accommodating a leg of the reverse hairpin, which connects the inner crown with the intermediate crown.

It is worth noting that this region of space is obtainable thanks to the presence of the blades of the clamps (or in the case of the fixed containment through the walls between the slots 350), which cause the legs of the hairpins belonging to the inner crown to take a univocal circumferential position, without the possibility of having large clearances.

With reference to Group 2, since the reverse hairpin is the first to connect the inner crown to the intermediate one, based on the hypotheses made in this group, not only must the reverse hairpin be inserted, but also before the standard hairpins belonging to the intermediate crown (hairpins belonging to layers 3 and 4).

All the steps which allow assembling the intermediate crown in the presence of 1 reverse hairpin and with a single insertion system, independently of whether the hairpin is of the reverse or standard type, are repeated below in detail. For every embodiment, the circumferential containment means, the removable insertion and moving means and the relative rotation means allow the assembling of the stator or rotor winding.

STEP 1: Positioning of the Reverse Hairpin

The first thing to do is position the reverse hairpin 255-R (the one connecting the inner crown with the intermediate crown) with insertion and moving means 400 (such as that shown in FIG. 20, comprising a wedge circumferential end 410, an opposite containment circumferential end 420 and an internal wedge 430 (or also "chamfer" or "tapered portion" as synonyms, meaning a portion with a decreasing or increasing thickness depending on the direction of reference), which serves as a guide for the hairpin to be inserted) and in accordance with the previously shown Model 3 (also the reverse hairpin is inserted into a region of space other than the Theoretical Hairpin Position).

The wedge 410 at the circumferential end is an example of a circumferential end element (which can be replicated at the opposite end in the case of the embodiment with the insertion and moving device in two separate parts, see below) with which the means 400 are provided (hereinafter also referred to as insertion and moving "system" or "device" as equivalent expressions), the one or more elements being configured to produce, upon actuation of the relative rotation means, a cam movement of the hairpins in the radial direction inwards and/or outwards of said sectors. Basically, the wedge 410 moves the hairpins, which are outside the means 400 in a region corresponding to the wedge, radially by a sector so that the sector opens into two hairpin edges and a free region is created between these two edges for inserting the last hairpin of the sector. In other words, as shown for example in FIG. 10, the wedge 410 acts on one circumferential end of the means 400 by radially displacing the hairpins of the sector in the region where the same wedge is introduced, while at the opposite end of the means 400 the hairpins stay still, thus creating a radial opening in the sector, where the last hairpin can be inserted again through the means 400 (see. FIG. 31). The wedge or "guide and containment end" tapers, on a plane perpendicular to said rotation axis 50, in the direction opposite to the relative rotation direction of the circumferential containment means 300, 300', 300", the guide and containment end 410 being placed at a predetermined distance from the relative rotation axis 50 of the circumferential containment means 300, 300', 300" so as to guide and contain the already inserted hairpins of a sector, moving forward towards the insertion and moving means 400, $400^{II}$, $400^{IV}$ upon the relative rotation of the circumferential containment means 300, 300', 300". The insertion and moving means 400, $400^{II}$, $400^{IV}$ are removable means.

The insertion and moving means 400 ($400^{II}$, $400^{IV}$, 600) of hairpins in all embodiments are means for inserting, displacing and/or orienting (in general, moving) and not for elastic bending: it is not possible to play on the elasticity of the hairpins because there would be problems of rubbing with other hairpins. Furthermore, the means 400 can be different for each sector, because of the changed dimensions of the sectors, or they can be unique with the capacity for dimensional change.

In fact, although the means 400 ($400^{II}$, $400^{IV}$) are depicted in the figures of each embodiment as consisting of a single block, it is also possible for them to be made up of several movable blocks for processing hairpins of different dimensions. In this case, the various blocks are moved and then locked so that the overall geometry of the means 400 is fixed during actuation of the means. The mutual fixing can be carried out in different ways, through a mutual fixing element or through different elements, which hold the different blocks in position. The dimensional configurability of the insertion, moving and/or orientation means does not change the functionality thereof, as described below.

The insertion and moving means can be configured to insert the hairpins along the slots and displace the hairpins inserted into a sector in the radial direction inwards and/or outwards of said sector.

The removable insertion and moving means (400, $400^{II}$, $400^{IV}$, 600) are configured so that the previously progressively inserted hairpins are radially moved from a first angular position with respect to said winding axis, where the hairpins already inserted in the winding do not yet interfere with the hairpins being inserted, up to a second angular position with respect to said winding axis corresponding to said respective region.

According to an aspect of the present description, once the last hairpin of a sector has been inserted, the removable insertion and moving means 400, $400^{II}$, $400^{IV}$, 600 are removed. If re-dimensioned, they can be inserted into the respective region of a new sector, otherwise other differently dimensioned means are used in such a region.

In this step, it is worth making sure that the intermediate crown is positioned so that the space SLR required for housing the reverse hairpin is aligned with the axis of the reverse hairpin: reference is made to the so-called "Initial Crown Alignment". In other words, the circumferential containment means and the insertion and moving means are mutually positioned so as to define a minimum insertion area of the reverse-type hairpin in said slots.

STEP 2: Insertion of the Reverse Hairpin

With reference to FIG. 21, at this stage, all that remains is to completely insert the hairpin so that the "Formation Level" coincides with the "End of Formation Level". The removable insertion and moving means 400 are further depicted in FIG. 24.

In this first analysis, we imagine that the hairpin 255-R goes down until one of the two legs (for the sake of simplicity, identical to each other) touches an abutment surface.

STEP 3: Housing of the Reverse Hairpin

Given that the reverse hairpin 255-R has been inserted in a different position than the final one PFR to which it is supposed to be in the winding (according to an aspect of the present description, which is always possible), it is indispensable to guide it into the correct destination thereof. This is allowed thanks to a relative rotation (by relative rotation means not shown, which are adapted to perform sequential rotations by one or more slot pitches about the rotation axis 50, the relative rotation means being different and advantageously separate both from the hairpins and from the containment means 300 of the hairpins and from the insertion and moving means 400, this applying to each embodiment) of the inserter with respect to the containment (if the inserter is at a standstill, thanks to the clockwise rotation of the containment observed from the insertion side; if the containment is at a standstill, it is the inserter which rotates circumferentially in the opposite direction, this applying to each embodiment) by a slot pitch, and to the geometry of the insertion system. In other words, the reverse hairpin 255-R indicated in dark gray in FIG. 21 must take the Final Reverse Hairpin Position" PFR.

The rotation of the hairpin 255-R is allowed thanks to the containment system 300, which will also rotate the inner crown, this being integral therewith. We attempt to analyze in detail how this rotation occurs. From a bottom view as in FIG. 22, it appears that during the rotation the inserted reverse hairpin (255-R, dark gray) will be dragged on one side by the containment 300 and guided, on the other side, by the removable insertion and moving system 400. The presence of the chamfer or tapered portion 430 in the inserter causes the right leg of the hairpin to be instant by instant tangent thereto: thereby, the hairpin will tend to move into the ideal final position, as indicated in FIG. 23. This figure highlights the difference between the ideal final position 255-R-I of the reverse hairpin (gray) and the real one 255-R-F (darker gray). It is to be noted that, following the rotation, the left leg of the dark gray hairpin, i.e., that belonging to the innermost crown, is positioned on a greater diameter; however, this is not a problem: as we will see below, the forward movement of the standard hairpins 255 will tend to completely position the reverse hairpin 255-R.

The chamfer 430 (or "tapered portion") is part of a shaped bridge 480 (see FIG. 20 with a view on the plane perpendicular to the axis 50), which joins the two circumferential ends of the means 400 and is located between two insertion openings in case of hairpins. The shaped bridge is an example of one or more elements configured to radially displace, upon actuation of the relative rotation means and as a function of the circumferential position of the hairpins of each sector, the already inserted hairpins, so that there is a free space in the insertion region between hairpins, which occupy the sector for the insertion of one last hairpin of the sector. According to an aspect of the present description, the tapered portion 430 is positioned at the leg of the rear hairpin with respect to the rotation direction, the tapered portion 430 widening in the relative rotation direction.

FIG. 24 depicts the insertion of the reverse hairpin, without the containment (for illustrative purposes), into the inner crown 100-CI during the assembling.

STEP 4: Positioning of the First Standard Hairpin

After arranging the reverse hairpin, it is possible to start inserting the standard-type hairpins 255, as in FIG. 25, into the inner crown 100-CI. The first thing to do, as also done for the reverse hairpin, is correctly position the hairpin at the pit 440U+440S/440R of the insertion system. As depicted, the pit can be bifurcated to have the possibility of inserting both the standard hairpin and the reverse hairpin. There is a first single pit portion 440U from which two pits 440S and 440R branch off for the standard hairpin and the reverse hairpin, respectively. It is noted that 440S and 440R follow the bending directions of the bridge-like connector of the hairpin in both cases.

STEP 5: Insertion of the First Standard Hairpin

At this stage, the only thing to do is completely insert the hairpin so that the "Formation Plan" coincides with the "End of Formation Plan".

Given that the standard hairpin has been inserted into a different position 255-ST than the final one to which it is supposed to be in the winding, it is indispensable to guide it into the correct destination thereof. This is allowed thanks to a rotation of the containment (clockwise, observing from the insertion side) by a slot pitch, and to the geometry of the insertion system, as depicted for the reverse hairpin.

However, unlike the reverse hairpin, the standard hairpin 255 is guided by the insertion system during the rotation in both legs and simultaneously also by the containment, which allows the rotation thereof. In particular, in this case the tangency conditions are those indicated in FIG. 26, with the chamfer 430 on the right which allows the standard hairpin to approach.

It has been possible to verify that, unlike the reverse hairpin, here the distance between the "Final Theoretical Position" 255-I and the "Real Final Position" is practically null. It is worth noting that the insertion of this hairpin is feasible as the previously inserted reverse hairpin does not represent an obstacle. The standard-type hairpin rests on the previously inserted reverse hairpin, forcing the latter to unavoidably take the "Final Theoretical Position", as previously mentioned.

The swelling 421 of the end 420 provides a containment for the standard hairpin.

STEP 7: Positioning, Insertion and Housing of the Second Standard Hairpin

With a mechanism identical to that suggested through STEPS 4, 5 and 6 it is possible to insert all the remaining standard-type hairpins belonging to the intermediate crown 100-CIN, for the formation thereof.

FIGS. 27 and 28 depict a housing of a second standard-type hairpin. After inserting the second standard hairpin in the initial position 255-S, the situation in FIG. 27 is obtained. Once again, the clock-wise rotation by a slot pitch allows the hairpin to be housed in the final position 255-E as in FIG. 28.

Again, it is worth noting that the progressively inserted hairpins rest on the previously inserted ones, which do not in any way hinder the positioning or housing of the hairpin under consideration.

Now we will study and analyze in detail what happens when, after inserting k standard hairpins, the first standard hairpin 255 inserted and the reverse one 255-R come together at the insertion and moving system 400.

STEP 8: Formation of the Spiral Widening Profile

After inserting a certain number of hairpins, which are varying according to the product under consideration, the situation in FIG. 29 is obtained. The first standard hairpin inserted $255_1$ will be again located at the insertion and moving system 400, which has such a geometry (for example, shaped like a wedge 411 as depicted in the figure) as to allow it to follow what is referred to here as "Standard hairpin Distance Profile". As the hairpins are progressively inserted and therefore the outer containment rotates, the very first hairpins will no longer move on a circular-type profile, but they will start the formation of a spiral-type widening profile, allowing the positioning, insertion and housing of all the remaining hairpins until the end.

STEP 9: Opening of the Reverse Hairpin Inside the Insertion System

The reverse hairpin, despite being first inserted into the intermediate crown, will not have to cover the previously depicted "Distance Profile" 411. This is easily deducible with reference to FIG. 30. In fact, in this step, due to the opposite bending direction of the head 255-RT of the reverse hairpin, the reverse hairpin 255-R temporarily abandons the other hairpins that, instead, follow a spiral-type widening profile. Reconnection occurs only after removing the insertion and moving system 400, thus completing the intermediate crown.

It is important to point out how, in STEPS 8 and 9, the geometry of one part of the insertion system takes on particular importance, even though very different shapes can be used.

STEP 10: Positioning, Insertion and Housing of the Last Standard Hairpin

When the last hairpin is positioned and therefore inserted, the situation in FIGS. 31 and 32 is obtained. The housing of the last (standard) hairpin 255 is allowed by means of a slot-pitch rotation, as was done previously for the other standard hairpins. Here too, it is worth noting that the reverse hairpin 255-R, which rightly reappears near the insertion system, does not represent an obstacle.

STEP 11: Extra Rotation and Removal of the Insertion System

Before removing the insertion system (slipping it off from above) it is appropriate to perform an extra rotation to ensure that the last hairpin inserted leaves the inner abutment of the insertion system, in order to avoid its displacing. After removing the insertion system, the assembled crown will be obtained, as the hairpins displaced by the geometry of the inserter will naturally close towards the rotation axis on the first layer.

GROUP 3: Outer Crown Formation

Since the assembling of the outer crown can include the insertion of a reverse hairpin (that between layers 2 and 3) and standard hairpins, it can be carried out using a procedure similar to the one adopted for the assembling and attainment of the intermediate crown. Thus, the obtained winding is ready to be inserted into the stator pack.

Study of the System in the Presence of Several Reverse Hairpins for Jump in Layer In the previous section, it has been seen how it is possible to manage windings with 1 only reverse hairpin for jump in layer. It is interesting to extend the applied concepts to the case in which different reverse hairpins are present in one winding. In particular, reference is made to the product in which there are reverse hairpins 255-R adjacent to one another and mutually offset by a multiple of the slot pitch (e.g., 180° in the winding 100R4), as in FIG. 33.

The assembly of the presented winding 100R4 can be obtained by following at least 3 strategies, indicated below. In these strategies, the "Formation Level" and the "End of Formation Level" can coincide.

In the first strategy, the concepts applied in the previous chapter are extended for, the case of a product with only one reverse hairpin per jump in layer.

Thus, the fundamental concept is to assign a greater degree of priority to the reverse hairpins during the crown formation step, making the following hypotheses:

The reverse hairpin connecting two crowns is always inserted during the construction of the outermost crown between the two crowns;

The assembled winding is obtained from the construction of the innermost crown and progressively moving towards greater diameters;

In the formation of a crown in the presence of reverse hairpin, the first hairpins to be inserted are those of the reverse type; and all the hairpins (standard and reverse) are positioned and thus inserted into the insertion system in a region of space other than the final theoretical position associated with that hairpin, in particular, these are inserted on greater diameters.

A different system can be provided for each crown (for the stator under consideration, the insertion system of the intermediate crown and the outer crown must be such as to house both standard and reverse hairpins). Any I-Pin type hairpins will be inserted at the end, once all the hairpins of the type with several legs have been assembled.

The methods of managing and inserting the hairpins are those in model 3. The presence of a smaller number of standard hairpins results in the creation of "empty space regions". They are the spaces required for housing the reverse hairpins.

Two or more reverse hairpins are then consecutively inserted, also in parallel on different angular positions, before starting the assembly of the second crown, which is shown in FIGS. 34 and 35 (with clockwise containment rotation, with a counterclockwise rotation to return to the initial position for inserting the second reverse hairpin). Then, the first standard hairpin is positioned in correspondence to the other two reverse hairpins, and standard hairpins are continued to be added as above, until the second crown (intermediate) is completed. An empty containment counterrotation (re-alignment) can be required in order to insert the first standard hairpins. The removal of the inserter allows closing and obtaining the intermediate crown (only after performing an empty rotation of a certain multiple of the slot pitch, also in order to avoid removing some hairpins).

The outer crown can be obtained by applying the same concepts seen for the intermediate crown.

The problem of this first strategy is that the initial insertion of all the reverse hairpins can result in the introduction of a further containment system, which is such as to avoid the hairpins from "falling" outwards.

In the second preferred assembly strategy, the object is to avoid using such a further containment system, which can be required to support the reverse hairpins when they are all inserted first, as seen in the previous method. This is possible by nullifying hypothesis 3. Thus, the following hypotheses are obtained:

The reverse hairpin which connects two crowns is always inserted during the construction of the outermost crown between the two crowns;

The assembled winding is obtained from the construction of the innermost crown and progressively moving towards greater diameters;

in the formation of a crown in the presence of reverse hairpin, the first hairpins to be inserted are those of the reverse type;

all the hairpins (standard and reverse) are positioned and thus inserted into the insertion system in a region of space other than the final theoretical position associated with that hairpin, in particular, these are inserted on greater diameters.

A different insertion system for each crown can be provided (conveniently, for the stator under consideration the system for inserting the intermediate crown and the outer crown is such as to house both standard and reverse hairpins). The hairpins of the I-Pin type will not be considered, since these will be inserted at the end, when all the hairpins with several legs have been assembled.

The hypotheses of the model, as can be observed, are the same as the scenario shown previously, but with the only difference that a greater degree of priority is not given to the reverse hairpins, with respect to the standard ones, in the formation step of the general crown.

For hypotheses 1 and 2 the first crown to be assembled is the innermost one thereto and, furthermore, it will contain only standard hairpins, as in the previous scenario.

Therefore, we concentrate the study on the formation of the intermediate crown. In this step, the positioning of two consecutive reverse hairpins is performed. However, at this stage, instead of inserting the remaining reverse hairpins which are not adjacent to those already inserted (as in the prior technique), we position, insert and then house the standard hairpins on the pair of reverse hairpins already inserted.

Then, standard hairpins are inserted using the same technique until, after inserting a certain number of standard hairpins, getting closer to the theoretical position of the remaining reverse hairpins (yet to be inserted, for example, at 180° with respect to the first pair); in this case it is necessary to stop the insertion of the standard hairpins to allow the missing reverse hairpins to be housed before the standard hairpins occupy the spaces required for the reverse hairpins.

In order to insert the two remaining reverse hairpins it is necessary to make an alignment, in which the inserter is positioned in the corresponding angular position. Then, the third and fourth reverse hairpin are inserted, as for the first pair.

It is noted that the insertion system itself can also allow the previously inserted standard hairpins to be contained (thanks to specific shapes, which can be of a different type and which, in the example shown, result in a thickening 421 of the end of the inserter in the rotation direction, rounded thickening). However, to better highlight and make such a function more effective, the thickening is less rounded at the end and forms an arc (looper chamfer part followed by a thickening arc), as in FIG. 36. Such a modification implemented on the insertion system allows containing the previously inserted standard hairpins and facilitating the successive initial alignments, required both for inserting the missing reverse hairpin and the standard hairpins.

Another interesting observation relates to what happens when, after inserting the second "pack" of reverse hairpins 255-R, the initial alignment is applied to finish inserting the interrupted standard hairpins. In this regard, FIG. 37 shows how the standard hairpin 255 entering the looper chamfer 435 (rounded part not required when the reverse hairpins are moved) is contained, however, by the insertion system itself; this decreases the probability of jamming of hairpin during the alignment process.

At this point, it is possible to insert the remaining hairpins, which are all standard. In this regard, it is necessary to make an alignment so as to insert the standard hairpins exactly in the point where the insertion stopped. Then, the procedure continues until the first semi-circle is complete.

At this point, in order to insert the standard hairpins in the other semi-circle, it is necessary to make an alignment.

Then, the insertion is performed until the very first standard hairpins will start covering a spiral-type widening profile, in order to allow the insertion of the last hairpins, similarly, mutatis mutandis, to the situation in FIG. 29 et seq.

The assembly of the outer crown can be carried out by retracing the reasoning illustrated for the intermediate crown.

This illustrated method is also well suited for the case in which the reverse hairpins are randomly located.

The previously analyzed case is the case in which the two "packs" of adjacent reverse hairpins are at the maximum distance (i.e., at 180°), but it can be adapted to any distance as previously described.

In the third assembly strategy, the method is completely different from the two previously analyzed. The hypotheses are the following:

The assembled winding is obtained from the construction of the innermost crown and progressively moving towards greater diameters;

The reverse hairpins are inserted only after partially assembling all the crowns;

all the standard hairpins are positioned and therefore inserted into the insertion system in a region of space other than the final theoretical position associated with that hairpin, in particular, these are inserted on greater diameters; and (optionally) a different system can be provided for each crown/sector for size reasons (unless providing a system with movable elements).

The I-Pin type hairpins will not be considered in the study, since these will be inserted at the end, when all the hairpins of the type with several legs have been assembled.

As can be deduced from the hypotheses, in this method, all the standard hairpins will be inserted and on all the crowns, nonetheless starting from the innermost one, using the same method adopted thus far; after obtaining the partially assembled winding, the reverse hairpins will be inserted by means of a special insertion system, modeled as necessary, which has a dual function, serving as a guide for the reverse hairpins to be inserted and as an element for widening the crowns to allow the insertion and, therefore, the housing thereof.

This third method is quite complex, considering that the insertion of a general reverse hairpin between two crowns is only allowed if:

The outermost crown is widened by a radial amount equal to the height of the plate; and
The innermost crown is radially displaced towards the inside by a radial amount equal to the height of the plate.

FIG. 38 shows the widening and narrowing circumferences (dash-dot line) of the crowns. Furthermore, it is noted that in the presence of mutually adjacent reverse hairpins, it could be more convenient to insert the reverse hairpins at the same time and not one at a time. In fact, otherwise, the previously inserted reverse hairpin will also have to be pushed inwards.

It is worth noting that the minimum distance between the two circumferences highlighted in the figure is equal to the double of the height of the plate (in this case 2*1,8=3.6 mm).

FIG. 39 shows the two circumferences with respect to the second pair of reverse hairpins.

Nonetheless, it is preferable to insert the reverse hairpins always starting from the innermost crowns. With reference to FIG. 39, first insert the outermost reverse pair, by widening the intermediate crown and tightening the inner one; then insert the innermost one, by widening the outer crown and tightening the intermediate crown inwards; it is worth noting that when the intermediate crown is compressed, the innermost reverse hairpins will also feel the effect of this radial force: they will tend to occupy smaller diameters than the theoretical ones of the associated layers.

Embodiment with Parallel Hairpins

In a study, a winding with the following non-limiting features has been considered:
plate size 2.16×3.16;
4 wires per slot×48 slots winding;
hairpins legs height PDT=160 mm; and
parallel type winding with 2 types of hairpins, one between layers 1-3 and the other between layers 2-4.

The object of the carried-out study was to make a rough estimate of the space required to insert the hairpins from the top and form the winding as provided by the process according to an aspect of the present description and evaluate the dimensions of the inner containment walls always required for the assembly.

The study has been made by distinguishing the way in which the hairpins are inserted.

In a first case with translated vertical insertion, and with reference to FIG. 40, the parallel hairpins 255-P are inserted perfectly vertical, by widening outwards the crown part first assembled $100_I$ (to the left) and keeping, on the theoretical diameter, the crown part last assembled $100_F$ (to the right). Thereby, it is necessary to insert the hairpins on a greater diameter than the diameter which is the final position. In the figure, the blades 310' are used as in other embodiments, but any slot formation and containment system can be used. Insertion/moving means $400''$ which are thicker than the means 400 are also used. It should be noted that to simplify the illustration in the figures, the means $400''$ are drawn only in the central part thereof without the circumferential ends and with a top view.

It was seen from the study that, given the width of the crown (influenced by the number of hairpins, plate size and 's'-shaped bend dimensions), the hairpins being inserted must be inserted on a much larger diameter than the theoretical one (in this particular, non-limiting case, about 130 mm) and this causes the hairpins to knock against the underlying walls of the clamp forming the containment, as shown in FIG. 41 in the encircled portions.

Furthermore, as shown in FIG. 42, the widening required to make room for the hairpins to be inserted causes the legs of the hairpins belonging to different layers to cross rather low with respect to the stator axis. This means that the walls of the clamp are very thin (1 mm on the innermost part) and relatively low with respect to the dimensions of the product (about 30 mm in height with a protrusion of 10 mm of the pins downwards). The walls being so low cause the hairpins to fall outwards and thus they require an outer containment during the formation. Therefore, the insertion is not possible in this way.

In a second case with inclined insertion, and with reference to FIG. 43, the insertion of hairpins is provided with a certain angle γ with respect to the axis A5 of the stator. This allows inserting the hairpins in a diameter closer to the theoretical one (i.e., the final position).

From the tests carried out on this specific configuration, it was found that the angle of inclination 7 giving the best results is about 5° with respect to the axis, such an angle depends on the geometries of the winding and must be defined case by case, but different angles are also possible, one possible range can be from 0° to 30°, preferably between 3° and 7°. The inclination allows solving the problem of the insertion of the translated vertical method, because it is possible to move the hairpins being inserted closer towards the inside, the legs no longer knock against the walls of the clamp.

The inclination results in the terminals of the hairpins protruding internally, i.e., they occupy space inside the inner containment diameter, as seen in FIG. 40, for example. The inclination does not significantly reduce the widening of the hairpins towards the outside, which remains about the same, thus the height of the walls of the clamp remains 30 mm (in the particular tests carried out), with a minimum thickness of 1 mm and terminal projections of 10 mm under the containment.

The result is that the insertion is possible, but the containment is highly reduced.

In a third case, with a pure vertical insertion, the two previously illustrated methods confirm the so-called "Model 3" above; in fact, independently of the presence of an inclination, which is null or other than zero, the hairpins are inserted on greater circumferences than the theoretical ones of the layers associated therewith. Instead, the application of the above "Model 2" is interesting in the presence of this type of windings, which consider the use of parallel hairpins.

Indeed and in any case, as shown, there is the problem of having to provide a highly accentuated widening of the first inserted hairpins in order to complete the insertion of the hairpins. The insertion of the hairpins 255-P (or in general 255) directly into the "Theoretical Hairpin Position" as schematized in FIG. 44 allows to allocate the necessary widening so as not to exceed with exceedingly-spiral profiles; the most present and accentuated compression on the last inserted hairpins allows not only continuing the insertion of the hairpins without any hindrance, but also compensating part of the outer widening of the first inserted hairpins, facilitating the dimensioning of the fingers of the containment clamp, thus making them more robust and less critical.

It should be noted that the application of the model shown above for this type of winding is much less problematic than a winding with independent crowns, by virtue of the fact that, having a single crown, the problem of how to manage the outermost crowns during the compression of the hairpins towards smaller diameters does not arise. Furthermore, it was possible to verify that while keeping the same geometry of the fingers of the clamp, with this model the insertion is facilitated (without interference) and it is further possible to strengthen the fingers and position them closer to the chignon, with respect to the cases previously analyzed.

The above also applies to parallel hairpins consisting of more than two hairpins.

Furthermore, here it is specified for all embodiments of the present description and with reference to FIG. 45, that each time the insertion means of the hairpins are repositioned, it is necessary to ensure that there is a minimum insertion area in the slots. Considering a hairpin with an a-b wire section, pitch=a with the centers of gravity of the sections of the straight parts lying on circumferences with radius R1 and R2, respectively, and having L as a value of linear distance.

The "THEORETICAL POSITION AREA" is defined as one and the other of the two areas, a-b, which are positioned respectively one with the center of gravity on the intersection between the circumference R1 and with one of the two straight lines defining the angle α, the other with the center of gravity on the intersection between the circumference R2 and with one of the two straight lines, which define the angle α (as in the image in FIG. 45 (*a*)), having an angle as per the section of the hairpin itself.

The "MINIMUM INSERTION AREA" is defined as one and the other of the two areas, a–b, which are a rigid translation (with constant length L) along the axis y, where the rigid translation is equal to a–b/cos(α/2) (as in the image in FIG. 45 (*b*)). The hairpin must be inserted with the legs in these areas and then it can be brought closer to the theoretical position area. In order to be inserted, the sections of the legs of the hairpin must be within the minimum insertion area, otherwise they cannot be brought closer to complete the insertion.

Figure 1:
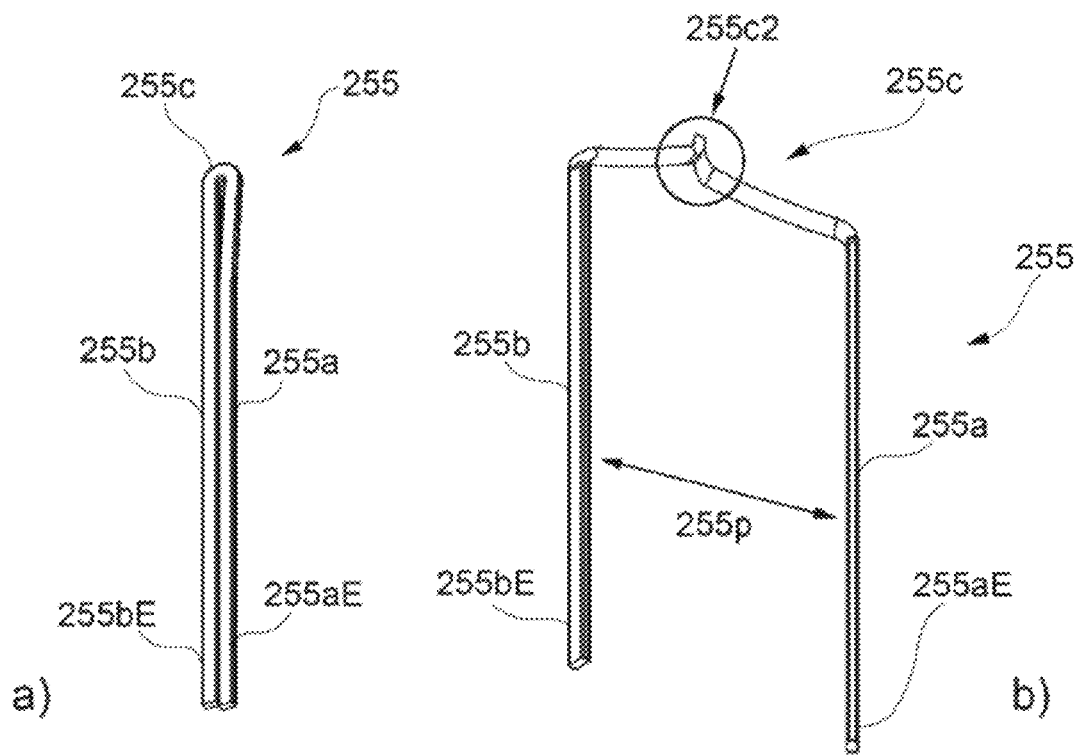
FIG. 1 shows in (a) a preformed flattened U-shaped hairpin and, in (b), a formed hairpin, according to the prior art.
Figure 2:
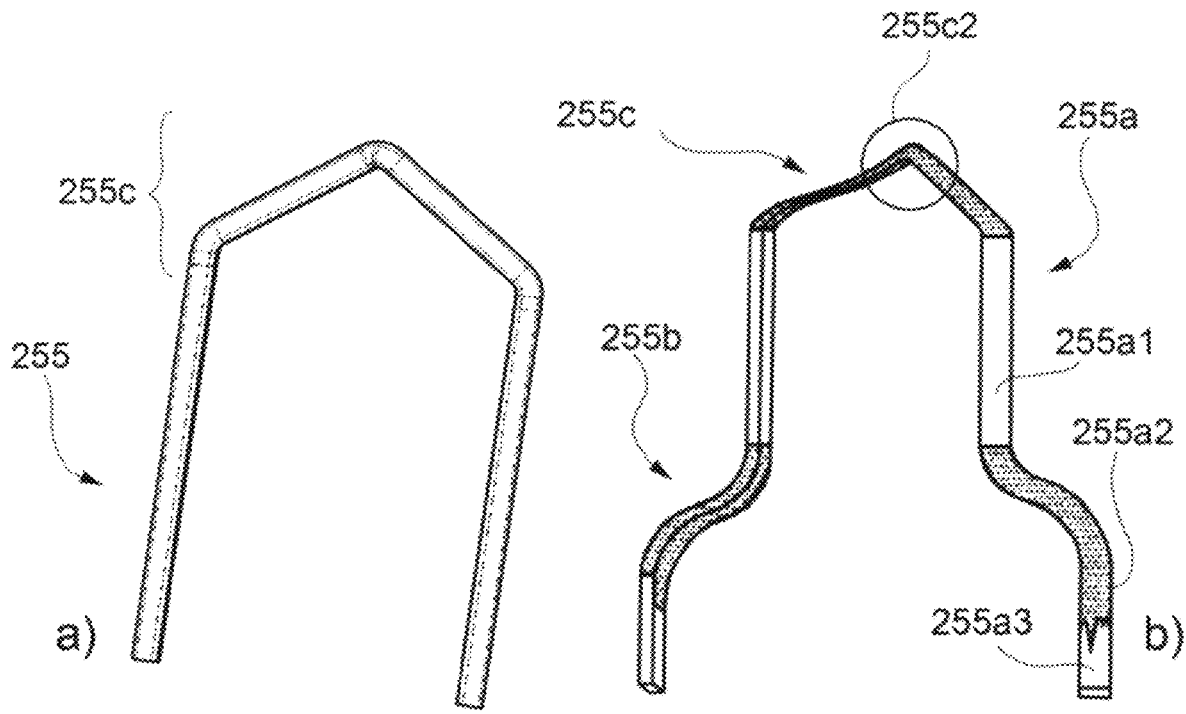
FIG. 2 shows in (a) a stamped hairpin, and in (b) a hairpin after being subjected to a welding-side twisting.
Figure 3:
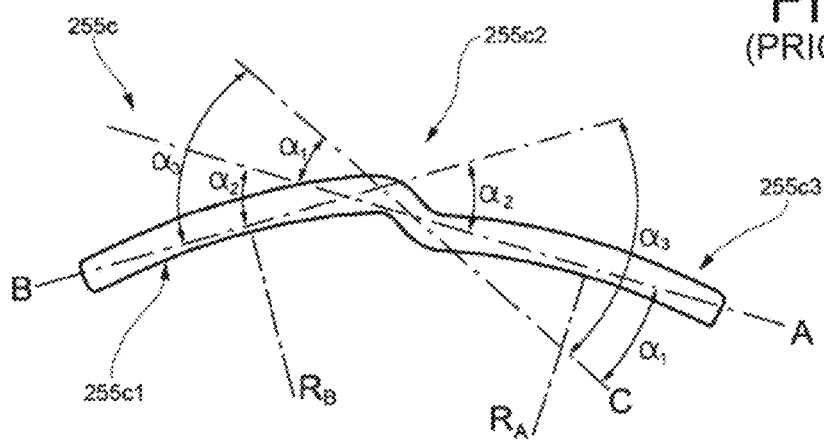
FIG. 3 shows a top view of the hairpin in 2(a), according to the prior art.
Figure 4A:
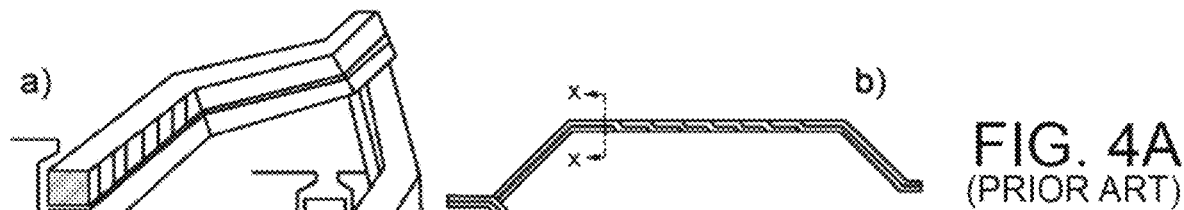
FIG. 4A shows in (a) a layered ("stranded") hairpin with reversal of the cross-section at the bending point and, in (b), with continuous transposition along the portions of the hairpins housed in a slot, according to the prior art.
Figure 4B:
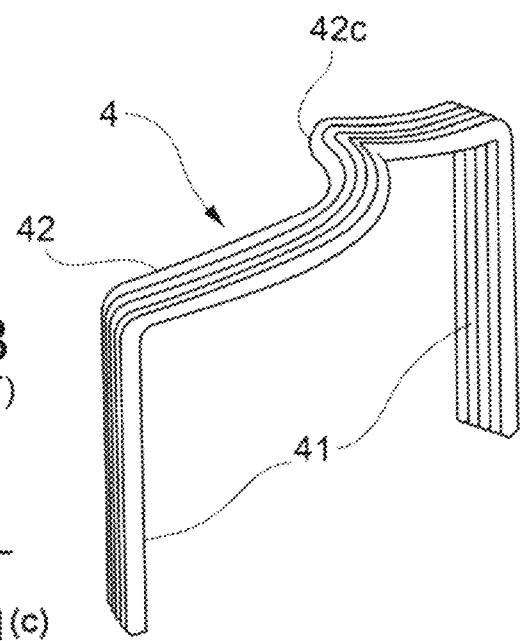
FIG. 4B shows a layered type of hairpin.
Figure 4C:
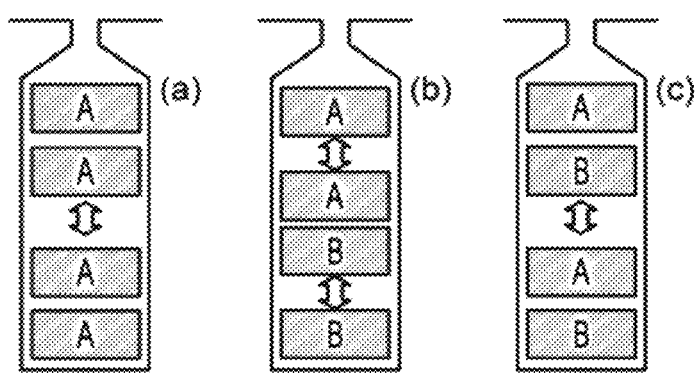
FIG. 4C shows the variants of the arrangement of the legs of the layered hairpins in a double-crown winding in different positions in the slot.
Figure 4D:
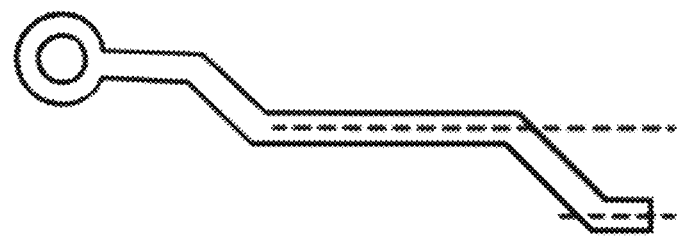
FIG. 4D shows an example of an I-pin, according to the prior art.
Figure 4E:
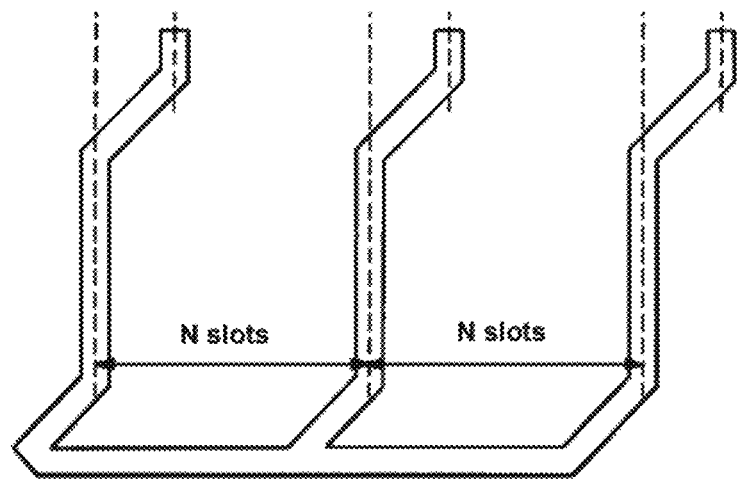
FIG. 4E shows an example of a "W-pin", according to the prior art.
Figure 4F:
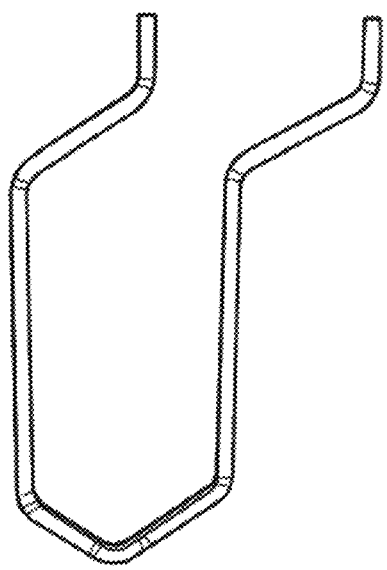
FIG. 4F shows an example of an "inversion hairpin", according to the prior art.
Figure 4G:
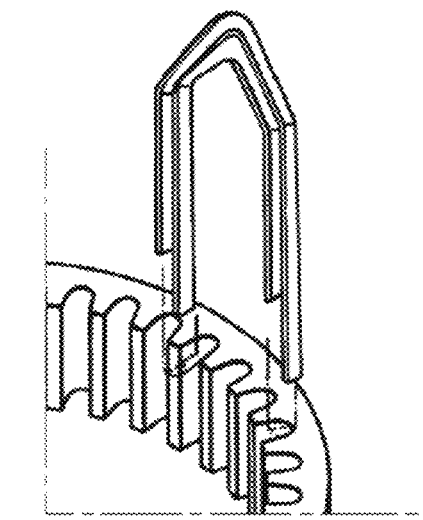
FIG. 4G shows an example of hairpins overlapping on different layers, according to the prior art.
Figure 4H:
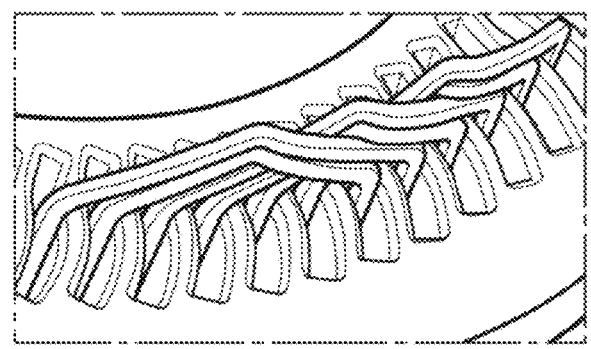
FIG. 4H shows an example of hairpins overlapping on the same side, according to the prior art.

Study of the System According to the Description in the Presence of Overlapping Hairpins It is interesting to evaluate how the concept of the present description can be applied to windings providing the use of overlapping hairpins, such as those in FIGS. 4G and 4H.

Remember that a winding using overlapping hairpins has the following features:

It includes a minimum number of different hairpins per crown equal to two: a standard hairpin and an overlapping one;

The overlapping hairpin always lays above the standard or reverse hairpin; and the two hairpins have different widening angles; in particular, the overlapping one has an opening angle (angle β) of more than two stator slot pitches as compared to the standard one (angle α).

The bond between the two opening angles is the following: β=α+2δ, where $$\delta = \frac{360°}{N_c}$$

is the stator slot pitch, having indicated with $N_c$ the number of stator slots.

The following general hypotheses are made:

the spatial arrangement of the standard hairpins for the various crowns is the arrangement described in Model 3;

the assembled winding is obtained from the construction of the innermost crown and progressively moving towards greater diameters;

the standard hairpin, being situated at the bottom, must always be inserted before the overlying overlapping one;

the insertion of a standard hairpin must always be followed by the insertion of the overlying overlapping hairpin; in other words, it is not possible to think of first inserting all and only the standard hairpins and, in a second step, the remaining overlapping ones;

the sequential insertion of standard hairpin—overlapping hairpin can be done by treating the hairpins individually or by handling them simultaneously;

an insertion system configurable for each group and therefore for each layer and layer part shall be provided; and the insertion of the last standard/overlapping hairpins is allowed thanks to a radial widening of the first hairpins inserted.

Study of the System According to the Description in the Presence of I-Pins

With reference to FIGS. 46 and 47, a practical study has been carried out on a specific winding, which has the following types of hairpins: 12 I-pins 255-IP on the innermost layer, 36 Standard pins 255 on layers 5-6, 12 reverse pins 255-R on layers 4-5, 36 standard pins on layers 3-4, 12 reverse pins 255-R on layers 2-3, 36 standard pins 255 on layers 1-2 and 6 inversion pins 255-IVP arranged on layer 1.

The object of such a study was to verify the feasibility of the assembly in the presence of the aforesaid pins, in particular for the I-pins and inversion pins.

Modeling of the Crowns

First of all, the models required for the study were created, starting from crown 5-6, i.e., the innermost one, which has 12 I-pins and 36 standard hairpins. The crown was represented by inserting all the hairpins individually and constraining them to a diagram of reference, as shown in the previous sections.

The standard hairpins were constrained to the isolation-free part of the right leg, to that of the left leg and to the 'S'-shaped bend, while the I-pin was only constrained to the its only leg and the start of the bend on the terminal.

From the model of the crown 5-6 it was possible to evaluate the widening required for the insertion of the standard hairpins and the order of insertion of the I-pins.

It was possible to see from the model what happens when the crown is assembled, e.g., some I-pins remain free to move as they are not 'embraced' by the standard hairpins.

Furthermore, it is possible to determine the widening required to form the crown and consequently it is possible to determine the dimensions of the containment structure.

The final insertion of the I-pins in the winding can be carried out with a special device, e.g., as in the prior art.

Study of the System According to the Present Description in the Presence of Inversion Pins It was possible to analyze the management of the inversion pins 255-IVP with the same stator used in the above examples.

With reference to FIG. 48, it was seen that they can be inserted with a robotic arm or with a clamp directly into the slots, by inserting them vertically from above, but on a greater diameter circumference with respect to the final position.

The insertion position of the radially outermost inversion pin determines the minimum thickness of the containment walls and the radial length (such parameters are usually determined by the widening of the outermost crown, in this case the two cases are compared to see which is the most critical).

With reference to FIG. 49, it is also possible to use an inserter 400$^{IV}$ similar to the one designed for the standard hairpins, with one pit 465$^{IV}$.

As an example, the inversion pins can be inserted at the end, with the advantage of having the insertion position in a narrower angle (i.e., without the robot following the containment rotation).

Further Embodiments

After a few experimental checks, it was seen that it is possible and advantageous to divide the insertion device into two different bodies since it was seen that, by moving these bodies, it is possible to insert the different types of hairpins forming the same winding, keeping the geometry thereof fixed. In other words, in such a way redesigning and thus replacing the insertion system on the machine on varying the hairpin type is avoided.

However, it is also possible to have a single body for the insertion and moving device. Both cases will be considered below, with special emphasis on the embodiment in two different and separate portions.

With reference to the Figures, and in particular to FIGS. 56-68B, the present description relates to a system for assembling a stator or rotor winding 100, the winding comprising one or more sectors 100-CI, 100-CIN extending circumferentially about a winding axis 50, each sector comprising one or more layers, each layer consisting of a circumferential arrangement of hairpins 255, 255-R, 255-IP, 255-IVP, the hairpins comprising a head end and two legs with a respective free insertion end. Hairpins are not normally part of the system according to the present invention, but they can also be included. In any case, they are defined herein for the purposes of the description of the parts of the system in use.

The assembly system comprises first and foremost circumferential containment means 300, 300', 300" of the hairpins, the circumferential containment means defining a set of spaces or slots 350, 350', 350" configured to receive the legs of the hairpins, the angular distance between two slots being referred to as a slot pitch, according to the prior art. However, it must be noted that in the present description, the containment means are a single circumferential block, which cannot be separated and opened circumferentially as in prior art document WO 2018/039806. The separation elements forming the slots can be movable, but the circumference of the body of the containment means is not separable (single circumferential block, possibly formed through the retractable blades, which can only be moved radially, but without groups of blades at a different angle to one another and, therefore, no longer along the radial directions with respect to the rotation axis). The system further comprises removable insertion and moving means (400, 400$^{II}$, 400$^{IV}$), which are separate from (not integrated with) the circumferential containment means (300, 300', 300") and comprising two openings (665A,665B) for inserting the two legs of a hairpin. Here too, such means are generally known per se. To finish the general part, relative rotation means are also comprised and they are configured to mutually rotate the removable insertion and moving means and the circumferential containment means so that the circumferential containment means advance towards said removable insertion and moving means in an approaching direction, said relative rotation means being configured to perform rotations by one or more slot pitches about a rotation axis 50 coinciding with the axis of the circumferential containment means.

The two openings 665A,665B are configured so that, in use, a first leg of an inserted hairpin is frontal with respect to the approaching direction and a second leg is rearward with respect to said approaching direction. Here too, the position of the openings is generally known. Naturally, the openings have an axial extension (parallel to the axis 50, in use). It should be noted that in FIG. 50 the two openings comprise, for example, elements 661A and 661B but these are not shown in the successive figures to simplify the reading of the figures, although it is understood they are present. Such elements are only an example of how the two openings can be configured.

According to the present description, the removable insertion and moving means (400, 400$^{II}$, 400$^{IV}$ in the above embodiments, 600 from FIG. 50 onwards, and this applies to all the references below), comprise a first portion 400A, 600A and a second portion 400B, 600B, respectively, with a first and a second circumferential extension direction, as well as a first and a second axial extension direction, the first portion 400A, 600A and the second portion 400B, 600B being configured so that they can be positioned with the axial extension direction parallel to the rotation axis 50, externally to said circumferential containment means 300, 300', 300", and at a greater radial distance from the rotation axis 50 than the radial distance of said sector 100-CI, 100-CIN. This is one difference with respect to document US 2020/0336054, where the movement means of the hairpins (e.g., ref. 15 in FIG. 8) are inside the containment means.

More specifically, the first portion 400A,600A has a first circumferential end 410,610A and a second circumferential end, as well as a first connection body for connecting between said first and said second circumferential ends, where the first circumferential end 410,610A, in a section perpendicular to said rotation axis 50, radially increases in thickness outwards in the direction towards the second circumferential end. As can be seen, the first end is common to all embodiments and with a wedge, where the face 610A1 or 410S towards the axis 50 preferably has no tapering, the end being tapered radially outwards (away from 50). This non-tapered face allows a containment of some already inserted hairpins (previous layer).

In all embodiments, the first portion 400A,600A has, in said first connection body, radially inwards, a distal tapering 430,680A1 with respect to said first circumferential end that, in a section perpendicular to said rotation axis 50, increases in thickness radially inwards in the direction towards the second circumferential end. This distal tapering allows the movement of the axially inserted hairpin so as to bring it towards the sector being assembled. Thanks to such a tapering, such an approaching can comprise a rotation of the hairpin with respect to the axis passing through the center of the bridge-like connector and it is parallel to the legs (at least to the portion just attached to the head).

The second portion 400B,600B has a first circumferential end 420,610B and a second circumferential end, as well as a second connection body between said first and said second circumferential ends, where said connection body has, radially inwards, a proximal tapering 421,650B1 with respect to said first circumferential end that, in a section perpendicular to said rotation axis (50), increases in thickness radially inwards in the direction towards the first circumferential end. This proximal tapering allows the movement of the axially inserted hairpin so as to bring it towards the sector being assembled. Also by virtue of such a tapering, such an approaching can comprise a rotation of the hairpin with respect to the axis passing through the center of the bridge-like connector and it is parallel to the legs (at least to the portion just attached to the head).

Here, it is clear that in the case of the embodiment 600, the second circumferential ends of each portion are mutually detached, while in the case of the previous embodiments, the two second ends coincide in the center of the single connector body 480. In the case where the two groups of embodiments 400, 600 are used with only one approaching direction, using a mirroring configuration for the other approaching direction, the functionalities are equivalent, and the fact of causing the two second ends to coincide is completely optional. On the other hand, if the same means are to be used alternatively for the two approaching directions, as well as for different crowns, then the second ends thereof must be separate, as in the embodiment 600 as it is necessary to reposition the two portions 600A and 600B from time to time, and the first ends must be equal even if opposite in the circumferential direction (symmetrical configuration).

At this point, it is necessary to give a few further details of the configuration of the two portions. First of all, the first circumferential end 410,610A of said first portion 400A, 600A is configured and can be positioned, in use, so as to displace radially outwards the hairpins 255₁, 100ⱼ, 100-CI-2 of said sector that it meets said approaching direction. Furthermore, the position of the first 400A,600A and second 400B,600B portions, as well as the position of the distal tapering 430,680A1 of the first portion 400A,600A and of the proximal tapering 421,650B1 of the second portion 400B,600B being predetermined so that, in use, a hairpin inserted into said two insertion openings 665A,665B is radially inserted into said sector upon actuation of the relative rotation means. Clearly, the person skilled in the art can easily dimension the elements so that they work with the specific hairpins being inserted, once the concept at the base of the present description is known. The two mentioned taperings act so that the hairpin is displaced upon rotation, meets them and is radially guided towards the sector being assembled. Even though guides are provided in US 2020/0336054, they are inside the containment means that, therefore, cannot be the same for all the windings. Instead, with the finding of the present description, the insertion means are decoupled from the containment, while maintaining the radial guide of the hairpins, and, above all, with the same insertion device, the sector is automatically and not manually widened for inserting the last hairpin of the sector, again with the same insertion and moving device, which is automatically located in the right position. This has nothing to do with the prior art, where such a widening is manual or carried out with ad hoc devices other than the insertion devices for the rest of the hairpins, which have to be removed. And furthermore, the situation is very different from the situation of the system in document PCT/CA2017/051041 in which it is the containment that is divided into parts, which open up, losing the symmetry with respect to the rotation axis. These openings with a loss in symmetry also require complicated and costly moving means, as well as the use of special containment means, which are also costly and nonetheless need to be replaced with simpler more commonly used ones.

According to an optional aspect of the present description, the first circumferential end 410,610A of the first portion 400A,600A, as well as the first circumferential end 420, 610B of the second portion 400A,600B have surfaces 410S, 610A1 facing said axis 50 and placed at a predetermined distance from the rotation axis 50 so as to "guide" and contain, in use, the hairpins already inserted into the previous sector.

According to an optional aspect of the present description, the first portion 600A and the second portion 600B are identical in shape, but have a mirroring configuration (in use, with respect to said approaching direction), the first and second portions being separate and maintained by supporting and adjusting means of the position of the first and second portions.

According to an optional aspect of the present description, relating only to the embodiment 600, the first portion 600A has, in said first radially inwards connection body, a proximal tapering 650A1 with respect to said first circumferential end 610A that, in a section perpendicular to said rotation axis 50, decreases in thickness radially inwards in the direction towards the second circumferential end. Furthermore, the second portion 400B,600B has, in said connection body, radially inwards, a distal tapering 680B1 with respect to said first circumferential end 610B that, in a section perpendicular to said rotation axis 50, decreases in thickness radially inwards in the direction towards the first circumferential end. Finally, the proximal tapering 650A1 of the first portion 600A and the proximal tapering 650B1 of the second portion 600B end in respective radial and circumferential containment elements 660A, 660B, 661A, 661B of hairpins forming the two openings 665A and 665B, the respective circumferential containment elements 660A, 660B, 661A, 661B having an inner radial extension and being provided integrally along the circumferential extension of said first and second portions before the respective first circumferential ends 610A, 610B and at heights along said axial extension farther away from the heights of the respective first circumferential ends 610A, 610B with respect to said containment means.

According to an optional aspect of the present description, the second circumferential end 680A of the first portion 600A and the second circumferential end 680B of the second portion 600B have respective chamfers 680A3, 680B3 in the axial direction 50, configured to guide the hairpin during the insertion into the insertion and radial moving device.

According to an optional aspect of the present description, the first end elements of the first and second portions are configured so that the last inserted hairpins of a sector are displaced inwards. This is possible by inverting the relative rotation of the insertion and moving means with respect to the containment. It is also possible to alternate the rotations and move the hairpins inserted first and last, radially outwards and inwards, respectively, as in FIG. 9A.

According to an optional aspect of the present description, said means for supporting and adjusting the position of the first and second portions are configured to arrange the first and second portions between each other so as to insert both the hairpin and the reverse hairpin on different layers and crowns.

Again with reference to FIGS. 50-64B, the following individually optional features are obtained, ("inner" is understood to always mean facing the axis 50, "outer" facing in the opposite direction, clearly in use, but also when the means are not in use, it is always possible to define an inner and outer surface with respect to a direction perpendicular to the axial extension of the means or device):

- The inner surface 650A2 comes first (from the second end) of the tapered surface 650A1, and contributes to forming the opening 665A. The same applies to the surface 650B2.
- The surface 650A3 is an outer surface of the end 610A at the end of the tapering 610A2; correspondingly, the surface 650B3 is an outer surface of the end 610B at the end of the tapering 610B2. The surfaces 650A3 and 650B3 extend beyond, taking the entire outer side of the first and second parts, as is clearly seen in FIGS. 53 and 55.
- 650A and 650B indicate the axial extension portions of the first and second portions beneath the two openings 665A and 665B.
- 680A and 680B indicate the two elements attached to 650A and 650B (in particular, to the inner surfaces 650A2 and 650B2, such elements providing the distal taperings 680A1 and 680B1 above, as well as the adjacent surfaces 680A2 and 680B2, which can serve to guide and contain the hairpin during assembly and ensure the final positioning of the hairpin. 680A and 680B also have the rounded or axial taperings 680A3 and 680B3 as above. Elements 680A and 680B serve to guide the hairpins both on axial insertion (in particular when these are overlapping hairpins as in FIGS. 60A-60C) and in the radial approaching thereof. In particular, they provide an axial abutment for the bridge-like connector.

We attempt to retrace the steps allowing the identification of the strategy for assembling a winding with overlapping hairpins, when a particular insertion system is used, according to an aspect of the present description. Such an insertion system is shown in FIGS. 66A-66C.

1$^{st}$ STEP: Positioning of Standard Hairpin

With reference to FIG. 60A, the first thing to do is position the standard hairpin 255 at the openings 665A and 665B, as shown in their entirety in FIG. 50. The two portions 600A and 600B can be moved by known moving means (not shown) to allow the insertion of any hairpin (standard, reverse and inversion) of any size and therefore of any layer/crown. This also applies to overlapping hairpins having different pitches to one another. In this case, after the insertion of a first hairpin (e.g., with a smaller pitch), the two portions 600A and 600B can be moved (distanced and/or mutually rotated) to house the other hairpin (with a larger pitch).

The overlapping hairpins can also comprise more than two hairpins, i.e., a group of hairpins with an increasing pitch in which there is a hairpin with a larger pitch and one or more hairpins with a progressively smaller pitch, which also overlap one another, i.e., with pitches allowing the overlapping.

2$^{nd}$ STEP: Insertion of Standard Hairpin

In this step, the hairpin 255 is inserted and then the two portions 600A and 600B are moved, i.e., before the hairpin with the larger pitch. It is possible to provide a stop element for the head of the hairpin with a smaller pitch.

3$^{rd}$ STEP: Positioning of the Overlapping Hairpin

After inserting the standard hairpin and moving the two portions 600A and 600B, it is possible to position the overlapping hairpin 255A.

4$^{th}$ STEP: Insertion of Overlapping Hairpin

Then, the insertion of the overlapping hairpin 255A is performed.

5$^{th}$ STEP: Simultaneous Housing Standard—Overlapping Hairpin

With reference to FIG. 60C, by means of a rotation (clockwise or counterclockwise depending on the shape of the "S") by a slot pitch and taking advantage of the geometry of the insertion and moving means, it is possible to house the hairpins in the sector. The legs of each hairpin slide over the work surfaces, as shown above and in accordance with the arrows in the figures (but which, for clarity, are only provided for the overlapping hairpin).

Furthermore, in FIGS. 52-55 the surfaces where the hairpins slide are highlighted. In particular, the highlighted surfaces in FIG. 52 are the work surfaces during the hairpin insertion and the winding assembly with relative counterclockwise rotation direction, instead the surfaces highlighted in FIG. 54 are the work surfaces during the insertion of the hairpin and the winding assembly, with relative clockwise rotation direction. Correspondingly, the same applies to FIGS. 53 and 55, showing the work surfaces of the hairpins inserted first, which are radially displaced to make room for the last hairpin of the sector.

In the figures of the embodiment 600, the arrows indicate the displacement of the hairpins on work surfaces. FIGS. 62A and 62B show the insertion and moving of a reverse-type hairpin 255R.

According to an optional aspect of the present description referring to embodiments other than 600, the removable insertion and moving means 400, 400$^{II}$, 400$^{IV}$ are made in one piece. As seen above, said connection body of said first portion, said second circumferential end of said first portion, said connection body of said second portion, and said second circumferential end of said second portion form a shaped bridge 480. The first end of said second portion has an axial surface 422 facing, in use, said rotation axis 50 and placed at a distance therefrom corresponding to the thickness of a crown, the first end of said second portion not increasing in thickness radially towards the outside in the direction towards the second circumferential end of the second portion. Here, it should be remembered that in the case of the embodiments of the insertion and moving device in one piece, the two portions 400A and 400B are attached at the respective second ends, approximately in the center of the device in the circumferential extension thereof.

According to an optional aspect of the present description, again in relation to the embodiments 400, said openings are part of a bifurcated pit with a common portion 440U configured for one leg of a standard or reverse hairpin, as well as a first portion 440S, in a contiguous manner, for the other leg of a standard hairpin and a second portion 440R for the other leg of a reverse hairpin.

According to an optional aspect of the present description, again in relation to all embodiments, a subset of hairpins comprises one or more groups of overlapping hairpins 255, 255A each with a respective pitch between the two legs, each group comprising a hairpin with a larger pitch 255A and one or more hairpins with respective progressively smaller pitches 255, and where the insertion and moving means are displaced to insert and guide the overlapping hairpins into position. One example of the method is described below.

According to an optional aspect of the present description for all embodiments, the insertion means and the removable insertion and moving means are configured to rotate about said rotation axis 50, while the circumferential containment means 300, 300', 300" are fixed.

According to an alternative optional aspect of the present description for all embodiments, the circumferential containment means 300, 300', 300" are configured to rotate about said rotation axis 50, while the removable insertion and moving means are fixed. Clearly, both blocks can counter-rotate, but this would complicate the construction of the system.

As seen above, the present description for all embodiments, is also directed to a method for assembling a stator or rotor winding 100 comprising one or more sectors 100-CI, 100-CIN extending circumferentially about a winding axis 50, each sector comprising one or more layers, each layer consisting of a circumferential arrangement of hairpins 255, 255-R, 255-IP, 255-IVP, the hairpins comprising a head end and one or more legs with a respective free insertion end.

The method comprises the following steps to be performed:
A. providing the system according to one or more of the preceding claims;
B. Inserting, through said insertion and moving means 400, 400$^{II}$, 400$^{IV}$, 600 a hairpin 255, 255-R, 255-IVP into a respective region in the circumferential containment means 300, 300', 300";
C. Actuating said rotation means of the circumferential containment means by one or more slot pitches; and
D. Repeating steps B and C until completion of the sector and progressively of the entire winding 100, wherein the insertion and moving means 400, 400$^{II}$, 400$^{IV}$, 600 are used for the insertion of the last hairpin of each sector; where in step D, once the last hairpin of a sector has been inserted, the insertion and moving means 400, 400$^{II}$, 400$^{IV}$, 600 are removed and inserted into the respective region of a new sector.

According to an alternative optional aspect of the present description for all embodiments:
the winding is assembled from the innermost sector and progressively moving to sectors with larger diameters;
one or more reverse-type hairpins are inserted during the construction of the outermost sector between each pair of consecutive sectors, at the start of the assembly of the outermost sector of the pair;
before inserting a reverse-type hairpin 255-R, there is an alignment step in which the circumferential containment means 300, 300', 300" and the insertion and moving means 400, 400$^{II}$, 400$^{IV}$ 600 are mutually positioned so as to define a minimum area for the insertion of the reverse-type hairpin into said slots;
a relative rotation of the circumferential containment means 300, 300', 300" by a slot pitch is performed as soon as a reverse-type hairpin is inserted; and
as soon as one or more reverse-type hairpins are inserted between two consecutive sectors, the steps B and C are then carried out, in which the hairpins are not of the reverse type.

According to an alternative optional aspect of the present description for all embodiments, the hairpins comprise two pairs of reverse hairpins 255-R and a plurality of non-reverse hairpins 255, 255-IVP), the two pairs of reverse hairpins 255-R being inserted into the winding 100 at a predetermined mutual angular distance, and wherein all the sectors of the winding are firstly assembled with non-reverse hairpins 255, 255-IVP leaving the required spaces for the reverse hairpins 255-R, and wherein the reverse hairpins are then inserted between pairs of sectors by means of the following steps:
the radially outermost sector of the sector pair is widened through the removable insertion and moving means (400, 400$^{II}$, 400$^{IV}$, 600) by a radial amount equal to the radial dimension of the horizontal section of the leg of the reverse hairpin (255-R) in the insertion position; and
the radially innermost sector of the sector pair is displaced towards said winding axis 50 by a radial amount equal to the radial dimension of the horizontal section of the leg of the reverse hairpin 255-R in the insertion position.

According to an alternative optional aspect of the present description for all embodiments, said predetermined mutual angular distance is of 180°.

According to an alternative optional aspect of the present description for all embodiments, steps B and C are performed for parallel hairpins 255-P, and step D is repeated until the insertion of the last parallel hairpin is not missing, and wherein the following steps are then performed:
outwardly widening, through the removable insertion and moving means 400, 400$^{II}$, 400$^{IV}$, 600 a first sector part, starting with the first hairpin inserted and ending with one of the next hairpins inserted;
maintaining a second sector part at a final theoretical diameter, the second part being complementary to said first sector part;
inserting said last parallel hairpin with a predetermined angle of the legs with respect to the winding axis 50; and
bringing the first sector part back into contact with the second sector part.

According to an alternative optional aspect of the present description for all embodiments, said predetermined angle, in the case of parallel hairpins 255-P, each consisting of two hairpins is between 3 and 7 degrees.

According to an alternative optional aspect of the present description for the embodiment 400, wherein the system for the overlapping hairpins mentioned above is used:
one or more hairpins 255 with a progressively smaller pitch are inserted into the circumferential containment means 300, 300', 300" from the hairpin with a smaller pitch, always before the hairpin with a larger pitch 255A; and said further movable containment means 470 are actuated to position the one or more hairpins with a progressively smaller pitch and removed immediately thereafter.

According to an alternative optional aspect of the present description for all embodiments 400, wherein the system is used for overlapping hairpins and wherein the assembly of the overlapping hairpins 255, 255A in the winding 100 occurs with said relative rotation of the circumferential containment means 300, 300', 300" by at least one slot pitch, the relative rotation being either clockwise or counterclockwise seen from the insertion side in said circumferential containment means as a function of the bending of the bridge-like hairpin connector of said overlapping hairpins 255, 255A.

A further object of the present description is a removable insertion and moving device 400, 400$^H$, 400$^{IV}$, 600 configured to insert and move hairpins 255, 255-R, 255-IVP in circumferential containment means 300, 300', 300" in a process of assembling a stator or rotor winding 100 consisting of one or more sectors 100-CI, 100-CIN extending circumferentially about a winding axis 50, each sector comprising one or more layers, each layer consisting of a circumferential arrangement of hairpins, each hairpin comprising a head end and one or more legs with a respective free insertion end, the device consisting of the removable insertion and moving means as set out above.

All the above also applies to hairpins with more than two legs, but there is a limitation in the total pitch, if it is more than 90°, in the radial insertion it would immediately knock, so a vertical insertion would be required.

Two or more of the parts (elements, devices, systems) described above can be freely associated and considered as kits of parts according to the description.

Preferred embodiments have been described above and variants of the present invention have been suggested, but it is understood that those skilled in the art may make modifications and changes without departing from the related scope of protection, as defined by the appended claims.

The invention claimed is:

1. A system for assembling a stator or rotor winding comprising one or more sectors extending circumferentially about a winding axis, each sector comprising one or more layers, each layer consisting of a circumferential arrangement of hairpins, each of the hairpins comprising a head end and two legs with a respective free insertion end, the system comprising:
   circumferential containment means of the hairpins, the circumferential containment means extending circumferentially in a single block and defining a set of spaces or slots configured to receive the legs of the hairpins, an angular distance between two slots being referred to as a slot pitch;
   removable insertion and moving means separate from the circumferential containment means and comprising two openings for inserting the two legs of a hairpin; and
   relative rotation means configured to mutually rotate the removable insertion and moving means and the circumferential containment means so that the circumferential containment means advance towards the removable insertion and moving means in an approaching direction, the relative rotation means being configured to perform rotations by one or more slot pitches about a rotation axis coinciding with an axis of the circumferential containment means;
   wherein the two openings are configured so that, in use, a first leg of an inserted hairpin is frontal with respect to the approaching direction and a second leg is rearward with respect to the approaching direction,
   wherein
   the removable insertion and moving means comprise a first portion and a second portion, with a first circumferential extension direction and a second circumferential extension direction, and a first axial extension direction and a second axial extension direction, respectively, the first portion and the second portion being configured so that the first and second portions are positionable with the axial extension direction parallel to the rotation axis outside the circumferential containment means, and at a greater radial distance from the rotation axis, than the radial distance of the sector,
   and wherein:
   the first portion comprises a first circumferential end and a second circumferential end, and a first connection body between the first and second circumferential ends, wherein the first circumferential end, in a section perpendicular to the rotation axis, increases in thickness radially outwards in a direction towards the second circumferential end;
   the first portion comprises, in the first connection body, radially inwards, a distal tapering with respect to the first circumferential end which, in a section perpendicular to the rotation axis, increases in thickness radially inwards in the direction towards the second circumferential end,
   the second portion comprises a first circumferential end and a second circumferential end, and a second connection body between the first and second circumferential ends, wherein the second connection body has, radially inwards, a proximal tapering with respect to the second circumferential end which, in a section perpendicular to the rotation axis, increases in thickness radially inwards in a direction towards the first circumferential end;
   and wherein:
   the first circumferential end of the first portion is configured and positionable, in use, so as to radially displace outwards the hairpins of the sector that approaches the first circumferential end along the approaching direction;
   a position of the first and second portions, and a position of the distal tapering of the first portion and of the proximal tapering of the second portion being predetermined so that, in use, a hairpin inserted into the two openings is radially inserted into the sector upon actuation of the relative rotation means.

2. The system of claim 1, wherein the first circumferential end of the first portion and the first circumferential end of the second portion have surfaces facing the rotation axis and placed at a predetermined distance from the rotation axis to guide and contain, in use, inserted hairpins of a previously assembled sector and moved forward towards the removable insertion and moving means upon relative rotation of the circumferential containment means.

3. The system of claim 1, wherein the first portion and the second portion are identical in shape, but have a mirroring circumferential configuration, the first and second portions being separate and maintained by means for supporting and adjusting the position of the first and second portions.

4. The system of claim 3, wherein:
   the first portion comprises, in the first connection body, radially inwards, a proximal tapering with respect to the first circumferential end which, in a section perpendicular to the rotation axis, decreases in thickness radially inwards in the direction towards the second circumferential end, the second portion comprises, in the second connection body, radially inwards, a distal tapering with respect to the first circumferential end which, in a section perpendicular to the rotation axis, decreases in thickness radially inwards in the direction towards the first circumferential end; and the proximal tapering of the first portion and the proximal tapering of the second portion end in respective radial and circumferential containment elements of hairpins forming the two openings, the respective radial and circumferential containment elements having an inner radial extension and being provided integrally along the circumferential extension of the first and second portions before respective first circumferential ends and at heights along the axial extension farther away from the heights of the respective first circumferential ends with respect to the circumferential containment means.

5. The system of claim 3, wherein the second circumferential end of the first portion and the second circumferential end of the second portion have respective chamfers in axial direction, configured, in use, to radially guide the hairpin until the hairpin is positioned in the sector.

6. The system of claim 3, wherein the means for supporting and adjusting the position of the first and second portions are configured to mutually arrange the first and second portions so as to insert the hairpins and reverse hairpins on different layers and crowns.

7. The system of claim 1, wherein the removable insertion and moving means are made in one piece, and wherein the first connection body of the first portion, the second circumferential end of the first portion, the second connection body of the second portion, and the second circumferential end of the second portion form a shaped bridge, and wherein the first circumferential end of the second portion has an axial surface facing, in use, the rotation axis and placed at a distance therefrom corresponding to the thickness of a crown, the first circumferential end of the second portion not increasing in thickness radially outwards in the direction towards the second circumferential end of the second portion.

8. The system of claim 7, wherein the two openings belong to a bifurcated pit with a common portion configured for one leg of a standard or reverse hairpin, and, in a contiguous manner, a first portion for the other leg of a standard hairpin and a second portion for the other leg of a reverse hairpin.

9. The system of claim 1, wherein insertion means and the removable insertion and moving means are configured to rotate about the rotation axis, while the circumferential containment means are fixed.

10. The system of claim 1, wherein the circumferential containment means are configured to rotate about the rotation axis, while the removable insertion and moving means are fixed.

11. A method for assembling a stator or rotor winding comprising one or more sectors extending circumferentially about a winding axis, each sector comprising one or more layers, each layer consisting of a circumferential arrangement of hairpins, each of the hairpins comprising a head end and one or more legs with a respective free end, the method comprising:

a) providing a system comprising:
circumferential containment means of the hairpins, the circumferential containment means extending circumferentially in a single block and defining a set of spaces or slots configured to receive the legs of the hairpins, an angular distance between two slots being referred to as a slot pitch;

removable insertion and moving means separate from the circumferential containment means and comprising two openings for inserting the two legs of the hairpin; and relative rotation means configured to mutually rotate the removable insertion and moving means and the circumferential containment means so that the circumferential containment means advance towards the removable insertion and moving means in an approaching direction, the relative rotation means being configured to perform rotations by one or more slot pitches about a rotation axis coinciding with an axis of the circumferential containment means;

wherein the two openings are configured so that, in use, a first leg of an inserted hairpin is frontal with respect to the approaching direction and a second leg is rearward with respect to the approaching direction, wherein the removable insertion and moving means comprise a first portion and a second portion, with a first circumferential extension direction and a second circumferential extension direction, and a first axial extension direction and a second axial extension direction, respectively, the first portion and the second portion being configured so that the first and second portions are positionable with the axial extension direction parallel to the rotation axis outside the circumferential containment means, and at a greater radial distance from the rotation axis, than the radial distance of the sector, and wherein:

the first portion comprises a first circumferential end and a second circumferential end, and a first connection body between the first and second circumferential ends, wherein the first circumferential end, in a section perpendicular to the rotation axis, increases in thickness radially outwards in a direction towards the second circumferential end;

the first portion comprises, in the first connection body, radially inwards, a distal tapering with respect to the first circumferential end which, in a section perpendicular to the rotation axis, increases in thickness radially inwards in the direction towards the second circumferential end, the second portion comprises a first circumferential end and a second circumferential end, and a second connection body between the first and second circumferential ends, wherein the second connection body has, radially inwards, a proximal tapering with respect to the second circumferential end which, in a section perpendicular to the rotation axis, increases in thickness radially inwards in a direction towards the first circumferential end;

and wherein:

the first circumferential end of the first portion is configured and positionable, in use, so as to radially displace outwards the hairpins of the sector that approaches the first circumferential end along the approaching direction;

a position of the first and second portions, and a position of the distal tapering of the first portion and of the proximal tapering of the second portion being predetermined so that, in use, a hairpin inserted into the two openings is radially inserted into the sector upon actuation of the relative rotation means;

b) inserting, through the removable insertion and moving means, a hairpin into a respective region in the circumferential containment means;

c) actuating the rotation means of the circumferential containment means by one or more slot pitches; and d) repeating steps b) and c) until completion of the sector and progressively of the entire winding, wherein the removable insertion and moving means are used for insertion of the last hairpin of each sector; wherein in step d), once the last hairpin of the sector has been inserted, the removable insertion and moving means are removed and inserted into a respective region of a new sector.

12. The method of claim 11, wherein:

the winding is assembled from an innermost sector and progressively moving to sectors with larger diameters;

one or more reverse hairpins are inserted during construction of an outermost sector between each pair of consecutive sectors, at a start of the assembly of the outermost sector of the pair of consecutive sectors;

before inserting a reverse hairpin, in an alignment step the circumferential containment means and the insertion and moving means are mutually positioned so as to define a minimum area for insertion of the reverse-type hairpin into the slots;

a relative rotation of the circumferential containment means by a slot pitch is performed as soon as the reverse hairpin is inserted; and as soon as one or more reverse hairpins are inserted between two consecutive sectors, steps b) and c) are carried out, in which the hairpins are not reverse hairpins.

13. The method of claim 12, wherein the hairpins comprise two pairs of reverse hairpins and a plurality of non-reverse hairpins, the two pairs of reverse hairpins being inserted into the winding at a predetermined mutual angular distance, and wherein all the sectors of the winding are firstly assembled with non-reverse hairpins leaving required spaces for the reverse hairpins, and wherein the reverse hairpins are then inserted between pairs of consecutive sectors by:

widening the outermost sector of the pair, of consecutive sectors through the removable insertion and moving means by a radial amount equal to a radial dimension of a horizontal section of the leg of the reverse hairpin in the insertion position; and displacing the innermost sector of the pair of consecutive sectors towards the winding axis by a radial amount equal to the radial dimension of the horizontal section of the leg of the reverse hairpin in the insertion position.

14. The method of claim 13, wherein said the predetermined mutual angular distance is of 180°.

15. The method of claim 11, wherein steps b) and c) are performed for parallel hairpins, and repetition of step d) is performed until insertion of the last parallel hairpin is not missing, and wherein the following steps are performed:

outwardly widening, through the removable insertion and moving means, a first sector part starting with the first inserted hairpin and ending with one of the next inserted hairpins;

maintaining a second sector part at a final theoretical diameter, the second part being complementary to the first sector part;

inserting the last hairpin parallel with a predetermined angle of the legs with respect to the winding axis; and bringing the first sector part back into contact with the second sector part.

16. The method of claim 15, wherein the predetermined angle in case of parallel hairpins each consisting of two hairpins is between 3 and 7 degrees.

17. The method of claim 11, wherein the first portion and the second portion are identical in shape, but have a mirroring circumferential configuration, the first and second portions being separate and maintained by means for supporting and adjusting the position of the first and second portions, and wherein:

one or more hairpins with a progressively smaller pitch are inserted into the circumferential containment means from the hairpin with a smaller pitch, always before the hairpin with a larger pitch, wherein for each hairpin of the one or more hairpins with a progressively smaller pitch, the first and second portions are mutually displaced so as to house said each hairpin.

18. The method of claim 17, wherein the circumferential containment means are configured to rotate about the rotation axis, while the removable insertion and moving means are fixed, and wherein assembly of overlapping hairpins in the winding occurs with the relative rotation of the circumferential containment means by at least one slot pitch, the relative rotation being either clockwise or counterclockwise seen from an insertion side in the circumferential containment means as a function of a bending of a bridge-like hairpin connector of the overlapping hairpins.

19. The method of claim 11, wherein the first and second portions are positioned and/or displaced to widen outwards and/or radially push inwards a first sector part starting with the first hairpin inserted and/or a second sector part ending with one of the next hairpins inserted.

20. A removable insertion and moving device configured to insert and move hairpins in circumferential containment means, in a process of assembling a stator or rotor winding comprising one or more sectors (100-CI, 100-CIN) extending circumferentially about a winding axis, each sector comprising one or more layers, each layer consisting of a circumferential arrangement of hairpins, each hairpin comprising a head end and one or more legs with a respective free end, the removable insertion and moving device consisting of removable insertion and moving means according to claim 1.

* * * * *